United States Patent [19]
Golding et al.

[11] Patent Number: 5,477,448
[45] Date of Patent: Dec. 19, 1995

[54] SYSTEM FOR CORRECTING IMPROPER DETERMINERS

[75] Inventors: Andrew R. Golding, Cambridge; Yves Schabes; Emmanuel Roche, both of Boston, all of Mass.

[73] Assignee: Mitsubishi Electric Research Laboratories, Inc., Cambridge, Mass.

[21] Appl. No.: 251,978

[22] Filed: Jun. 1, 1994

[51] Int. Cl.⁶ .................................................. G06F 17/28
[52] U.S. Cl. ...................................................... 364/419.08
[58] Field of Search ......................... 364/419.08, 419.01, 364/419.02, 419.1, 419.11

[56] References Cited

U.S. PATENT DOCUMENTS

| | | | |
|---|---|---|---|
| 4,864,502 | 9/1989 | Kucera et al. | 364/419.08 |
| 4,994,966 | 2/1991 | Hutchins | 364/419.08 |
| 5,083,268 | 1/1992 | Hemphill et al. | 364/419.08 |
| 5,218,537 | 6/1993 | Hemphill et al. | 364/419.01 |

Primary Examiner—Robert A. Weinhardt
Attorney, Agent, or Firm—Robert K. Tendler

[57] ABSTRACT

In a grammar checking system which includes first tagging a sentence as to parts of speech, an improper determiner correction module detects improper referents of a noun phrase and suggests insertion of a determiner should one be necessary or the deletion of an improper determiner. To detect improper use of a determiner, parts of speech tags are utilized to characterize a sentence, thus to identify noun phrases by maximally matching a pattern that defines which sequences of parts of speech tags constitute valid noun phrases. This is accomplished by identifying the start of the noun phrase and its end to permit checking for either missing determiners, extraneous determiners, or lack of agreement in number for the constituents of the noun phrase. Once a noun phrase is found, the system tests to see if the noun is a head noun and thereafter if the head noun is a singular non-proper noun, whether the noun phrase contains a determiner, whether the noun phrase is a title, whether the head noun is a mass noun or whether the noun phrase is part of an idiom. The system also checks to see if the head noun is a proper noun and if so whether the noun phrase contains a determiner. Finally, if the noun phrase contains a determiner the system checks if the determiner agrees in number with the head noun. In this manner, both missing determiners, extraneous determiners and determiner noun number disagreement are detected and reported.

7 Claims, 14 Drawing Sheets

Fig. 9

NOUN PHRASE
↓
722 IS THE HEAD NOUN A PROPER NOUN ? — NO → END
↓ YES
724 DOES THE NOUN PHRASE CONTAIN A DETERMINER ? — NO → END
↓ YES
726 REPORT EXTRANEOUS DETERMINER → END

Fig. 10

NOUN PHRASE
↓
732 IS THE HEAD NOUN A PROPER NOUN ? — YES → END
↓ YES
734 DOES THE NOUN PHRASE CONTAIN A DETERMINER ? — NO → END
↓ YES
736 DOES THE DETERMINER AGREE IN NUMBER WITH THE HEAD NOUN ? — YES → END
↓ NO
738 REPORT DISAGREEMENT → END

SYSTEM FOR CORRECTING IMPROPER DETERMINERS

FIELD OF INVENTION

This invention relates to grammar checking systems and more particularly to a system for detecting incorrect determiners.

BACKGROUND OF THE INVENTION

As discussed in U.S. Pat. No. 4,868,750 issued to Henry Kucera et al, a colloquial grammar checking system involves automated language analysis via a computer for receiving digitally encoded text composed in a natural language and using a stored dictionary of words and analysis and an analysis program to analyze the encoded text and to identify errors. In particular such a system is utilized in the Microsoft Word program for detecting grammar errors.

One of the most troublesome problems associated with such systems is extremely high error rate when the system suggests a proper usage. The reason for the unreasonably high error rate derives from the system's incorrect analysis of a sentence. Also assuming a correct analysis of a sentence the Microsoft system often suggests an incorrect word.

There is also a class of systems which attempt to analyze a sentence based on the probability that the entire sentence is correct. The largest problem with such systems is that they require storage and processing power beyond the capability of present PCs and related memories.

Other systems attempt to detect incorrect grammar by analyzing sentences based on a training corpus. However, system constraints preclude this type of system from being utilizable in personal computing environments due to the massive storage involved as well as high speed processing required.

By way of example, prior grammar checking systems routinely miss inserting indefinite articles such as "a" and "an", which is indeed a large problem for foreign speaking individuals when trying to translate into the natural language presented by the system.

Also of tremendous importance is the lack of ability to insert the appropriate article such as "the" or "a" when sentences are composed by those not familiar either with the grammar rules or with the colloquial usage of such articles. Moreover, common mistakes made by prior art grammar checking systems include no recognition of incorrect verb sequences in which multiple verbs are used. Although multiple verbs can be used properly in a sentence, most foreign speaking individuals routinely make mistakes such as "He has recognize that something exists." Here "has" is a verb and "recognize" is a verb. As can be seen there is an obvious misusage of multiple verbs.

Most importantly, problems occur in so-called determiners such that for instance the sentence "I have cigarette" obviously is missing the determiner "a". Likewise there are often missing determiners such as "some" or "a few". Thus a proper sentence could have read "I have a few cigarettes". Note that the same sentence could properly be constructed by putting the noun in plural form, e.g. "I have a few cigarettes"; or "I have cigarettes".

An even further typical grammar error not corrected by either spell checkers or prior grammar systems includes the failure to correct improper word inflection. For instance as to improper verb inflections, such systems rarely correct a sentence such as "I drived to the market."

The above problems become paramount when taken from the view of a nonnative speaker unfamiliar both with the idiom and the rules of the language. Especially with English, the rules are not as straightforward as one would like, with the correct "grammar" often determined by idiom or rules which are not familiar to those native speakers utilizing the language.

It is therefore important to provide a grammar checking system which takes into account the most frequent errors made by non-native speakers of a particular nationality. Thus for instance there is a body of errors normally made by Japanese native speakers which are translated into English in ways which are predictable and therefore correctable. Likewise for instance for French or any of the Romance languages, there are certain characteristic errors made when translating into English which can be detected and corrected.

Syntax recognizing systems have in general been limited to operating on text having a small, well-defined vocabulary, or to operating on more general text but dealing with a limited range of syntactic features. Extensions of either vocabulary or syntactic range require increasingly complex structures and an increasing number of special recognition rules, which make a system too large or unwieldy for commercial implementation on commonly available computing systems.

Another popular system for detecting and correcting contextual errors in a text processing system is described U.S. Pat. No. 4,674,065 issued to Frederick B. Lang et al, in which a system for proofreading a document for word use validation and text processing is accomplished by coupling a specialized dictionary of sets of homophones and confusable words to sets of di-gram and n-gram conditions from which proper usage of the words can be statistically determined. As mentioned before, doing statistics on words as opposed to parts of speech requires an exceptionally large training corpus and high speed computation, making the system somewhat unwieldy for personal computing applications. Moreover, this system, while detecting confusable words in terms of like-sounding words, is not sufficient to provide correction for those words which are confused in general usage but which do not sound alike.

Finally, U.S. Pat. No. 4,830,521 is a patent relating to an electronic typewriter with a spell checking function and proper noun recognition. It will be appreciated that the problem with noun recognition revolves around a capitalization scenario which may or may not be accurate in the recognition of a proper noun. Most importantly this patent tests words only to find if they are the first word in a sentence to determine the function of the capitalization, whereas capitalization can obviously occur for words anywhere in the sentence.

By way of further background numerous patents attack the grammar problem first through the use of spelling correction. Such patents include U.S. Pat. Nos. 5,218,536; 5,215,388; 5,203,705; 5,161,245; 5,148,367; 4,995,740; 4,980,855; 4,915,546; 4,912,671; 4,903,206; 4,887,920; 4,887,212; 4,873,634; 4,862,408; 4,852,003; 4,842,428; 4,829,472; 4,799,191; 4,799,188; 4,797,855; and 4,689,768.

There are also a number of patents dealing with text analysis such as U.S. Pat. Nos. 5,224,038; 5,220,503; 5,200,893; 5,164,899; 5,111,389; 5,029,085; 5,083,268; 5,068,789; 5,007,019; 4,994,966; 4,974,195; 4,958,285; 4,933,896; 4,914,590; 4,816,994; and 4,773,009. It will be appreciated that all of these patents relate to systems that cannot be practically implemented for the purpose of checking grammar to the levels required especially by those non-native speakers who are forced to provide written documents in a given natural language. It will also be appreciated that these patents relate to general systems which are not specifically directed to correcting grammar and English usage for non-native speakers.

Finally there exists a number of patents which relate to how efficiently one can encode a dictionary, these patents being U.S. Pat. Nos. 5,189,610; 5,060,154; 4,959,785; and 4,782,464. It will be appreciated that encoding a dictionary is but one step in formulating a system which can adequately check grammar.

More particularly, in the prior art, systems have not been capable of detecting when determiners such as "the", "a" and "some" are improperly used for referring to a noun. Thus neither missing determiners, nor extraneous determiners have heretofore been detected by prior grammar checking systems. Moreover, these prior art systems do not check for lack of agreement between a determiner and the associated noun. As result such grammer checking system are incapable of assisting non-native speakers.

SUMMARY OF THE INVENTION

In order to assist non-native speakers in the severe problem of determiner usage, part of speech tags are utilized to brake down the sentence to be able to identify noun phrases. Having identified a noun phrase by maximally matching a pattern that defines which sequences of part of speech tags constitute valid noun phrases, the Subject System determines the type of nouns in the noun phrase by determining the so-called head nouns, noun phrases as a title, mass nouns, and whether or not the noun phrase is part of an idiom. The system also identifies in the case of a title, whether the head noun is a mass title noun. The system also checks to see if the head noun is a proper noun and whether or not the corresponding noun phrase contains a determiner. Moreover, all head nouns which are proper nouns are identified. If the noun phrase in this case does contain a determiner, then the system checks to see if the determiner agrees in number with the head noun. As a result, the system detects and reports missing determiners, extraneous determiners, and disagreement between determiners and the associated nouns.

In summary, in a grammar checking system which includes first tagging a sentence as to parts of speech, an improper determiner correction module detects improper referents of a noun phrase and suggests insertion of a determiner should one be necessary or the deletion of an improper determiner. To detect improper use of determiner parts of speech tags are utilized to characterize a sentence, thus to identify noun phrases by maximally matching a pattern that defines which sequences of parts of speech tags constitue valid noun phrases. This is accomplish by identifying the start of the noun phrase and its end to permit checking for either missing determiners, extraneous determiners, or lack of agreement in number for the constituents of the noun phrase. Once a noun phrase is found, the system tests to see if the noun is a head noun and thereafter if the head noun is a singular non proper noun, whether the noun phrase contains a determiner, whether the noun phrase is a title, whether the head noun is a mass noun or whether the noun phrase is part of an idiom. The system also checks to see if the head noun is a proper noun and if so whether the noun phrase contains a determiner. Finally, if the noun phrase contains a determiner the system checks if the determiner agrees in number with the head noun. In this manner, both missing determiners, extraneous determiners and determiner noun number disagreement are detected and reported.

BRIEF DESCRIPTION OF THE DRAWINGS

These and other features of the Subject Invention will be better understood taken into conjunction with the Detailed Description in conjunction with the Drawings of which:

FIG. 9 is a flow chart illustrating the checking of a noun phrase for an extraneous determiner through the determination of whether or not the head noun is a proper noun and then ascertaining whether or not the noun phrase contains a determiner thereby to report an extraneous determiner;

FIG. 10 is a flow chart illustrating the checking of a noun phrase for number disagreement in which the determination is accomplished by detecting whether the head noun is a proper noun, or if not the presence of a determiner and whether or not the determiner agrees in number with the head noun thereby to report disagreement;

DETAILED DESCRIPTION

Modular Grammar Checking System

While the Subject Invention relates to determiner detection and the improper use thereof, what is now described is a total grammar checking system in which various modules rely on the part of speech probability.

Figure 1:
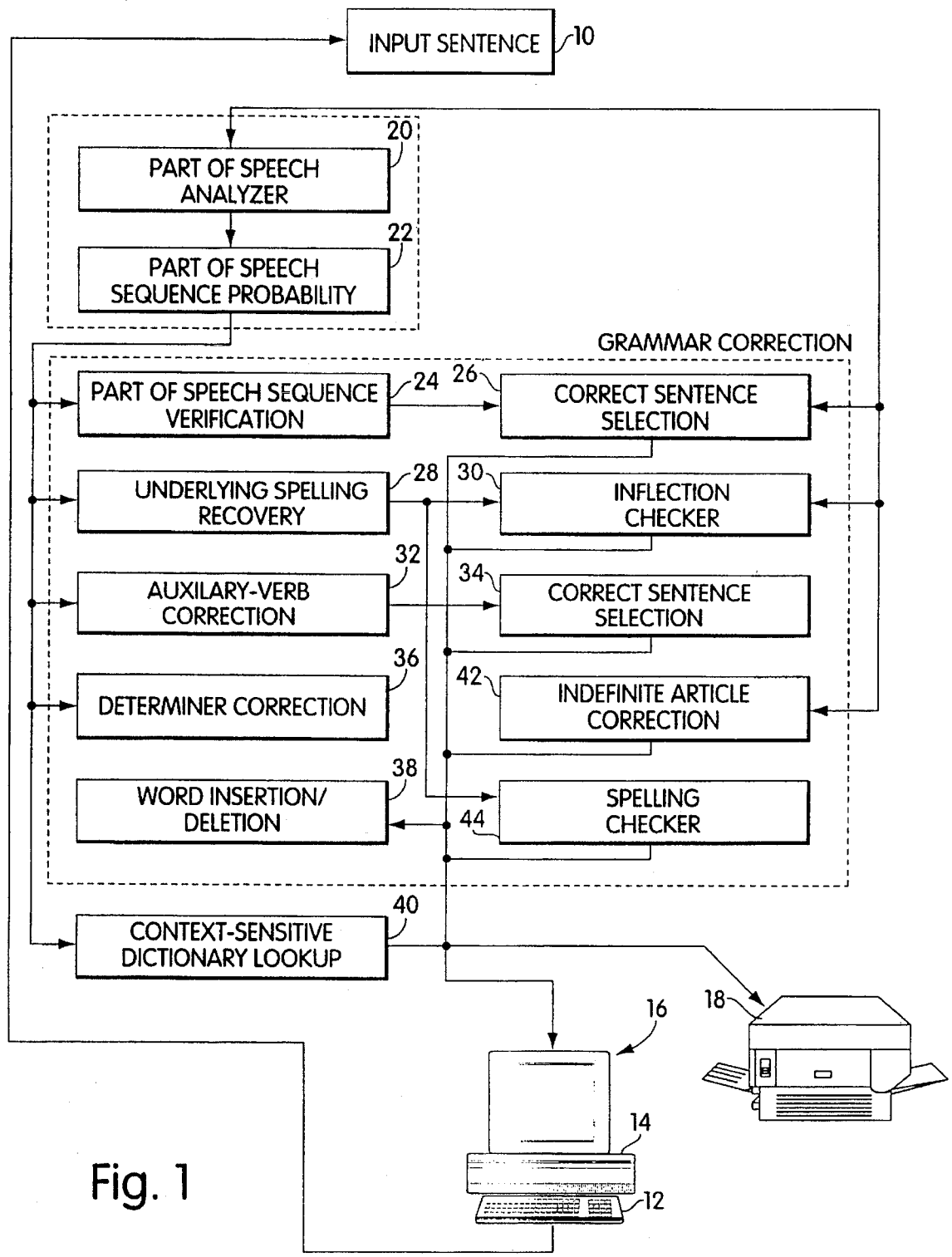
FIG. 1 is a block diagram of a complete grammar checking system illustrating the various modules utilized for complete grammar checking.

Referring now to FIG. 1, especially for foreign language spelling individuals, it is important to provide instant grammar checking for inputted sentences which is both accurate and easily used even for those not particularly computer literate. In order to accomplish grammar checking, an input sentence 10, is entered by a keyboard 12 into the CPU 14 of a word processing system 16.

It is important for reliable grammar verification that the parts of speech of the input sentence be accurately determined. While prior grammar checking systems have utilized the input sentence directly, it is a feature of the subject invention that the input sentence be broken down into parts of speech so as to provide a part-of-speech sequence. This is accomplished by part-of-speech analyzer 20 which is available as an implementation of Kenneth Church's Stochastic Parts Program published as "A Stochastic Parts Program and Noun Phrase Parser for Unrestricted Text" in the Proceedings of the Second Conference on Applied Natural Language Processing, Austin Tex., 1988. The result of having derived parts of speech is a part of speech sequence such as "PRONOUN, VERB, DETERMINER, NOUN, VERB" for an input sentence "I heard this band play".

Having merely derived parts of speech does not reliably assure that the derived parts of speech reflect a proper sentence.

In order to analyze and construct proper sentences, it is important to ascertain the probability that the part of speech sequence corresponds to a correct word sequence. In order to derive the probability of a sequence of an input sentence, the output of analyzer or tagger 20 is coupled to a part of speech sequence probability determination unit 22. The output of this unit is utilized by various modules in the analysis of the input sentence 10.

The first module is a part of speech verification unit 24 which selects between a set of easily confused words or sentences based on the probability of the corresponding parts of speech sequence. Selection of the correct word or sentence is determined, in one embodiment, by the probability exceeding a predetermined threshold. The selection of the correct sentence is accomplished by a unit 26, the inputs to which are of the probabilities of the various sentences as well as the input sentence. As will be described here and after, unit 26 is provided with a list of easily confused words.

While easily confused sentences may be corrected in the above fashion, a further module 28 is utilized to determine the underlying spelling of a word. While conventional spell checkers utilize lookup tables for spelling verification, they do not take into account capitalization which can result in annoying indications of spelling errors. Moreover, those grammar checking systems which rely on proper spelling are often mislead by capitalized words either at the beginning of a word, sentence, or acronym.

In order to provide more reliable spell checking and grammar correction, an underlying spelling recovering unit 28 treats capitalized words as "confused" words. In so doing, the above technique is used to provide the probability of a capitalized word being in one category or another based on a training corpus such as Brown's corpus.

Thus while traditional language processing systems have recovered the underlying spelling of a word by imposing the restriction that a word be either an ordinary noun or proper noun but not both, the subject recovery unit utilizes context and probabilities to categorize each word. This is accomplished by analyzing the sentence with the word in capitalized and uncapitalized form to ascertain which one has the higher probability. Thereafter, the word analyzed for spelling is that form of the word in the higher probability sentence. Having recovered the most likely spelling, the output of the recovery unit 28 is coupled to a inflection checking and correcting system 30. This spelling corrector may be either the conventional spell check variety or one tuned for a particular foreign speaking individual.

As an additional module, an auxiliary-verb correction unit 32 also requires correct parts of speech derived from part of speech sequence probability unit 22. An auxiliary-verb correction problem exists when there are multiple verbs in a sentence some of which are improper. This can occur in complex auxiliary-verb sequences when incorrect tenses are utilized. For instance, the sentence "he would living" involves the two verb "would" and "living". One correct form of the sentence would be "he would live". Thus the tense of the verb "live" is required to be corrected.

In order to accomplish this, auxiliary-verb correction unit 32 detects any incorrect auxiliary-verb sequence and then proposes corrections. This is accomplished first by utilizing a directed acyclic graph which describes a finite set of verb sequences. It would be appreciated that prior to establishing correct verb sequences it is important to correctly identify correct parts of speech which is accomplished by unit 22 as noted above.

The output of auxiliary-verb correction unit 32 is coupled to a correct sentence selection unit 34 for suggesting appropriate alternative sentences.

An additional module utilizing parts of speech is a determiner correction unit 36. It is the purpose of this unit to correct for those words that determine the referent of a noun phrase. Examples of determiners are words such as "the", "a", and "some". There are three classes of errors detected and corrected by this unit, namely, missing determiners, extraneous determiners, and lack of agreement between the determiner and a noun.

Examples of a missing determiner is "John read book" in which "the" is left out. An example of an extraneous determiner is "John went to the New York" with "the" to be deleted. Lack of agreement is evident in the sentence "John read many book" where the noun "book" must be pluralized to agree with the determiner "many". In order to detect an improper determiner, parts of speech tags identified so as to be able to identify noun phrases. The system identifies noun phrases by maximally matching a regular expression that defines which sequences of part of speech tags constitute valid noun phrases.

The system then tests each noun phrase to see if it is missing a determiner. As part of this process, a head noun is first detected followed by determination of whether this head noun is a mass nouns, mass title nouns, idiom or is missing a determiner. The system then tests each noun phrase to see if it has an extraneous determiner. Finally the system test whether the determiner and head noun of the noun phrase agree in number. The result is either the insertion, deleting or replacement of a word as illustrated at 38.

In addition, module 42 corrects the usage of the indefinite articles "a" and "an" based on input sentence 10.

Finally the accuracy provided by the part of speech sequence is useful in a context-sensitive dictionary lookup 40. Typically a given word can have out of context many parts of speech, each one of them corresponding to sub entries in a dictionary. The context-sensitive dictionary lookup module 40 accesses a dictionary and selects the appropriate definitions based on the part of speech of the word obtained by the part-of-speech module 20. For example, the word "love" can be a noun or a verb, and the noun "love" has many different entries in a dictionary, as for the verb "love". Assuming that the input sentence is "She was my first love", the word "love" is identified as a noun by the part-of-speech module, and the context-sensitive dictionary lookup module only selects the entries of the dictionary for the noun "love" and those for the verb "love".

It will be appreciated that once the underlying spelling of a word has been recovered by module 28 not only can this underlying spelling be utilized for inflection correction by module 30, it can also be utilized in a conventional spelling system 44. Thus conventional spell checking system can be made to overlook acronyms during the spell checking process rather than presenting an incorrect array of suggestions.

a) Grammar Correction Based on Part of Speech Probabilities

In the past, several of the aforementioned grammar checking systems have attempted to correct English usage by correcting improper use of some troublesome words, especially those in those identical sounding words are spelled differently. For example: "too", "to", and "two"; "their", "they're" and "there". Other common mistakes revolve around whether a word should be one word or two words such as "maybe" and "may be". There are also words which do not sounds alike but that are often misused such as which and whose.

In the past, in order to ascertain proper usage, the grammaticality of a sentence was computed as the probability of this sentence to occur in English. Such statistical approach assigns high probability to grammatically correct sentences, and low probability to ungrammatical sentences. The statistical is obtained by training on a collection of English sentences, or a training corpus. The corpus defines correct usage. As a result, when a sentence is typed in to such a grammar checking system, the probability of the entire sentence correlating with the corpus is computed. It will be appreciated in order to entertain the entire English vocabulary. about 60,000 words, a corpus of at several hundred trillion words must be used. Furthermore, a comparable number of probabilities must be stored on the computer. Thus the task of analyzing entire sentences is both computationally and storage intensive.

In order to establish correct usage in the Subject System, it is the probability of a sequence of parts of speech which is derived. For this purpose, one can consider that there are between 100 and 400 possible parts of speech depending how sophisticated the system is to be. This translates to a several million word training corpus as opposed to several hundred trillion. This type of analysis can be easily performed on standard computing platforms including the ones used for word processing.

Thus in the subject system, a sentence is first broken up into parts of speech. For instance, the sentence "I heard this band play" is analyzed as follows: PRONOUN, VERB, DETERMINER, NOUN, VERB. The probability of this part of speech sequence, is determined by comparing the sequence to the corpus. This is also not feasible unless one merely consider the so-called tri-grams. Tri-grams are triple of parts of speech which are adjacent in the input sentence. Analyzing three adjacent parts of speech is usually sufficient to establish correctness; and it the probability of these tri-grams which is utilized to establish that a particular sentence involves correct usage. Thus rather than checking the entire sentence, the probability of three adjacent parts of speech is computed from the training corpus.

Assuming two sentences, one which is confused with the other, it is possible with the above technique to determine which would be the correct usage. Since the above system can determine this with a low error rate, there are two benefits. The first benefit is obviously ascertaining which of the two sentences is correct. The second benefit, is that having established a correct sentence, its parts of speech can be used by other grammar checking modules for further processing.

Referring now to FIG. 2, an input sentence S1 as indicated at 31, is coupled to a part-of-speech tagger 32 and also a candidate S2 as illustrated in 34 which is provided with an input comprising a list of confused words 36. Tagger 32 brakes up sentence S1 into the most likely part of speech sequence T1 and its probability P1 as can be seen at 38. This is accomplished by an algorithm such as that described by Church in which the most likely part of speech sequence is obtained by computing the most likely product of probabilities of all possible overlapping triples of parts of speech. One algorithm for accomplishing this task is provided here in as Appendix A.

The words in the sentence S1 may be part of a list of easily confused words 36, in which case, all possible alternative sentences S2 to the sentence S1 are generated according to list 36. The output of sentence generator 34 is applied to tagger 32 to produce the most likely part-of-speech sequence T2 as shown at 40 and its probability P2, again by the algorithm of the Appendix A.

Having derived the probabilities P1 and P2 of the sentences S1 and S2 at 38 and 40, it is now important to determine which part of speech sequence is the most likely to be correct. In order to determine the appropriate sentence to be selected, and as shown at 42, P2 is compared to P1 and if P2–P1 is greater than some threshold e, than as illustrated in 44 sentence S2 is suggested. If P2–P1<=e then no change is suggested as illustrated at 46.

For example, assuming the input sentence is "I want to here this band" where "here" is misused instead of the correct word "hear", one needs to compare the two sentences S1: "I want to here this band" and S2: "I want to hear this band".

In order to compare those two sentences, one can try to compare the overall probabilities of the sentences given some statistical model of English text. This approach, explored in an article by Eric Mays, Fred Damereau and Robert Mercer entitled "Context Based Spelling Correction" published in "Information Processing and Management", 27(5):517–422, 1991, is computationally extremely expensive and therefore impractical on standard computers when dealing with unrestricted text which requires vocabulary of more than 40,000 words. Being able to directly compute the sentence probabilities requires tremendous amounts of training data, e.g. a minimum of 400,000,000 training words, and tremendous amounts of storage space.

Figure 2A:
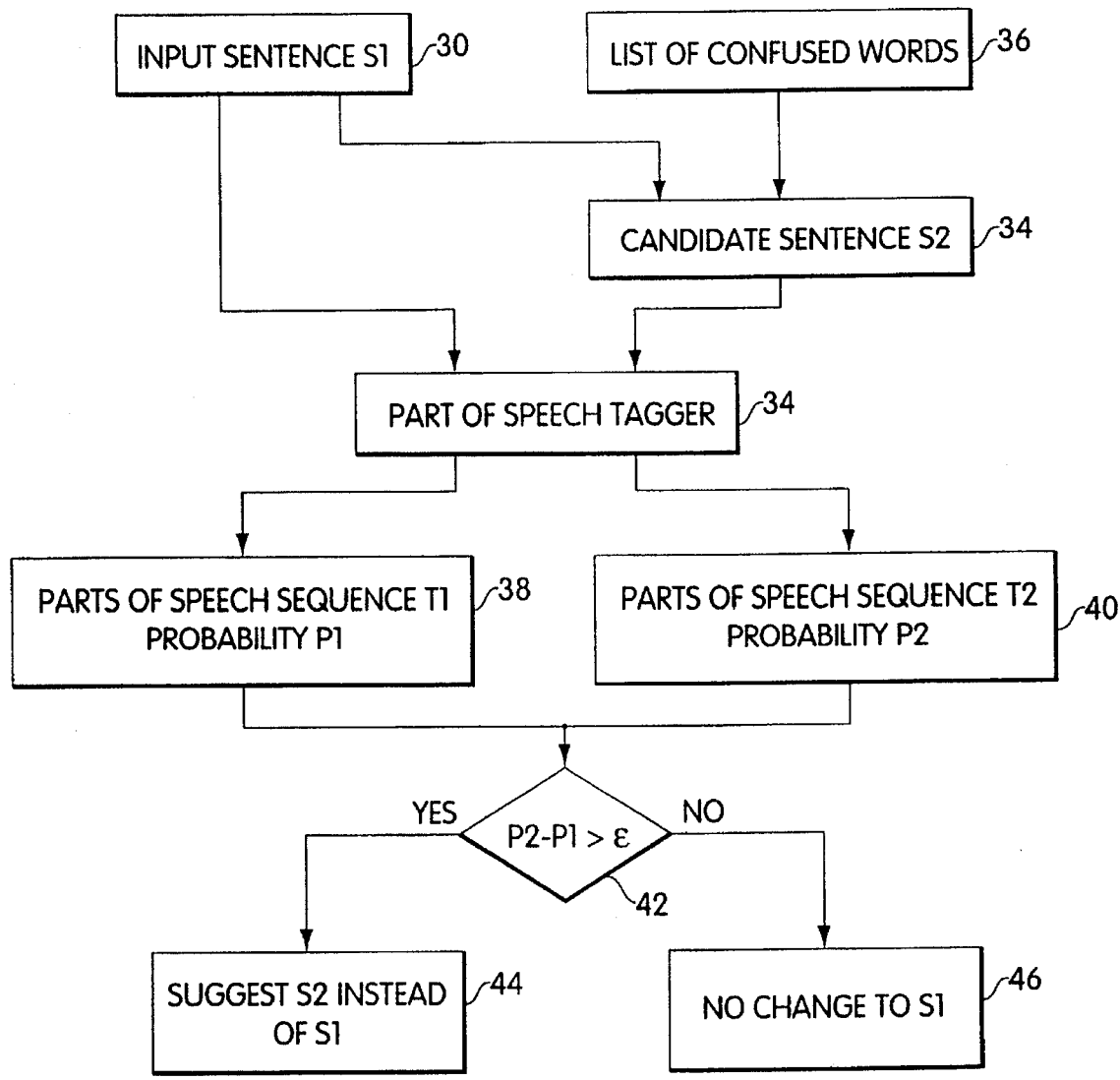
FIG. 2A is a block diagram illustrating the correction of easily confused words utilizing the probability of part of speech sequences.

In contrast, the subject system as illustrated in FIG. 2A compares the probability of the most likely part-of-speech sequence for the given input sentence and the possible sentence with which it is likely to be confused. For example, instead of computing the probability of sentence "I want to here this band", the system derives the most likely part of speech sequence, e.g."PRONOUN VERB TO ADVERB DETERMINER NOUN" for that sentence and computes the probability of this part of speech sequence for the input sentence. Similarly the system derives the most likely part of speech sequence for "I want to hear this band", e.g. "PRONOUN VERB TO VERB DETERMINER NOUN", and computes its probability for the related sentence. Then, the subject system decides between the usage of here and hear by comparing the probabilities.

Rather than comparing the above mentioned probabilities, in a preferred embodiment, the subject system compares the geometric average of these probabilities by taking into account their word lengths, i.e. by comparing the logarithm of P1 divided by the number of words in S1, and the logarithm of P2 divided by the number of words in S2. This is important in cases where a single word may be confused with a sequence of words such as "maybe" and "may be". Directly comparing the probabilities of the part of speech sequences would favor shorter sentences instead of longer sentences, an not necessarily correct result, since the statistical language model assigns lower probabilities to longer sentences. The above is illustrated in FIG. 2B.

The list of confused words 36 typically includes the following sets: to, too, two; I, me; its, it's ; their, they're, there; whose, which; then, than; whose, who's ; our, are; hear, here; past, passed; accept, except; advice, advise; lose, loose; write, right; your, you're; affect, effect and maybe, may be.

Note that the subject system is applicable to other confused words and other languages such as French, Italian and Spanish among others. Note that the method is general, in so far as part-of-speech tagging can be performed using the method described in Church, namely the trigram model.

Figure 2B:
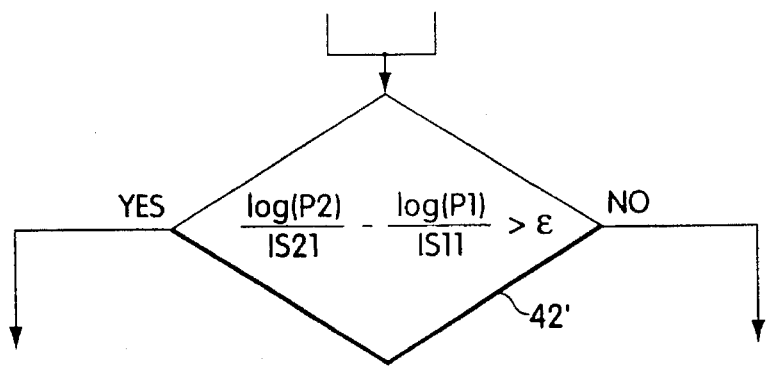
FIG. 2B is a block diagram illustrating the use of sentence length averaging for determination of a probabilistic threshold for the correction of easily confused words for the probability determination component of FIG. 2A.

In summary, the system of FIGS. 2A and 2B in addition to selecting more probably correct sentences is important in ascertaining other judgments about the grammaticality of sentences. The above provides a better and more reliable modality for breaking up sentences into parts of speech.

In order to correct sentences, it is first important to be able to break the sentence down into parts of speech. How accurately a grammar checker can operate depends critically on the accuracy of this break down. By providing more reliable part of speech generation, the end result for grammar checking can be made that much more reliable.

b) Correction of "a" vs "an"

It will be appreciated that one of the most frequently occurring mistakes for foreign speaking individuals is the correct usage of the indefinite articles "a" and "an". The rules of English specify that the indefinite "a" should be used before words that are pronounced with an initial consonant and "an" should be used before words that are pronounced with an initial vowel. A naive and incorrect implementation of these rules of English test whether the first letter of the next word is a vowel or a consonant. Although it is the case that most words that are pronounced with an initial consonant (resp. vowel) are actually spelled with an initial consonant (resp. vowel), it is not always the case as in the following examples: an hour; a European. For example, the word "hour" has an initial consonant (h) but is pronounced with an initial sound corresponding to a vowel (e.g. ow). Similarly, the word "European" starts with an initial vowel (the letter "E") but is pronounced with an initial sound corresponding to a consonant (e.g. "ye").

Previous solutions to this problem consist in storing a dictionary of the pronunciation of all English words. These solutions are correct but require massive amount of storage for all words in the English language. Rather than utilizing a dictionary lookup table for all words in the English language, the subject system applies simple rules when no exception to the rules is found. The exception to the rules are stored in two small tables corresponding respectively to the words not handled by the rules that start with a vowel but are initially pronounced with a consonant, and to the words not handled by the rules that start with a consonant but are initially pronounced with a vowel. The lookup tables for these words contain less than 300 words as opposed to a generalized dictionary based system of 60,000 words. The tables below list of the words for which there are English exceptions.

TABLE 1

Ewell
Ewell's
U
U's
U-boat
U-boat's
U-turn
U-turn's
UFO
UFO's
Uganda
Uganda's
Ugandan
Unitarian
Unitarianism
Unitarianism's
Uranus Uranus'
Uruguay
Uruguay's
Uruguayan
Utah
Utah's
Utopia
Utopia's
Utopian
Utrecht
Utrecht's
ewe
ewe's
ewer
ewer's
once
one
one's
one-armed
one-eyed
one-horse
one-sided
one-step
one-time
one-upmanship
oneself
ouija
ouija's
ouija-board
ouija-board's
ouijas
u
u's
ubiquitous
ubiquity
ubiquity's
ukase
ukase's
ukulele
ukulele's
ululate
ululated
ululating
ululation
ululation's
unanimity
unanimity's
unanimous
unanimously
unicorn
unicorn's
unification
unification's
unified
uniform
uniformed
uniformity
uniformly
unify
unifying
unilateral
unilaterally
union
union's
unionist
unionist's
unique
uniquely
uniqueness
unisex
unison
unison's
unit
unit's
unite
united
unitedly
uniting
unity
unity's
universal
universality
universality's
universally
universe
university
university's
uranium
uric
urinal
urinary
urinate
urinated
urinating
urine
urine's
urines
usable
usage
usage's
use
use's
used
useful
usefully
usefulness
useless
uselessly
uselessness
user
user's
using
usual
usually
usurer
usurer's
usurious
usurp
usurpation
usurpation's
usurper
usurper's
usury
usury's
utensil
utensil's
uterine
uterine's
uterus
uterus'
utilitarian
utilitarianism
utilitarianism's
utility utility's
utilizable
utilization
utilization's
utilize
uvula
uvula's
uvular

TABLE 2

'em
'un
F
F's
H
H's
H-bomb
L
L's
LSD
M
M's
MP
MP's
N
N's
NB
NHS
R
R's
S
S's
SOS
X
X's
X-ray
Xmas
Yvonne
f
f's
h
h's
hauteur
heir
heiress
heirloom
honest
honestly
honesty
honorarium
honorary
honorific
honor
honorable
honorably
honour
honourable
honourably
hour
hourglass
hourly
l
l's
m
m's
n
n's
nb
r
r's
s
s's
x
x's From the above it will be appreciated that a portion of the subject invention revolves around recognition that it is the initial sounds which are uttered when pronouncing a word that is important in determining the correct use of the indefinite article.

Having first established a limited list of exceptions, the following three rules are applied. The first rule applies when the word following the indefinite articles "a" or "an" starts with the characters "eu". In which case, the indefinite "a" should be used. The second rule applies when the word following the indefinite articles "a" or "an" starts with vowel character, "a", "e", "i", "o" or "u". In which case, the indefinite article "an" should be used. The third rule applies when the word following the indefinite articles "a" or "an" starts with consonant character. In which case, the indefinite article "a" should be used.

Figure 3:
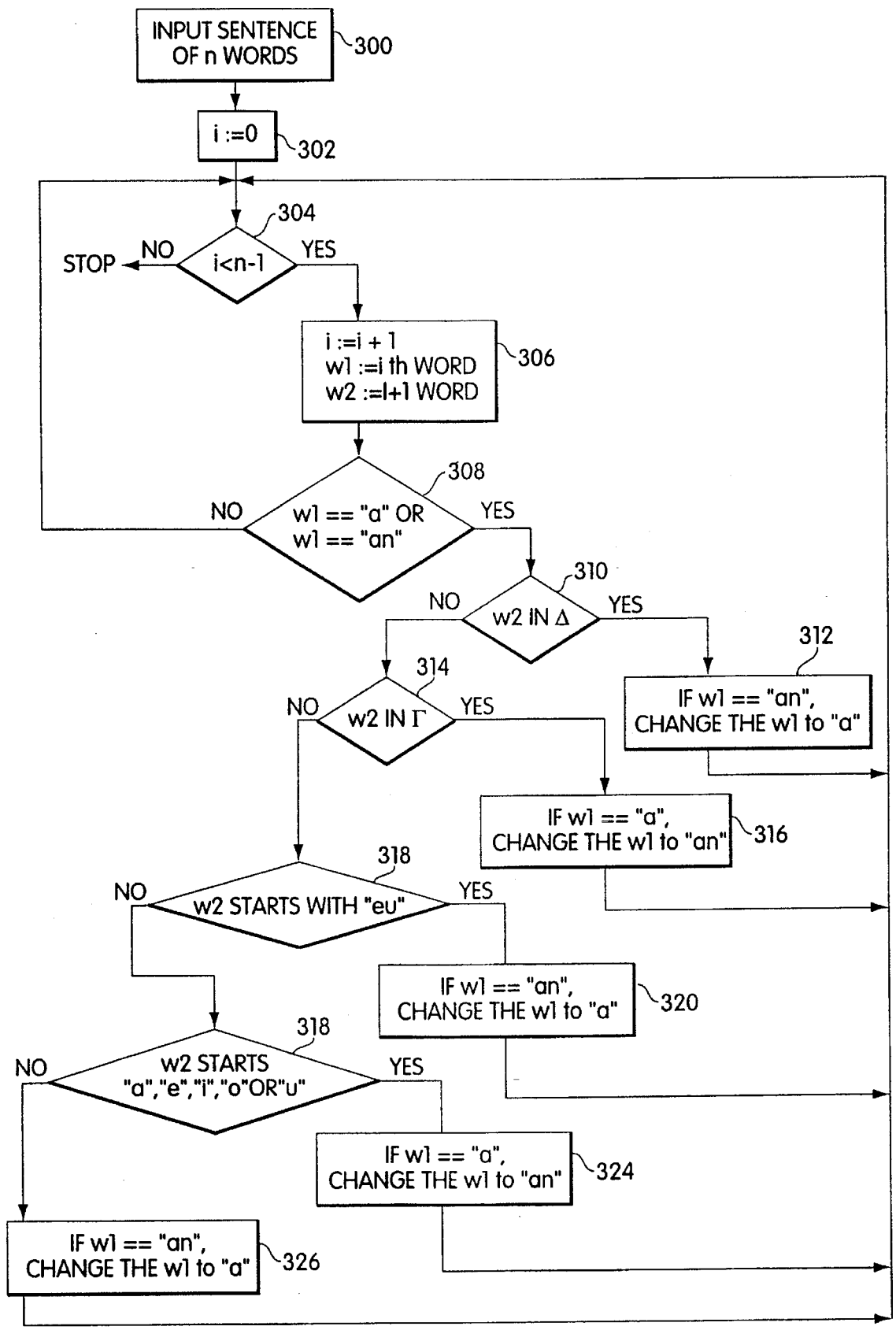
FIG. 3 is a flow chart illustrating the correction of the definite articles "a" and "an" utilizing specialized tables of English exceptions based on the way that words are pronounced as opposed as the way that words are spelled to derive the proper usage of the article.

Referring to FIG. 3, each word w1 of an input sentence 300 and the word following it w2 are established by keeping track of the position of the current word i in the input sentence as determined by blocks 302, 304, 306. If the current word is not "a" or "an" as established by 308, the algorithm goes to the next word through blocks 404, 306. If the current word w1 is either "a" or "an", and the next word w2 is found in Table 1 as established by block 310 then the current word w1 must be corrected to "a" if needed as specified by 312. If the next word w2 is not found in Table 1 but is found in Table 2 as established by block 314, then, the current word w1 must be corrected to "an" if needed as specified by 316. Otherwise, if the next word starts with the letters "eu" as established by block 318, then, the current word w1 must be corrected to "a" if needed as specified by 320. Otherwise if the next word w2 starts with "a", "e", "i", "o" or "u" as established by block 322, then, the current word w1 must be corrected to "an" if needed as specified by 324. Otherwise, the current word w1 must be corrected to "a" if needed as specified by 326.

c) Correction of Incorrect Auxiliary-Verb Sequences

As mentioned here and before when non-native speakers try to write English text they often use an incorrect tense in a complex auxiliary-verb sequence. An example is "he has consider". Here the incorrect usage is the tense of the verb "consider". None of the current grammar checking systems check for auxiliary-verb sequences due to the apparent difficult in recognizing such sequences and also due to the fact that part of speech tags are usually not computed.

In the subject system, and referring now to FIG. 4, a sentence 410 is analyzed by a part of speech tagger 412. to derive the parts of speech of the sentence involve as illustrated at 414.

In order to detect the error, one has to detect both the ending point and the beginning point of the incorrect auxiliary-verb sequence. For instance, in the sentence "He has been consider this fact" it is important to detect the end of the error namely "consider" which is the fourth word in the sentence. All words after "consider" namely "this fact" do not affect the correctness of the auxiliary-verb sequence. Likewise, it is important to detect the starting point of the error namely "has" which is the second word in the sentence. All words before "has" are irrelevant to the determination of the correctness of the auxiliary-verb sequence.

Figure 4A:
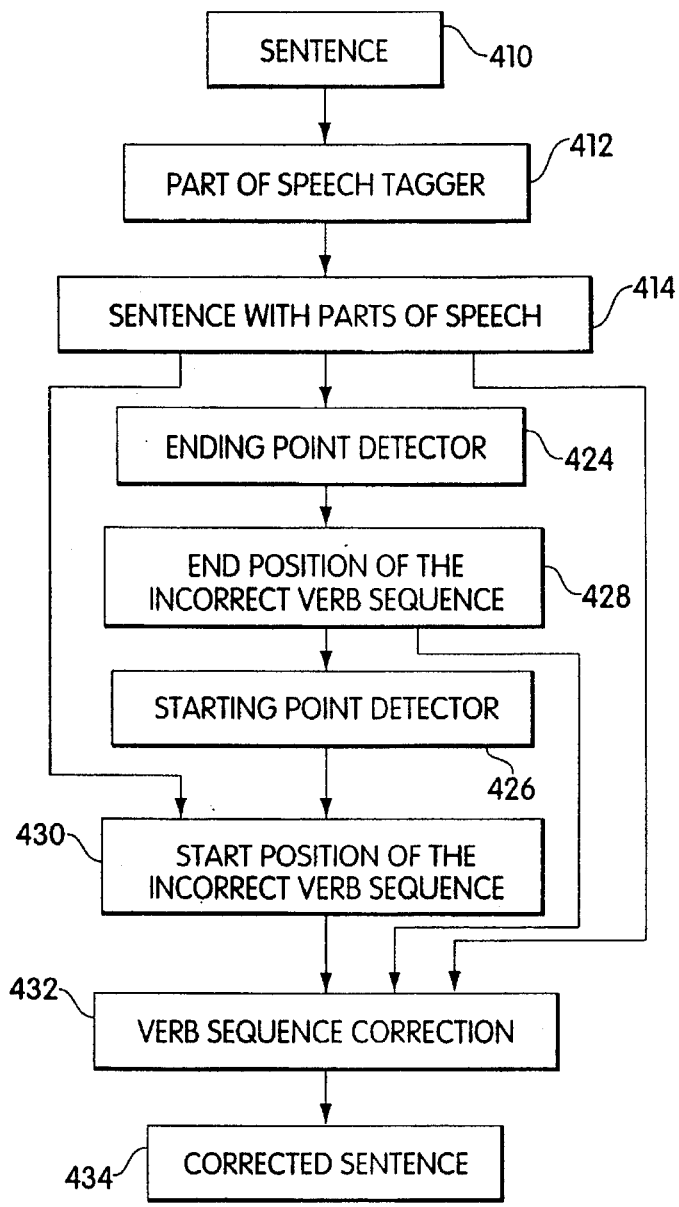
FIG. 4A is a block diagram illustrating the correction of incorrect auxiliary verb sequences through the utilization of a starting point and ending point detector to achieve a corrected sentence.
Figure 4B:
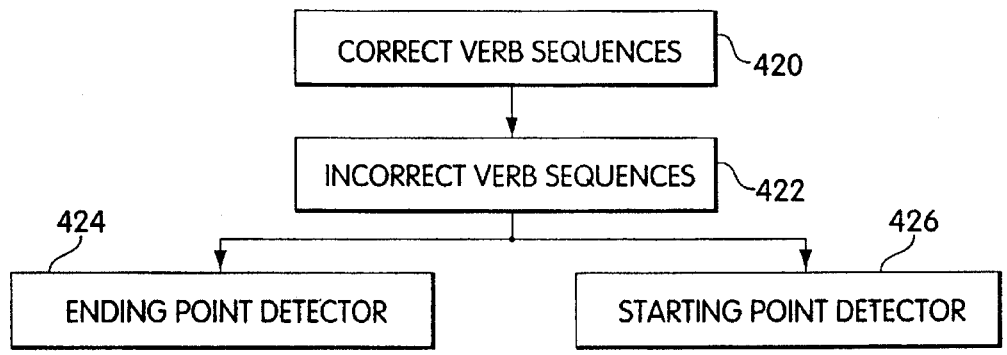
FIG. 4B is a block diagram of the construction of the starting point and ending point detectors of FIG. 4A utilizing a directed acyclic graph representing correct verb sequences.

Having generated the parts of speech of the sentence, an ending point detecting 416 is utilized to compute the end position of the incorrect auxiliary-verb sequence. In order to detect the end of the incorrect verb-sequence and as can be seen in FIG. 4B as indicated at 420, all correct part of speech sequences of all auxiliary-verb sequences are stored in a directed acyclic graph shown in FIG. 4C to be described hereinafter.

From the directed acyclic graph of all correct auxiliary-verb sequences, another directed acyclic graph corresponding to all possible incorrect auxiliary-verb sequences is generated at 422. Having the graph corresponding to 422, this graph will contain the incorrect auxiliary-verb sequence "have-3rd-person verb-infinitive". This corresponds to the incorrect auxiliary-verb sequence "has consider". In order to detect the ending point of the error, the graph is traversed from left to right until an end state is reached while the input string is read from left to right. Since the parts of speech correspond to words in the input sentence, when the input sentence parts of speech are read into the incorrect auxiliary-verb sequence graph, when the graph reaches a final state, this uniquely identifies the word at the end of the auxiliary-verb sequence in question. The identification of this word in term of its position in the sentence is then indicated by ending point detector 424.

Likewise, starting point detector 426 detects the word corresponding to the starting point of the auxiliary-verb sequence in question. This is accomplished by having detected the end point of the error and working backwards in the graph from right to left until one reaches the starting state of the graph. For instance, going from left to right, the system has identifies has as have-3rd-singular and consider as verb-infinitive. The system has detected that there is an error at this point and has identified the word "consider" as being the last word in the incorrect auxiliary-verb sequence. Then, moving backwards in the graph and in the input string, one goes past "consider" and past "has". This reaches the beginning of this particular graph and therefore identifies the word "has" as being the first word in the auxiliary-verb sequence.

Referring back to FIG. 4A, having determined the ending point of the auxiliary-verb sequence, the end position of this incorrect sequence is determined at 428 as the position of the last word in the incorrect sequence of the input sentence, likewise, the starting position of the incorrect sequence is determined at 430 as the position of the word starting the incorrect sequence as a number reflecting its position in the input sentence. As illustrated at 432, another directed acyclic graph illustrated in FIG. 4D specifies a set of possible correct sequences for each incorrect auxiliary-verb sequence. Unit 432 then runs through the incorrect auxiliary-verb sequence into the directed acyclic graph illustrated in FIG. 4D and outputs a set of possible correct auxiliary-sequences for view by the user as illustrated at 434.

Figure 4C:
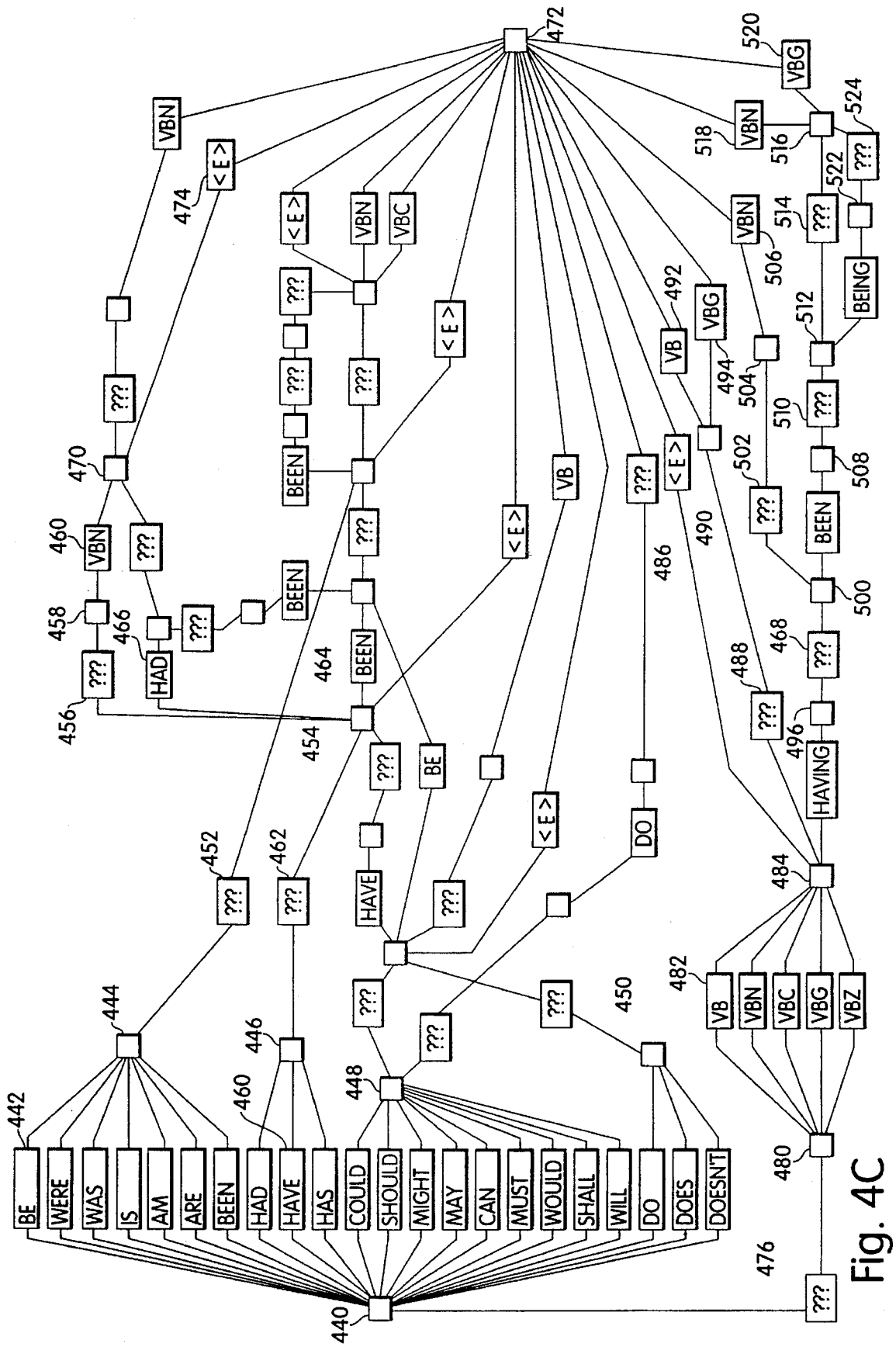
FIG. 4C is a directed acyclic graph representing the set of correct auxiliary-verb sequences of the English language.

Referring to FIG. 4C, a directed acyclic graph describing the set of correct auxiliary-verb sequences is constructed as follows for all possible auxiliary-verb sequences. As can be seen in FIG. 4C, at the left hand side of the graph from its starting point 440 are boxes 442 which contain all of the auxiliary verbs in the English language such as "be", "were", "was", "is", "am", "are", "been", "had", "have", "has", "could", "should", "might", "may", "can", "must", "would", "shall", "will", "do", "does" and "doesn't", "did". It will be appreciate that the words "be"-"been" are associated with node 444. In general a node specifies that the verbs that can follow those auxiliary verbs are the same. For instance, "is" can be followed by the word "being" as can the word "were" e.g. "were being". Thus the node 444 indicates that there is a set of auxiliary verbs for which following verbs can be the same. For instance node 446 associated with the set of words "had", "have" and "has" can be followed by the word "been". Similarly for node 448, the words "could"-"will" can be followed by the word "have". Also, these words can be followed by the word "do". Finally, node 450 specifies that the words "does", "do", "doesn't" can be followed by "have" but not by "do".

This way of graph English usage in fact assimilates all of the rules into a compact graphical representation so that correctness of incorrectness of auxiliary-verb sequences can be obtained.

As can be seen there exists boxes labeled "???" which follow the aforementioned nodes. For instance, box 452 It will be remembered that the input to this graph is a sequence of word followed by part of speech. This in essence tags the input with two variables. In order for the graph to remain compact the symbol "???" stands for anything not described at this node. Referring to node 454, box 456 indicates anything but "been" and "had" can go to node 458. Thus it can be seen that the utilization of a "???" box stands the ability to connect to the next node any symbol not described on the output of the state.

In addition to words, the input sentence also involves parts of speech. For instance, when the system analyzes the sequence "have considered", this graph is compared with the sequence "have have considered vbn" in which "vbn" stands for the past participle form. One start at the left hand side of the graph and finds the word "have" as illustrated at 460. From there, one moves to the right past node 446 to box 462 which as described above permits the passage of this word to node 454. From node 454 the possibilities are "been" at 464 or "had" at 466, neither of which match the input sentence. The other alternative is to go to box 456 which permits passage to the right to node 458 and then to the box 460 which specifies "vbn" standing for the past participle form. This permits the passage to node 470. The word considered is deemed to be acceptable because the analysis has passed through box 456 such that the sequence "have considered" is allowed to go to the end point 472 of the graph. Between the intermediate node 470 and end point 472 is a block 474 with the symbol<E> denoting an empty word. The use of <E> denoted box indicates that one can pass from one node to a following node without consideration of such things as a following word or a following part of speech.

For words which are not found in boxes 442, they can be analyzed by passing them through box 476 and node 480 to parts of speech box 482 and thence to node 484. Box 486 provides an arc to end point 472 if appropriate or passed node 484 through box 488 to node 490 and thence to part of speech box 492 or 494 prior to arriving at end point 472. Finally, node 484, if coupling the word with having passed to node 496 and box 498 to node 500. Box 502 passes node 484 via node 504 to part of speech box 506 and then to end point 472 if appropriate. If the word at 484 is to be coupled to both "having" and "been" it is passed to node 508 through box 510 to node 512 and thence through box 514 to node 516. Thereafter it is either part of speech 518 to end point 472 or box 520. Thus proper usage of the input word "having" "been" is determined as correct if it reaches end point 472 via the route previously noted above. If however the word "being" is to be added to this sequence the output of node 512 is passed to node 522 and box 524 to node 516.

In summary, the direct acyclic graph specifies all correct auxiliary-verb usages. Consequently, a similar graph can be constructed of all incorrect auxiliary-verb sequences. Thus having constructed a graph representing all correct usage, one instantly has a graph representing all incorrect usage. The compactness of this approach is exceptionally efficient in the analysis of sentences as can be seen from the instruction set of Appendix B.

Figure 4D:
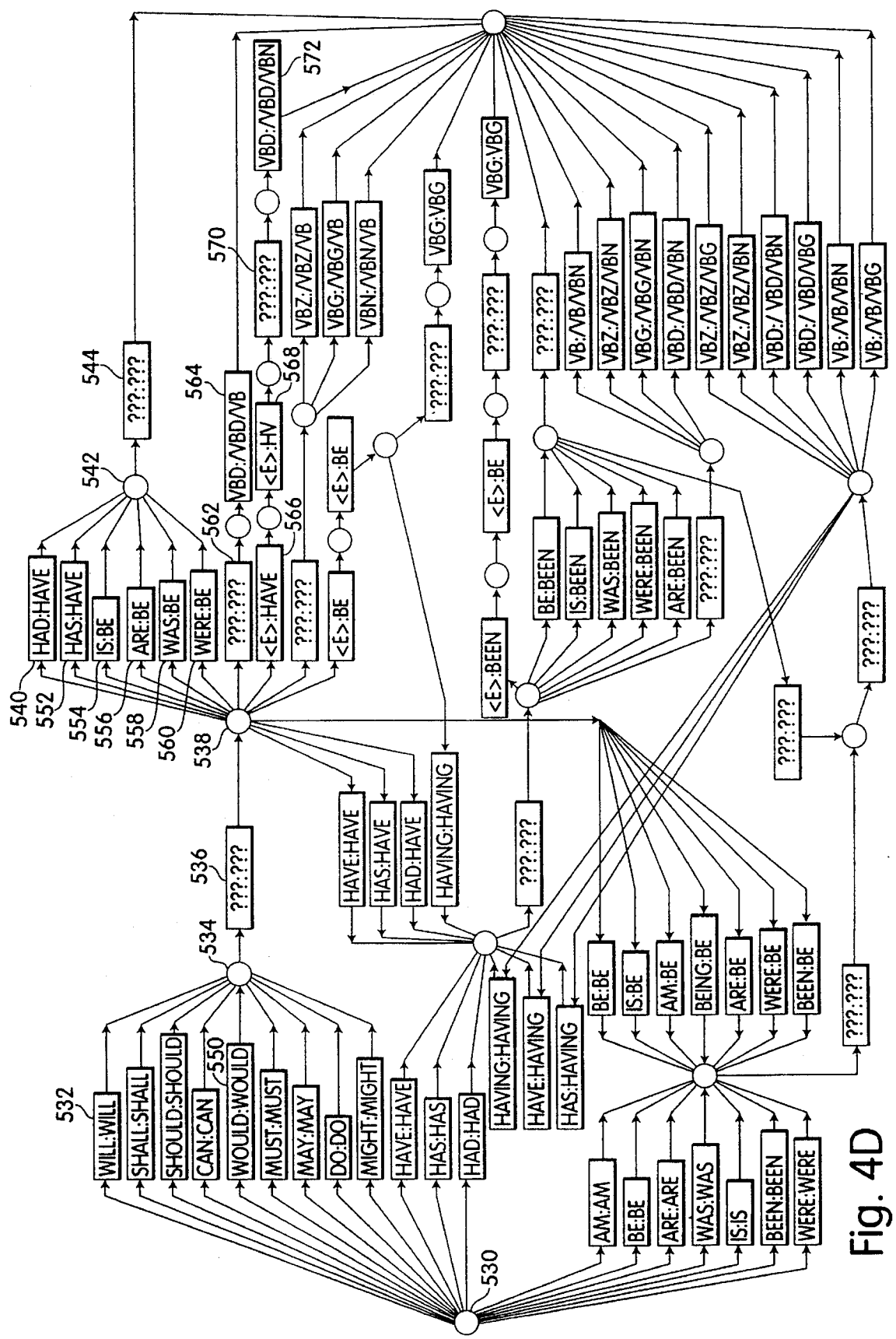
FIG. 4D is a directed acyclic graph representing a finite state transducer for proposing corrections for an incorrect auxiliary-verb sequence.

Referring now to FIG. 4D a finite state transducer in the form of a directed acyclic graph is utilized for proposing corrections for incorrect auxiliary verb sequences as determined by the acyclic graph of incorrect verb sequences generated above. In order to propose appropriate corrections the auxiliary verbs are paired such that the left word in each pair is identified as being incorrect, and the right word is the correction. For instance, having identifies that the auxiliary verb sequence "will had" is incorrect the graph of FIG. 4D is utilized for specifying a correct sequence. Starting with an input node 530 one is permitted to go through box 532 with the left of this box is the same as the first word of the input. Having passed through nodes 534 and box 536 to arrive at node 538 the word now considered is the word "had". Box 540 indicates that "had" should be changed to "have" which fact is outputted to node 542 and thence through box 544 to end point 546. Having reaches end point 546 by this path the correct sequence suggested is "will have".

A more complicated case is one considering the incorrect sequence "would considered". The corresponding part of speech tags is "would would considered vbn". In this case one first reaches node 534 by having passed through box 550 denoting "would;would" and through box 536 to box 538. Here none of the boxes 540, 552, 554, 556, 558 or 560 apply. This is because none of these boxed have the word "consider" in. Note that via box 562 an appropriate and correct proposal via part of speech analysis box 564 is "would consider". This was arrived at because the graph detects that "considered" is a part tense of the word "consider" This box suggest the present tense be used and therefore suggest the word "consider". The analysis is denoted by "vbd:/vbd/vb". Note that vbd means past tense and vb means present tense. There are alternative nodes from node 538 which provide other correct changes to the input. For instance, the suggested sequence could "would have considered". Here box 566 specifies that the word "have" should be added. Box 568 specifies that the part of speech of "have", hv, should added also to the sets if tags. After proceeding through box 570 box 572 specifies that the past tense form should be transformed to the past participle form. In that case the word "considered" remains unchanged because it is both a past tense and a past participle. If the input word had been "knew" as opposed to "considered" then box 572 would have specified a change from "knew" which is the past tense to "known" which is the past participle.

The remainder of the graph of FIG. 4D is self explanatory to provide various suggested changes to incorrect verb sequences once having determined that they are incorrect. The program listing for this graphical sequences is presented in Appendix C.

d) Inflection Correction for Non-Native Speakers

As is common, spell checking systems typically detect a misspelled word through a dictionary lookup algorithm. While this is successful in detecting misspellings typically due to inadvertent key strokes or character transpositions, these systems are ineffective for other types of spelling errors. Most notably, spelling errors of non-native speakers or not usually inadvertent transpositions of letters in word, or inadvertent character insertion or omission, they are mainly due to grammar problems. For instance, taking the sentence "He drived his car yesterday", the error is not one of either inadvertence or lack of knowledge of a particular spelling, but rather an uncertainty as to the past tense of the verb "drive" in this case.

Typically, spell checkers suggest proper spellings based on the distance between the mistyped word and a word in the dictionary. The distance is typically based on the number of characters which would have to be replaced, inserted, transposed, or deleted. The result is oftentimes curious. For instance, while in the above example the correct suggestion would be the past tense of "drive", namely "drove", current spell checkers suggest "dried", and "dripped" amongst others. It is interesting to note that the correct word "drove" is not suggested. This is because current spell checking systems do not analyze detected spelling errors in terms of grammar.

Another example of the difficulty present systems have in the suggestion of proper spelling includes improper comparative adjectives. For instances a nonnative speaker in selecting the comparative for "good" will oftentimes select gooder based on the usual rule for forming the comparative adjective. As a further example, a non-native speaker when wishing to form the plural of the noun "child" might select the word "childs" as opposed to "children" based again the usual pluralization rule involving in the addition of "s" to a singular noun.

To indicate the inability of current spell checkers to suggest appropriate words in the above example, a typical spell checkers suggest the following words, non of which are correct in context: "chills", "child's", "chill's", "child", "tildes". An even more inadequate suggestion by current spell checker, is the suggestion of how to properly spell "goodest" namely: "gooiest" and "goosed".

These types of errors not only are annoying to native-speaking individuals causing them to refuse to use the spell checking function, the level of frustration for non-native speaking individuals is even higher when forced to select amongst words unfamiliar in or out of context.

Figure 5:
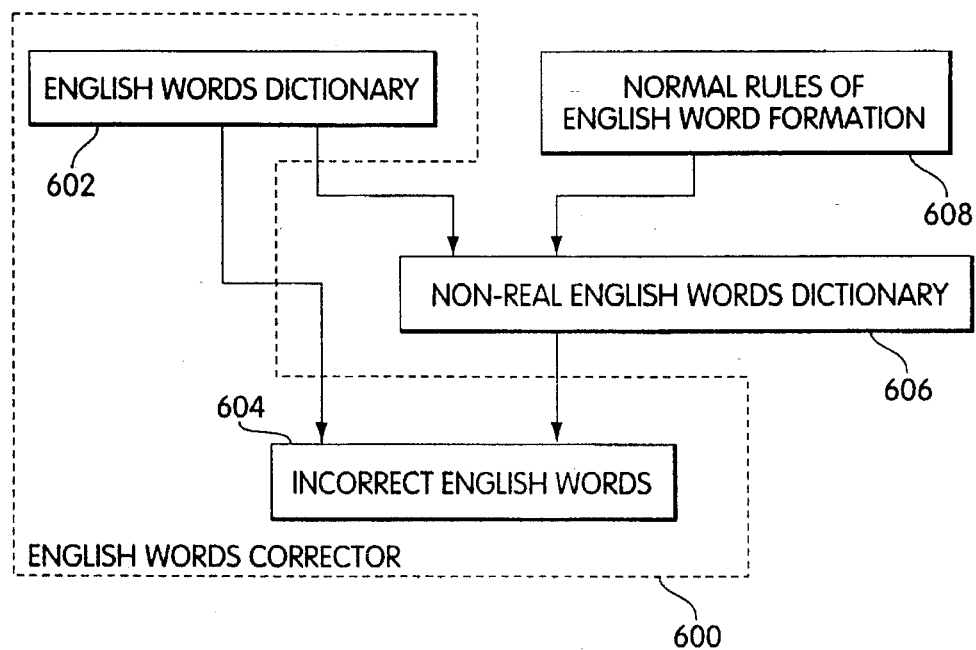
FIG. 5 is a block diagram illustrating an improved spell checking system for non-native speakers in which a list of incorrect words corresponding to a non-real English word dictionary is computed based on normal rules of English word formation applied systematically to all English words.

Referring now to FIG. 5 in the Subject Invention, it is important to identify typical examples of words which do not follow normal rules either as to pluralization, past tense, past participle, comparative formation, superlative formation. It is from this unique list of incorrect words generated on the basis of grammar that the subject system suggest more suitable replacement words. The subject spell checking system operates normally to detect misspellings by a dictionary lookup system. Thereafter, correct words are suggested based on both the compendium of typical incorrect words and root and morphology features as will be discussed below.

In FIG. 5, an English words corrector 600 includes an English words dictionary 602 and a list of incorrect English words 604 generated by comparing at 606 words from the English word dictionary 602 and a dictionary 608 generated by normal rules of English word formation. The result of the comparison is the above mentioned unique listing of troublesome words based not on spelling mistakes but rather on incorrect grammar.

Figure 6:
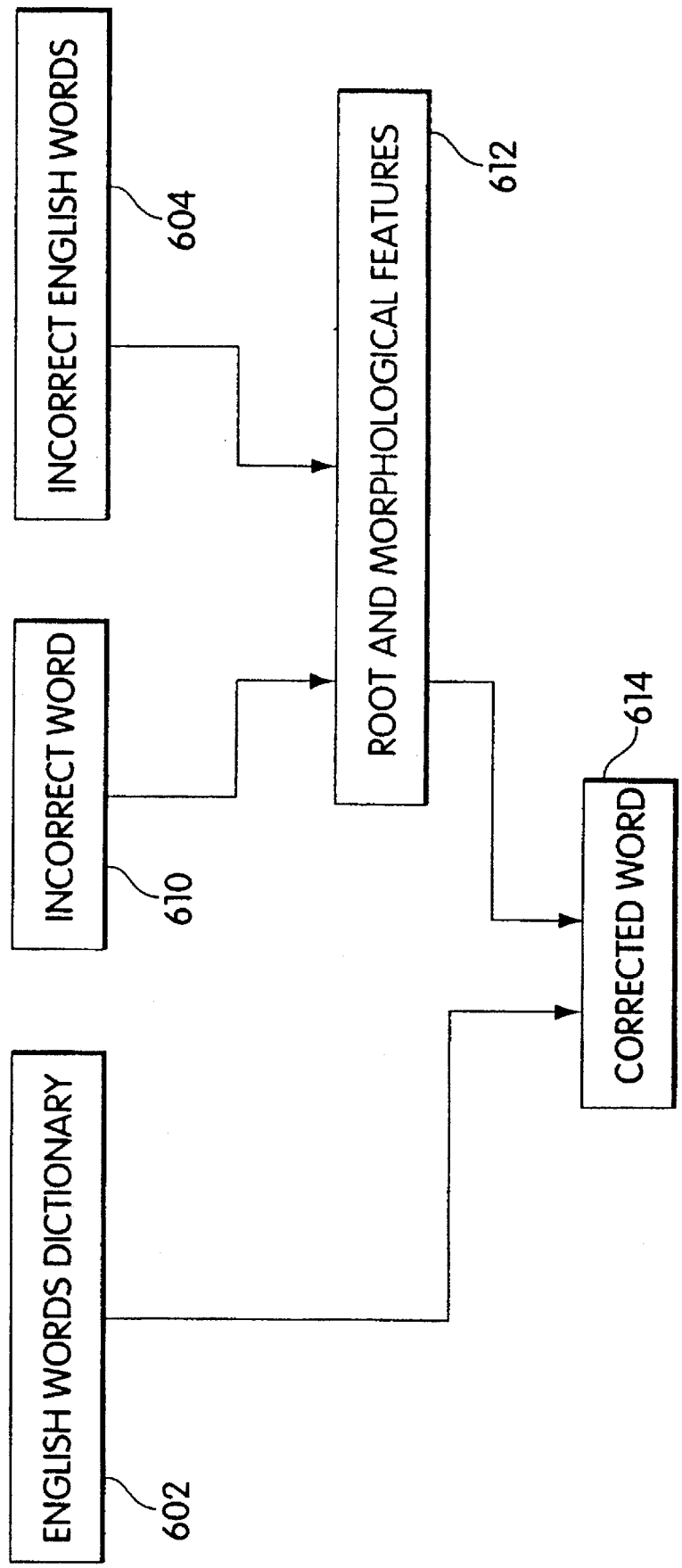
FIG. 6 is a block diagram illustrating the process of correct detected incorrect words utilizing the incorrect word dictionary derived from the system of FIG. 5 as well as an English word dictionary in which root and morphological features are utilized in the analysis of the detected incorrect word with respect to a list of previously generated incorrect English words.

Referring now to FIG. 6, in the process of actually correcting detected incorrect words, English words dictionary 602 is used along with the list 604 of incorrect English words previously generated as discussed in connection to FIG. 5. The detected incorrect word is available at 610, derived conventionally through dictionary lookup. Both the incorrect word which has been detected and the list of incorrect English words is applied to a unit 612 which determines the root of the incorrect word and its morphological features such as tense, number, comparative vs. superlative forms. For instance if the incorrect word "drived" the root form of this word is "drive" and its morphological feature is "past tense or past participle". The root and the morphological features are provided to a unit 614 which correlates the root and the morphological features with the corresponding English words in the English words dictionary 602 to provide a suggested corrected word thereby taking into account both rules of grammar and exceptions there too.

In essence, the system having derived the root and morphology based on typical incorrect usages is now capable of suggesting appropriate words correlated with these uncorrected usages. The system does provide a sophisticated lookup having identified problem words which are problems due to grammar as opposed to simple misspellings. The program listing describing the process is contained in Appendix D.

It will be appreciated that a part of speech tagger can be beneficial in improving the accuracy of the words suggested by the system. For instance, where a misspelled word could either be a past tense or a past participle. An example is from the above is the correction of "drived" which could lead to "drove" or "driven". Knowing the way in which the "incorrect" word is used in the sentence can result in a proper selection based on parts of speech.

e) Detecting and Correcting Improper Usage of Determiners

One of the more difficult problems for non-native speakers is the problem of determiner usage. Determiners are words such as "the", "a", and "some" that determine the referent of a noun phrase. There are three categories of errors involving determiners. The first is the missing determiner. For example, the sentence, "John read book" is missing a determiner for the noun phrase "book". A second class of determiner errors is the use of extraneous determiners. An example is "John went to the New York". Here the determiner "the" is improper and is to be deleted. The third class of determiner errors is the lack of agreement between a determiner and the associated noun. For instance, "John read many book" illustrates the lack of agreement in number between "many" and "book".

In order to detect the improper use of determiners, part of speech tags are utilized in the analysis. The part of speech tagger is described here and above in connection with FIGS. 2A, 4A, 11, 12 and 14. As an example of a tagged sentence, consider the sentence "John read long novel". Here the tag for "John" is "proper-noun"; the tag for "read" is "verb-past"; the tag for "long" is "adjective"; and the tag for "novel" is "singular-noun".

Figure 7:
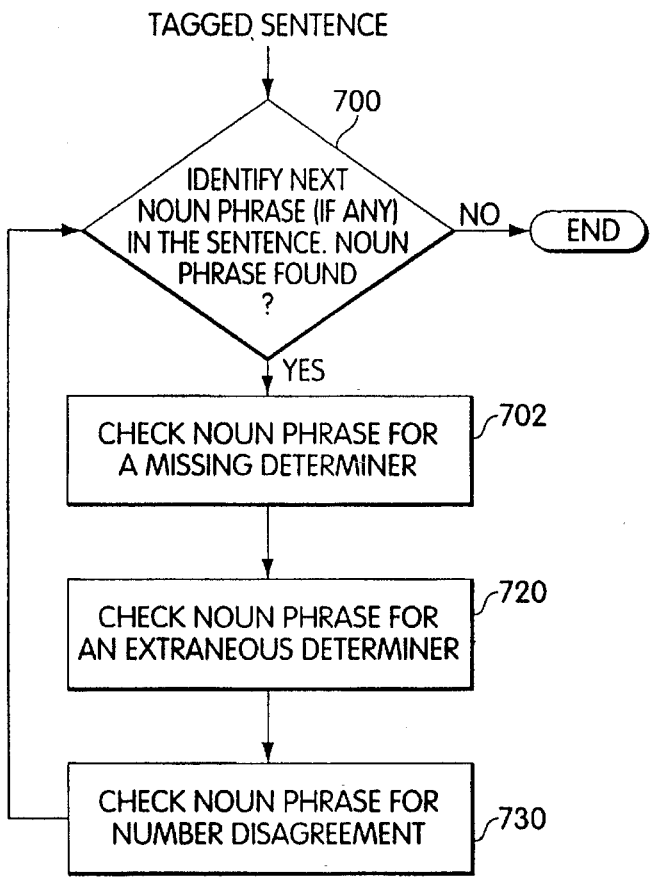
FIG. 7 is a flow chart for use in detecting and correcting the improper use of determiners in which noun phrases are identified by maximally matching a pattern that defines which sequences of part of speech tag constitute valid noun phrases including a check to ascertain a missing determiner, an extraneous determiner, or number disagreement.

As illustrated in FIG. 7, the system identifies noun-phrases as illustrated in decision block 700, which identifies noun phrases in the sentence by maximally matching a pattern that defines which sequences of part of speech tags constitute valid noun-phrases. The pattern for noun-phrases is given by:

[DET](MODS NOUN AND)* MODS NOUN$_{head}$ and the pattern for MODS is given by:

(MOD$^+$AND)*MOD where DET, MOD, NOUN, and AND are defined as sets of part-of-speech tags for determiners, modifiers, nouns and coordinating conjunctions, respectively. The notation [X] means zero or one occurrences of the enclosed expression X. The notation (X)* means zero or more occurrences of the enclosed expression X. A plus superscript, as in X$^+$, means one or more occurrences of the expression X.

The purpose of the above is for identifying noun phrases. For example, in the sentence given above, the noun phrases are "John", corresponding to the part of speech sequence "proper-noun", and "long novel", corresponding to the part of speech sequence "adjective singular-noun". The above uniquely identifies noun phrases by identifying the start of the noun phrase and its end, as can be seen by the program listed in Appendix E. It is of major importance that noun phrases be identified in order to check for either missing determiners, extraneous determiners, or lack of agreement in number for the constituents of the noun phrase.

Figure 8:
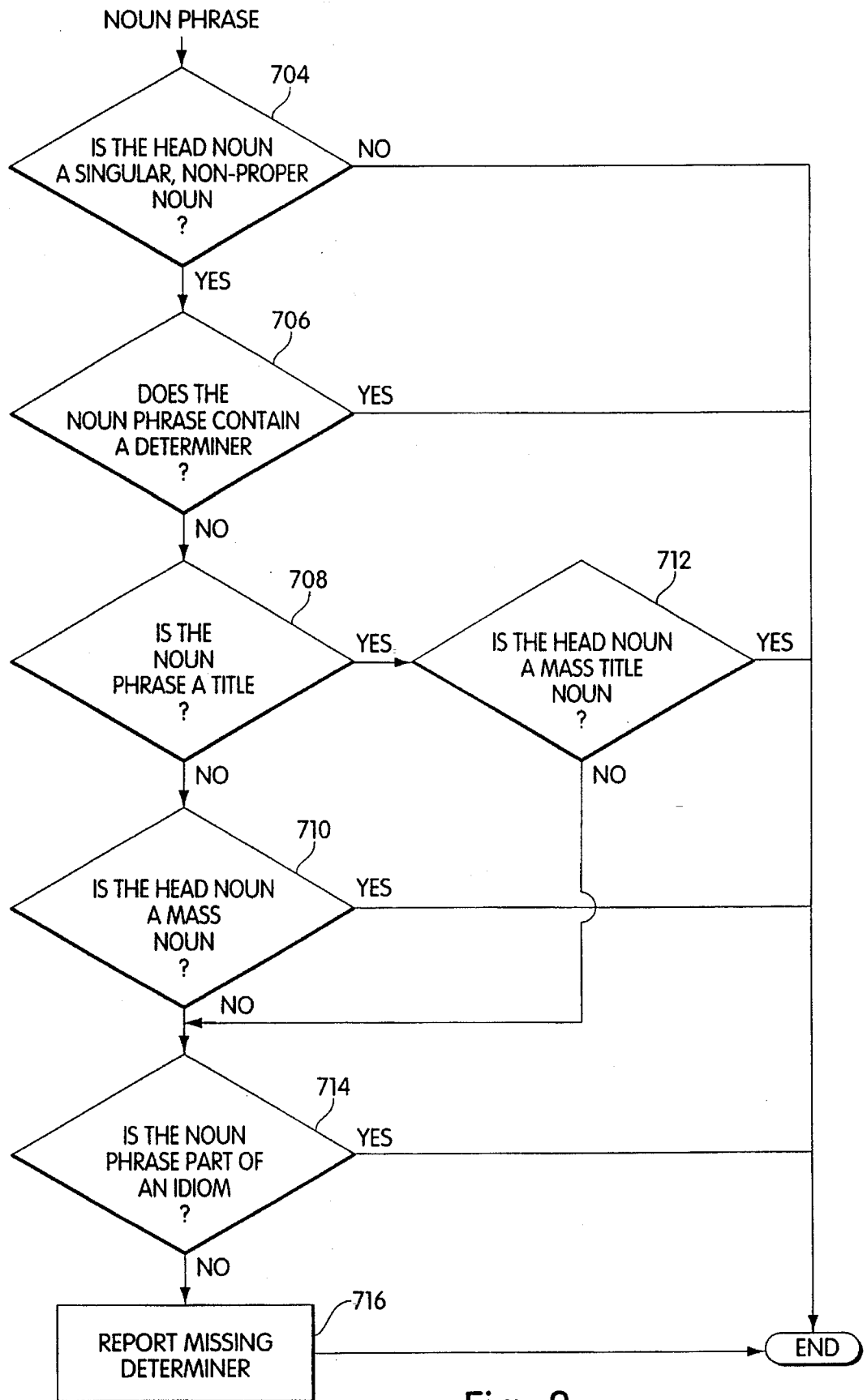
FIG. 8 is a flow chart illustrating the determination for a noun phrase of whether it is a title, if it contains a determiner, if it is a mass title noun, a mass noun, or a part of an idiom to permit reporting a missing determiner.

Once a noun phrase is found, as illustrated at 702, the system tests whether the noun phrase is missing a determiner. The test looks at the entire noun-phrase, NP, and also looks at the head noun, NOUN$_{head}$, which is the last word in the noun phrase. Head refers to the most important noun in the phrase and has been found to be the last word in most instances. The test for a missing determiner also looks at the determiner of the noun-phrase, DET, which either is the first word of the noun phrase or does not occur at all. If the head noun is a singular, non-proper noun, and DET is not present, as determined at 704 and 706 in FIG. 8, then the noun phrase is tested at 708 to see whether it is a title. A title is taken to be any capitalized phrase other than a proper noun; for instance, "The Atlanta Police Department" and "Grady Hospital" are titles. If the noun phrase is not found to be a title, then the head noun is tested to see whether it is a mass noun at 710. A mass noun is a noun that represents an unspecified quantity of a substance, for instance, "rice", "fish", or "carbon". It will be appreciated that mass nouns do not require determiners because they function effectively as plural nouns.

If the noun phrase is a title, then an analysis is done to ascertain whether the head noun is a mass title noun, as illustrated at 712. A mass title noun is analogous to a mass noun, but occurs in a title. For instance, in the sentence, "She attended Harvard University", the noun phrase "Harvard University" is a title, and "University" is a mass title noun. Note that "University" therefore appears in the sentence with no determiner. Observe also that mass title nouns are not the same as mass nouns. For instance, while "University" is a mass title noun, it is not a mass noun. This can be seen from the sentence, "She attended a fine university", where the noun "university" is given the determiner "a". It will thus be appreciated that no suggestions are made if it is determined that one has a mass title noun.

There is, however, a problem for idiomatic usage. As illustrated at 714, the noun phrase is analyzed to see if it is part of an idiom. This is done through lookup in an idiom dictionary. If the noun phrase is part of an idiom, again no suggestion is made. For example, in the sentence, "The event took place", no suggestion is made for the noun phrase "place", although it lacks a determiner, because it is part of the idiom "to take place".

For singular non-proper nouns which have no determiner, if the head noun is not either a mass noun or a mass title noun, and if the noun phrase is not part of an idiom, then the system suggests that there is a missing determiner, as illustrated at 716.

Referring now to FIG. 9, the system then checks the noun phrase 720 for an extraneous determiner. This is accomplished as follows. Whether or not the head noun is a proper noun is determined at 722 by introducing the noun phrase and ascertaining if a determiner is present as illustrated at 724. If the above conditions are met, it is determined that one has an extraneous determiner, as illustrated at 726. For example, "John went to the New York" would be indicated as having an extraneous determiner because the noun phrase "the New York" contains a head noun which is a proper noun and because there is a determiner, namely the word "the", in the noun phrase. Proper nouns are identified by the tagger which determines the existence of a proper noun based on probabilities and context.

Again referring back to FIG. 7, as illustrated at 730, the subject system then checks the noun phrase for number disagreement. How this is accomplished is illustrated in FIG. 10. The determination of number agreement is accomplished by introducing the noun phrase to a detector which determines whether the head noun in the noun phrase is a proper noun, as illustrated at 732. If it is, there can be no disagreement in number. This is because if a proper noun phrase contains a determiner, then it already will have been reported as an extraneous determiner error. Assuming that the head noun is not a proper noun, as illustrated at 734, the system determines whether or not the noun phrase contains a determiner. If not, there can be no problem of number disagreement.

As illustrated at 736, if there is a determiner, then the number of the determiner is checked against the number of the head noun, i.e., singular or plural. If they agree, then no error is signaled; whereas if they disagree, a suggestion is made to change the number of the head noun to agree with the number of the determiner. Thus for the sentence, "John read one books", it is suggested that the head noun "books" be changed to agree with the determiner, and is made singular. Likewise, for the sentence, "John read many book", the subject system suggests changing the head noun to plural to agree with the determiner. Alternatively, the system may be adapted to change the determiner as opposed to the head noun. However, this is a more unlikely course of action. The former yields better results because of the difficulty of ascertaining what the proper determiner should be. It is therefore assumed that the individual has properly entered the correct determiner as regards to number.

In summary, the subject system utilizes a number of techniques for detecting and correcting improper usage of determiners, through the utilization of a tagged sentence and the detection of noun phrases, head nouns, proper nouns, mass nouns, mass title nouns, and idioms. Critical to the proper determination of determiner misuse is the detection of noun phrases through the use of pattern matching described above in connection with FIG. 7.

f) Recognition of Proper Nouns and Other Intrinsically Capitalized Words

It is of some importance in the analysis of sentences to be able to recognize when a word is a proper noun, because it then behaves in a uniquely identifiable way as opposed to all other nouns. By having the ability to recognize not only proper nouns but also other intrinsically capitalized words, such as those that occur in titles, such as "Harvard University", sentences can be parsed and understood so that grammar can be analyzed.

A word may appear capitalized in an English sentence for two reasons. First, it is either a proper noun or other intrinsically capitalized word. Secondly, it occurs at the beginning of a sentence, or after certain punctuation, but would otherwise not be capitalized. As an example, considering the sentence, "Wells was an English novelist", it will be appreciated that "Wells" is capitalized because it is a proper noun. Considering the sentence, "Wells were dug to provide drinking water", "wells" is capitalized because it is the first word of the sentence.

Thus in the first sentence, a grammar-checking system must recognize that "Wells" is intrinsically capitalized and is therefore a proper noun. In the second sentence, the grammar-checking system must recognize that "wells" is not intrinsically capitalized and is therefore an ordinary plural noun.

In previous approaches to determining whether or not a noun is a proper noun, systems have applied relatively limited techniques to recognizing intrinsically capitalized words. One approach has been to assume that the first word of a sentence is never intrinsically capitalized. This fails as indicated by the first sentence and for any sentence that begins with a proper noun.

Another approach has been to classify every word as either a proper noun or an ordinary word, but not both. It will be apparent from the above two sentences that "Wells" can be both a proper noun and an ordinary word, causing this type of classification system to fail.

The obvious problem with failing to properly identify whether or not a word is a proper noun is that in dictionary lookup, the wrong definition will be retrieved. While in simple grammar checking, definitions are not required, sophisticated word-processing and grammar-checking systems which provide tutorial or informational data when determining proper usage require correct identification of proper nouns and other intrinsically capitalized words. Even when dictionary-lookup functions are not part of a grammar-checking system, recognition of proper nouns and other intrinsically capitalized words is important.

The importance of identifying whether a word is a proper noun or not affects the operation of the part-of-speech tagger which must accurately determine the part of speech of each word in a sentence through the use of trigram probabilities. Because the capitalized and uncapitalized versions of a word have different trigram probabilities, it is important for the tagger to know which version of the word is present in the sentence in order to apply the correct trigram probabilities. For example, the trigram probabilities for the proper noun "Wells" are different from the trigram probabilities for the ordinary noun "wells". Thus the tagger would have to realize that in the sentence, "Wells was an English novelist", the word "Wells" is a proper noun, and therefore it should apply the trigram probabilities for the capitalized version of "Wells".

In order to establish whether a word is an ordinary word, as opposed to a proper noun or other intrinsically capitalized word, the subject system determines which of the two interpretations of each word is the best one: the interpretation of the word as a proper noun, or the interpretation as an ordinary noun. It does this by generating two versions of the sentence, one assuming the noun is proper, the other assuming it is ordinary. It then compares the trigram probabilities of the two sentences. If the sentence assuming that the word is a proper noun has the higher probability, then the word is considered to be a proper noun. Otherwise the word is considered to be an ordinary noun.

Figure 11:
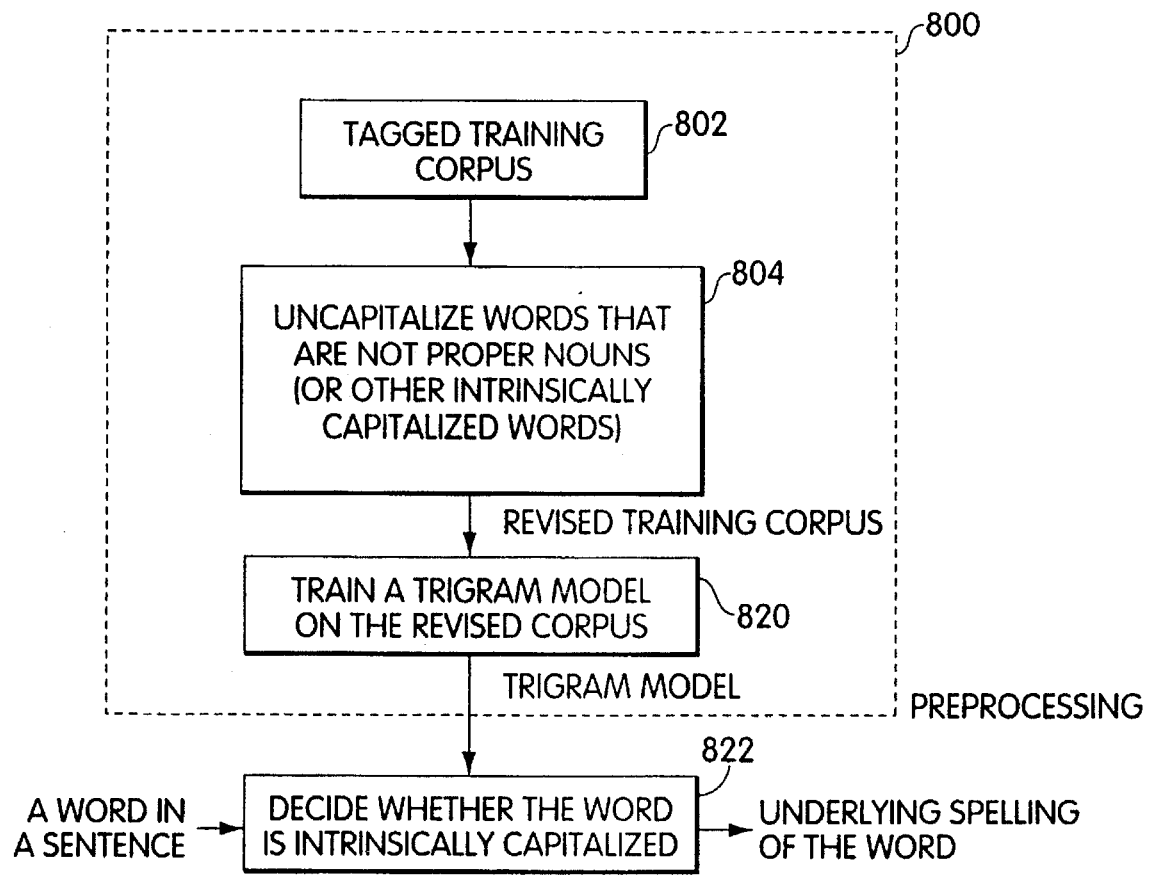
FIG. 11 is a block diagram illustrating a system for the recognition of proper nouns and other intrinsically capitalized word to recover underlying spelling of the word, in which a preprocessing module is utilized to ascertain whether or not a noun is a proper noun utilizing a training corpus revised to uncapitalized words that are not proper nouns or are not intrinsically capitalized, with a trigram model trained on the revised corpus.

Referring now to FIG. 11, in order to ascertain whether or not a noun is a proper noun, there are two steps to the decision-making process. The first step, as illustrated at 800, is a preprocessing step in which, as illustrated at 802, one starts with a tagged training corpus. This refers to a set of sentences in which the words of each sentence are annotated with their part-of-speech tags. Next, training corpus 802 is revised as illustrated at 804 to uncapitalize words that are not proper nouns, or, in general, are not intrinsically capitalized. A word is considered to be intrinsically capitalized if the word has been tagged as a proper noun or title, or if it is an acronym, or if it is the pronoun "I". Moreover, words are uncapitalized if and only if they occur at the beginning of a sentence, or after an open quote or colon.

Figure 12:
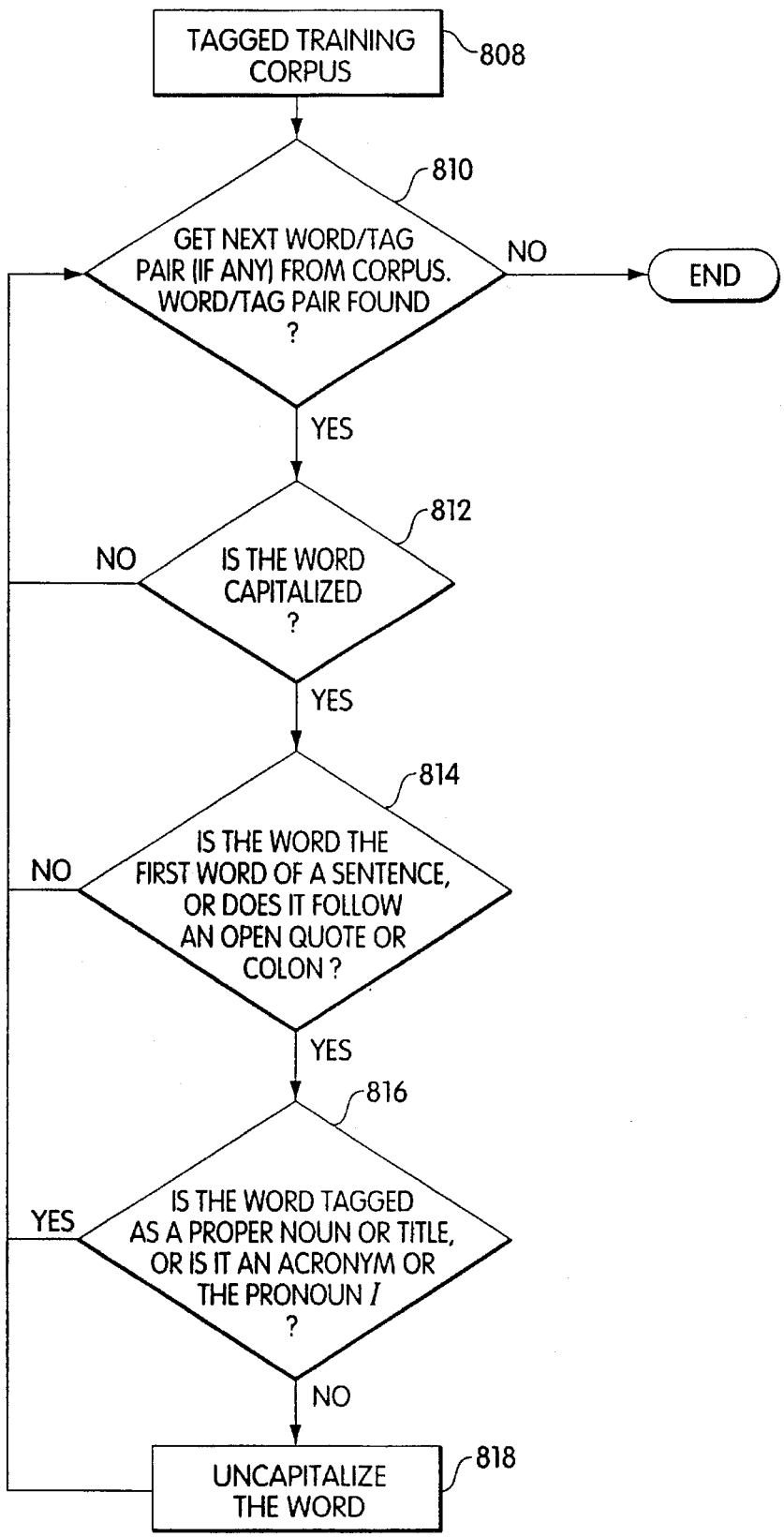
FIG. 12 is a flow chart illustrating the tagging of the training corpus of FIG. 11 which is utilized to obtain the next word/tag pair, to see if it is capitalized and if the word is the first word of a sentence or it follows an open quote or colon, also testing to see if the word has been tagged as a proper noun or title, or if it is an acronym or the pronoun "I" thereby to ascertain if the word is uncapitalized.

More particularly, as illustrated in FIG. 12, the tagged training corpus 808 is analyzed at 810 to obtain the next word/tag pair, if any, from the corpus. If one is found, the word is analyzed at 812 to see if it is capitalized. If the word is capitalized, as illustrated at 814, it is ascertained if the word is the first word of a sentence or if it follows an open quote or a colon. If so, as illustrated at 816, the word is tested to see if it has been tagged as a proper noun or title, or if it is an acronym or the pronoun "I". If it is not, then the word is to be uncapitalized in the revised training corpus as shown at 818.

Referring back now to FIG. 11, the revised training corpus is analyzed at 820 to obtain a trigram probability model of the words. This provides a modified trigram model to eliminate errors associated with misidentifying a word as a proper noun when it is in fact an ordinary noun, or vice versa. After having preprocessed the tagged training corpus to eliminate errors, the trigram model is utilized at 822 in the decision-making for determining whether the word in question is intrinsically capitalized. This requires as an input a word in the sentence, with the output being the underlying spelling of the word.

Figure 13:
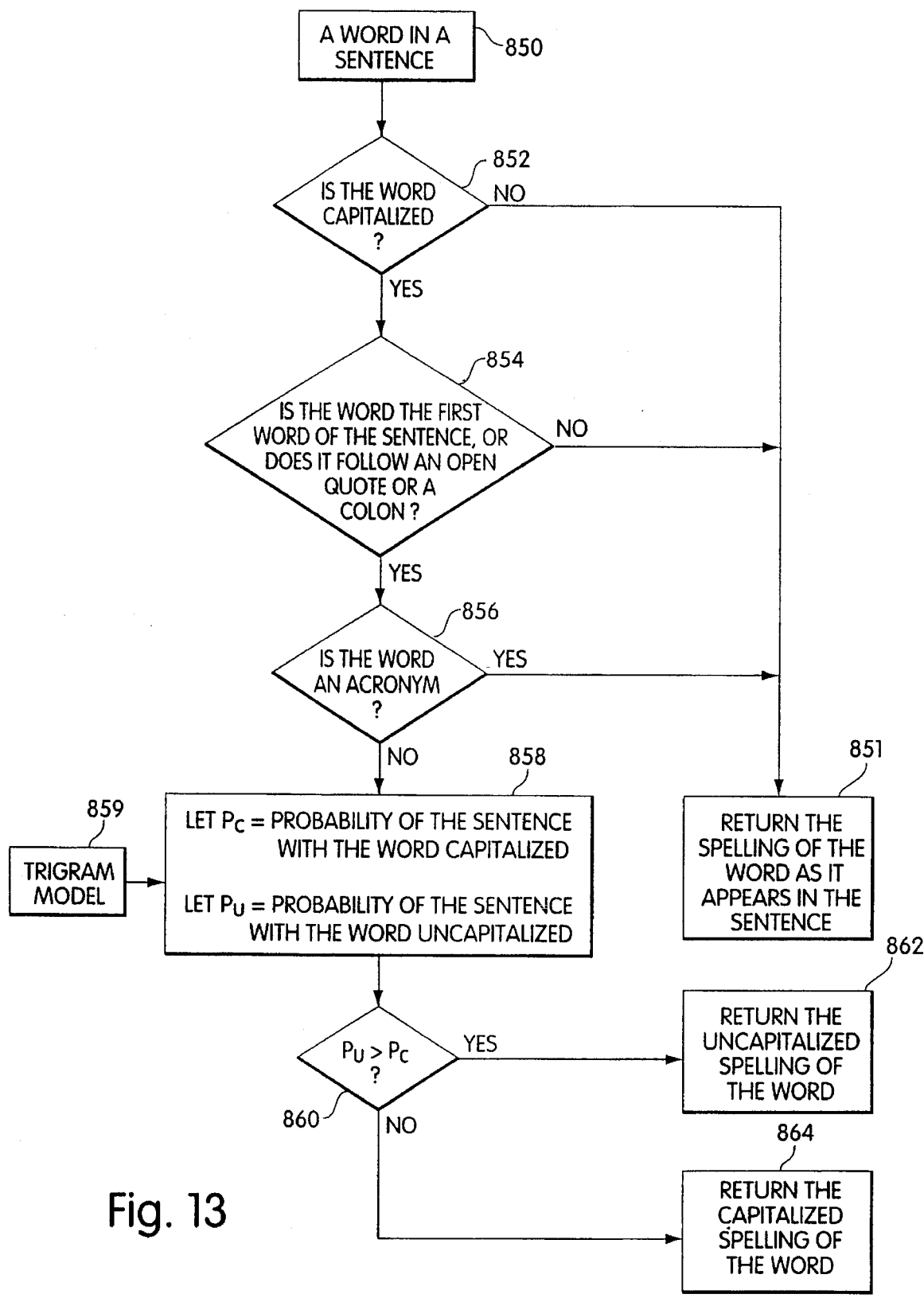
FIG. 13 is a flow chart illustrating the decision making process for determining whether the word is intrinsically capitalized as illustrated in FIG. 11 by analyzing whether the word is capitalized, if it is the first word of a sentence or follows an open quote or colon, if the word is an acronym, and if not the probability of the sentence with the word uncapitalized is determined to see if it exceeds the probability of the sentence with the word capitalized; and, FIG. 14 is a block diagram illustrating dictionary access based on context in which both a part of speech tagger and a morphological analyzer is utilized to determine which entries in the dictionary correspond to the word as it is used in context, and which entries in the dictionary do not correspond to the word as it is used in context.

As seen in FIG. 13, the decision-making process described at 822 to determine whether or not a word is intrinsically capitalized, starts with a word in the sentence, as illustrated at 850. This word is analyzed to determine if it is capitalized in that its initial letter is a capital letter. If not, as illustrated at 851, the interpretation of the word is that which is given literally by the sentence. That is, if it appears capitalized in the sentence, it is interpreted as a proper noun. If it appears uncapitalized in the sentence, it is interpreted as an ordinary word. Thus if the word is not capitalized, no special action is taken.

Now, assuming the word is capitalized, as can be seen at 854, it is determined if the word is the first word of a sentence or if it follows an open quote or colon. If not, no further action is taken. If so, as illustrated at 856, the word is processed further to ascertain if it is an acronym. An acronym is characterized by all of its alphabetic letters being capitalized or its existing in an acronym dictionary. If the word is determined to be an acronym, again there is no further processing.

If the word is not an acronym, then as illustrated at 858, the system calculates the probabilities of the two versions of the sentence, one with the word at issue treated as a proper noun, which is capitalized, and the other with the word at issue treated as an ordinary noun, which is uncapitalized, in accordance with the trigram model as illustrated at 859. The calculation is as described in accordance with the aforementioned part-of-speech tagger.

If, as illustrated at 860, the probability of the sentence with the word uncapitalized exceeds that of the sentence with the word capitalized, then the system returns the uncapitalized spelling of the word as the most probable underlying spelling, so that this spelling can be utilized for further grandmas checking. Otherwise, as illustrated at 864, the system returns the capitalized spelling of the word as the most probable underlying spelling.

The algorithms associated with the FIGS. 11–13 block diagrams is presented hereinafter as Appendix F.

What will be appreciated is that by recovering the underlying spelling of the word, grammar-checking systems can be made more accurate and more useful. The recovery of the underlying spelling involves two steps in which the first step corrects the part-of-speech tags of the training corpus for errors which are induced through the mischaracterization of whether the words are proper nouns or not. Secondly, a series of analyses are performed to ascertain whether the capitalized or uncapitalized spelling of the word is more appropriate. This is accomplished through decision-making elements which decide if the word is intrinsically capitalized using the revised trigram probability model obtained in the preprocessing step.

g) Dictionary Access Based on Context

When writing text, non-native speakers rely on the availability of a monolingual or bilingual dictionary. A dictionary is one of the most useful sources of information about language that non-native speakers rely on. It will be appreciated that the use of a dictionary is not confined to the problem of grammar checking but is generally useful when writing text. It will also be appreciated that even native speakers heavily rely on the use of a dictionary or a thesaurus when composing text.

Accessing an dictionary entry is not as simple as it may appear because words out of context are very ambiguous, both in their syntactic behavior and in their meaning. It will be appreciated that a given word in a dictionary may have typically as many as twenty, thirty or even more entries. This large number of entries make the usage of a dictionary very time consuming.

For example, out of context the word "left" has many entries in an English dictionary: entries for the adjective "left" as in the sentence "His left arm"; entries for the adverb "left" as in the sentence "he moved left on entering the room"; entries for the noun "left" as "Make a left at the next corner"; and entries for the past tense of the verb "leave" as in the sentence "He left a minute ago". However, when the word "left" occurs in an English sentence, only one of this entries is relevant to the context. Currently, no dictionary provides the ability to access the correct entries of a word based on context.

In the subject system, the entries of a dictionary are selected and ranked based on the part of speech assigned to the given word in context. The entries corresponding to the word in context are first selected. The other entries not relevant to the current context are still available at the request of the user. The part of speech of the given word in context is disambiguated with the part of speech tagger described above.

By way of illustration, assuming the word "left" in the sentence "He left a minute ago", the part of speech tagger assigns the tag "verb past tense" for the word "left" in that sentence. For this case, the Subject System selects the entries for the verb "leave" corresponding to the usage of "left" in that context and then selects the entries for "left" not used in that context, in particular the ones for "left" as an adjective, as an adverb and as a noun.

Assuming the word "bases" in the sentence "It has several bases", the part of speech tagger assigns the two tag "noun plural" for the word "bases" in that sentence. It will be appreciated that out of context the word "bases" can be the plural of the noun "basis", the plural of the noun "base", as well as the third person of the verb "base". For the context "It has several bases", the Subject System selects the entries for the nouns "base" and "basis" corresponding to the word "bases" in that context, and then selects the entries for "bases" not used in that context, in particular the ones for the verb "base".

Figure 14:
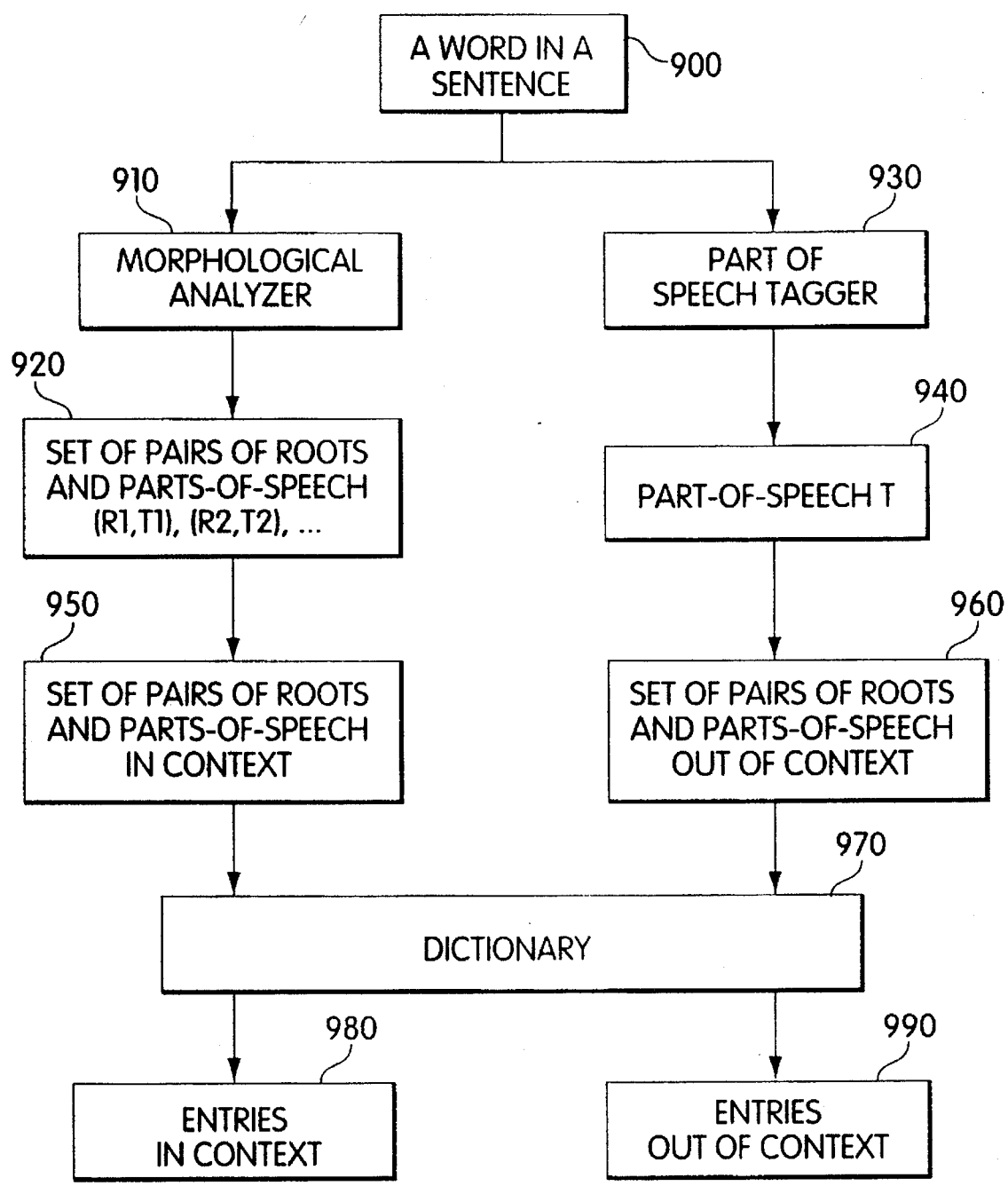

Referring now to FIG. 14, in order to select entries of a word occurring in a sentence 900 from a dictionary based on context, the word is analyzed by a morphological analyzer 910 which computes the set of pairs of root forms and parts-of-speech corresponding to the word independent of the context. As an example, for the word "left", the morphological analyzer will output the following set of pairs of root forms and parts-of-speech: ("left", "adjective"), ("left", "adverb"), ("left", "37 singular noun"), ("leave", "verb past tense"). Morphological analyzer 910 operates by looking up into a table indexed by all inflections of all words of English and whose entries are sets of pairs of root forms and parts-of-speech. The word is also analyzed by a part of speech tagger 930 in context in order to produce the unique Part of Speech Tag T 940 corresponding to the word in context. This is achieved by a part-of-speech tagger which is available as an implementation of Kenneth Church's Stochastic Parts Program described in "A Stochastic Parts Program and Noun Phrase Parser for Unrestricted Text" in the Proceedings of the Second Conference on Applied Natural Language Processing, Austin Tex., 1988.

For example, if the word is "left" in the context "He left a minute ago", the part of speech tagger outputs the part-of-speech tag "verb past tense". In order to separate the morphological roots that correspond to the context from the ones that do not correspond to the context, a unit 920 splits the set of pairs of roots and parts- of-speech 920 into two sets, a set 950 that corresponds to the part of speech tag 940, and the set 960 that do not correspond to the part-of-speech tag 940. In the previous example, the set of pairs of roots and parts-of-speech that correspond to the context is: "leave", "verb past tense". The set of pairs of roots and parts-of-speech that do not correspond to the context is: ("left", "adjective"), ("left", "adverb"), ("left", "singular noun"). In order to display the entries from the dictionary that correspond to the context, all the entries in a dictionary 970 that correspond to a root found in the set of pairs of roots and parts-of-speech that correspond to the context 950 are displayed at 980. In the above example, all entries for the verb "leave" will be displayed as entries relevant to the context. In order to display the entries from the dictionary that do not correspond to the context, all the entries in the dictionary 970 that correspond to a root found in the set of pairs of roots and parts-of-speech that do not correspond to the context 960 are displayed at 980. In the above example, all entries for the word "left" as an adjective, as an adverb and as a singular noun are displayed as entries not relevant to the context. A program listing for the above is available as Appendix G.

It will be appreciated that the ability of selecting entries from a dictionary based on context can be used for monolingual dictionaries as well as bilingual dictionaries, for native or non-native speakers. The subject system is able to select those entries relevant to the context therefore drastically reducing the number of entries that the user has to read.

Having above indicated several embodiments of the Subject Invention, it will occur to those skilled in the art that modifications and alternatives can be practiced within the spirit of the invention, It is accordingly intended to define the scope of the invention only as indicated in the following claims.

(appendixA.c)

```c
#include <stdio.h>
#ifdef MAC
#       include <stdlib.h>
#else
#       include <malloc.h>
#endif
#include <ctype.h>
#include <string.h>
#include <math.h>
#include <stdio.h>
#include "stdlib.h"
```

/*-----------------------------------------------------------------
|       Header file for tag.h                                     |
*------------------------------------------------------------------*/

```c
#ifndef _TAG_
define _TAG_ typedef unsigned int uint;
typedef short unsigned int postag;
typedef int wint;

#define MAXTAG      500     /* max number of tags */
define MAXTAGLN    20      /* max number of chars for a tag */ extern void ReadTextTag();
extern postag FindTagNum(char *tag);

extern char            *tags[MAXTAG];   /* all tags */
extern unsigned int    ntags;           /* number of tags */ endif
```

/*-----------------------------------------------------------------
|       Header file for maxlex.h                                  |
*------------------------------------------------------------------*/

```c
#ifndef _MAXLEX_
#define _MAXLEX_
```

/* The following number must be smaller than USHRT_MAX (65535) */

```c
#define MAXWORDS     53718
define MAXLEX       58610 define MAXLAST3     5000
define MAXLAST3LEX  11000 define MAXBIGRAMS   8000
define MAXBITABLE   400
```

(appendixA.c)

```
#define MAXTRIGRAMS 60500
define MAXTRITABLE 8610 endif

/*-------------------------------------------------------------------
|       Header file for hash.h                                      |
*--------------------------------------------------------------------
#ifndef _HASH_
define _HASH_ extern wint wordhash(char *s);
extern wint wordhashc (char *s);
extern wint last3hash(char c1, char c2, char c3);
extern wint last3hashc (char c1, char c2, char c3);
extern unsigned int bihash(postag i,postag j);
extern unsigned int trihash(postag i,postag j,postag k);

#endif

/*-------------------------------------------------------------------
|                                                                   |
|       Header file for misc.c                                      |
|       Defines miscellaneous utilities.                            |
|                                                                   |
|                                                                   |
*-------------------------------------------------------------------- ifndef _MISC_
define _MISC_ ifndef TRUE
define TRUE 1
endif ifndef FALSE
define FALSE 0
#endif

/* Macros to construct filenames in the gcheck directory tree.
   Example of usage:  GCHECK_SRC_FILE("dets.c")
   These macros can only be used by other #DEFINEs to define
   constant filenames. */
#define GCHECK_SRC_DIR        "/projects/gcheck/gc04"
#define GCHECK_DATA_DIR       "/projects/gcheck/gc04/data"
#define GCHECK_SRC_FILE(X)    GCHECK_SRC_DIR "/" X
define GCHECK_DATA_FILE(X)   GCHECK_DATA_DIR "/" X /* Macros to shorten Tcl declarations */
define DEF_TCL(x) int x (ClientData data, Tcl_Interp *interp, \
                          int argc, char *argv[])
#define TCL_CREATE(x,y) Tcl_CreateCommand(interp, x, y, (ClientData) NULL, \
```

(appendixA.c)

```
                    (Tcl_CmdDeleteProc *) NULL)

extern int prefix_p(char *prefix, char *string);
extern int suffix_p(char *suffix, char *string);
extern char *mystrdup(char *string);
extern char *mysubstr(char *string, int first, int next);
extern int next_token(char *line, int *first, int *next, char *separators);
extern int next_nonspace_token(char *line, int *first, int *next);
extern char **new_string_array(int n);
extern void free_string_array(char **strings);
extern int string_array_len(char **strings);
extern void *mymalloc(size_t n);
extern void *mycalloc(size_t nelem, size_t elsize);
extern void myfree(void *ptr);
extern char *strip_pos(char *pos);
extern void myerror();
extern int fsprintf();
extern int mystrcmp(char **s1, char **s2);
extern FILE *myfopen(const char *filename, const char *mode);
endif /*---------------------------------------------------------------
|       Header file for extern.h                                 |
*---------------------------------------------------------------*/ ifndef _EXTERN_
define _EXTERN_ define MAX_SENT    1000        /* max number of words in a sentence */
define MAXTAG      500         /* max number of tags */
#define MAX_INPUT   (MAX_SENT+2) /* max length of the input with right */
                                /* padding*/
#define MAXTAGLN    20          /* max number of chars for a tag */
#define MAXLINE     1000        /* max number of chars on a line */
#define MAXWORD     50          /* max characters in a word */
define MINLOGP     (-1E100)    /* minimum of log prob */ endif

/*---------------------------------------------------------------
|       Header file for sent.h                                   |
*---------------------------------------------------------------*/ ifndef _SENT_
define _SENT_ extern wordptr SENTENCE[];
extern int SLEN;
extern char RAW_SENTENCE[];

extern char *GetSpelling(int n);
```

(appendixA.c)

```
extern void InitSentence(void);
extern void SplitSentence(char *buf);
extern void TokenizeSentence(char *buf);
extern void add_word_to_sentence(word *wp);
extern int penult_capitalized_p(void);
extern int char_to_word_index(int char_i);
extern int word_first_index(int word_i);
extern int word_next_index(int word_i);
extern void FPrintSentence(FILE *stream);
extern void fsprint_np_bracketing(FILE *fp, char *str);
extern void sprint_np_bracketing(char *str);
extern void fprint_np_bracketing(FILE *fp);

#endif

/*----------------------------------------------------------------
 |    Header file for textlex.c                                  |
 *---------------------------------------------------------------- ifndef _TEXTLEX_
define _TEXTLEX_ struct lexinfo {
    postag pos;              /* part of speech */
    double lp;               /* log probability */
    struct lexinfo *next;    /* next lexinfo in the list */
    char *root;              /* root form */
};
typedef struct lexinfo *lexlist;

struct tri {
    postag i,j,k;
    double lp;
    struct tri *next;
};

struct bi {
    postag i,j;
    double lp;
    struct bi *next;
};

struct last3 {
    char c1,c2,c3;
    lexlist lex;
    struct last3 *next;
};

struct lexgc {
    struct lexinfo *car;
    struct lexgc *cdr;
};
```

(appendixA.c)

```
typedef struct lexgc *lexgclist;
typedef struct word *wordlist;
typedef struct tri *trilist;
typedef struct bi *bilist;
typedef struct last3 *last3list;

extern lexlist lexalloc(postag pos, double lp, lexlist next, char *root);

#endif
```

/*------------------------------------------------------------------
|       Header file for findbin.h                                  |
*------------------------------------------------------------------*/

```
#ifndef _FINDBIN_
define _FINDBIN_ extern lexlist bin_findword(char *wd);
extern lexlist bin_findlast3(char c1,char c2,char c3);
extern lexlist bin_findwordas(char *word, char *tag);
extern double bin_findbi(postag i, postag j);
extern double bin_findtri(postag i, postag j, postag k);

#endif
```

/*------------------------------------------------------------------
|       header file for word.h                                     |
*------------------------------------------------------------------*/

```
#ifndef _WORD_
#define _WORD_

/* Codes used in the 'annotations' field of 'word' structs */
#define START_NP    0x01
#define END_NP      0x02
```

/*------------------------------------------------------------------
|       Structure containing information about words               |
*------------------------------------------------------------------*/

```
struct word {
    char    *spelling;       /* the word itself */
    int     spelling_static; /* whether spelling dynamic or static */
    postag  tag;             /* code for part of speech tag */
    int     ood;             /* TRUE if out of dictionary */
    int     start;           /* index in sentence of 1st char of word */
    int     end;             /* index in sentence of 1st char after word */
    int     annotations;     /* for NP boundaries, etc.; see codes above */
} ;

typedef struct word word;
typedef struct word *wordptr;
```

(appendixA.c)

```c
extern wordptr WordAlloc(void);
extern wordptr MakeWord(char *, int, postag, int, int, int, int);
extern wordptr CopyWord(wordptr);
extern void FreeWord(wordptr);
extern void initialize_annotations(word *wd);
extern void mark_np_start(word *wd);
extern void mark_np_end(word *wd);
extern int start_np_p(word *wd);
extern int end_np_p(word *wp);
extern void SscanSentence(word **words, char *buf);
extern int SentLength(word **s);
extern void FreeSentence(word **);
extern void CopySentence(wordptr *, wordptr *, int);
extern void CopySentButN(wordptr *NEWSENT, wordptr *SENT, int LEN, int n);
extern void CopyInsertSent(wordptr *, wordptr *, int , int, char *);

#define WORD_SPELLING(X)         (X->spelling)
#define WORD_SPELLING_STATIC(X)  (X->spelling_static)
#define WORD_POS(X)              (X->tag)
#define WORD_TAG(X)              (X->tag)
#define WORD_START(X)            (X->start)
#define WORD_END(X)              (X->end)
#define WORD_OOD(X)              (X->ood)

endif extern postag FindTagNum(char *tag);

char          *starttag = "S-T-A-R-T";
char          *endtag   = "E-N-D";
char          *defaulttag = "nn";  /* default tag */
char          *cardtag = "cd";  /* tag for cardinal number */
struct atable *tritable,*wordtable,*suftable;
double        minbis, mintris,minunis,minsuf;
lexgclist     lexgarbage = NULL;
char          *tags[MAXTAG]; /* all tags */
unsigned int  ntags;         /* number of tags */

/* ------------------------------------------------------------------
   statecons, Statelist The state is indexed by the pair (tag1,tag2)
       p is the maximum forward log probability of this state
             up to the current input
       next is a pointer to the next state for the same current input.
       prev points to the state that caused this state to exist. It
             is used for retrieving the decoded sequence.
   ------------------------------------------------------------------ */ struct statecons {
```

(appendixA.c)

```
  postag tag1;
  postag tag2;
  double logp;
  struct statecons *next;
  struct statecons *prev;
};
typedef struct statecons *Statelist;
```

```
/*------------------------------------------------------------------
 |     Return the tag string given the number                      |
 *------------------------------------------------------------------ char *get_stag(postag n)
{
  if ((n < ntags) && (n >= 0))
    return(tags[n]);
  else
    myerror("get_stag: tag number %d is out of the range [%d,%d]\n",
            n, 0, ntags-1);
}

/*------------------------------------------------------------------
 |     Return the tag string given a word                          |
 *------------------------------------------------------------------
char *word_stag(word *wptr)
{
  if (wptr)
    return(get_stag(WORD_TAG(wptr)));
  else
    myerror("word_stag: null word pointer\n");
}

/* ---------------------------------------------------------------
    lexgcalloc
   ---------------------------------------------------------------
lexgclist lexgcalloc(lexlist car, lexgclist cdr)
{
  lexgclist lexgc;

lexgc = (lexgclist) mymalloc(sizeof(struct lexgc));
  if (lexgc==NULL) {
    fprintf(stderr, "Out of memory\n");
    exit(0);
  }
  lexgc->car=car;
  lexgc->cdr=cdr;
  return(lexgc);
}

/* ---------------------------------------------------------------
    FreeLex
   ---------------------------------------------------------------
```

(appendixA.c)

```c
void FreeLex(lexlist lex)
{
  if (lex) {
    if (lex->next) FreeLex(lex->next);
    free(lex);
  }
}

/* ----------------------------------------------------------------------
     FreeGCLex
   ---------------------------------------------------------------------- */
void FreeGcLex(lexgclist lexgc)
{
  if (lexgc) {
    if (lexgc->cdr) FreeGcLex(lexgc->cdr);
    FreeLex(lexgc->car);
    free(lexgc);
  }
}
/* ----------------------------------------------------------------------
     PushLexGarbage
   ---------------------------------------------------------------------- */
void PushLexGarbage(lexlist lex)
{
  if (lexgarbage == NULL)
    lexgarbage = lexgcalloc(lex,NULL);
  else
    lexgarbage = lexgcalloc(lex,lexgarbage);
}

/* ----------------------------------------------------------------------
     lexalloc
   ---------------------------------------------------------------------- */ lexlist lexalloc(postag pos, double lp, lexlist next, char *root)
{
  lexlist lex;

lex = (lexlist) malloc(sizeof(struct lexinfo));
  if (lex==NULL) {
    fprintf(stderr, "Out of memory\n");
    exit(0);
  }
  lex->pos=pos;
  lex->lp=lp;
  lex->next=next;
  lex->root = root;
  return(lex);
}

/* ----------------------------------------------------------------------
     WildCharWord
         Guesses all possible parts of speech information
```

(appendixA.c)

```
lexlist WildCharWord ()
{
  lexlist result;
  uint i;

result = NULL;
  for(i=0; i < ntags; i++) {
    result = lexalloc(i,-0.1,result, "");
    PushLexGarbage(result);
  }
  return(result);
}

/* ------------------------------------------------------------------
   GuessFromLast3Char
        Guesses the part of speech information of unknown words
        based on the last three charaters.
   ------------------------------------------------------------------ */
lexlist GuessFromLast3Char(char *s)
{
  lexlist result = NULL;
  char c1,c2,c3;
  int n;

n = strlen(s);
  if (n>3){
    c3 = toupper(s[n-1]);
    c2 = toupper(s[n-2]);
    c1 = toupper(s[n-3]);
    result = bin_findlast3(c1,c2,c3);
  }
  return(result);
}

/* ------------------------------------------------------------------
   GuessDefaultTag
        Guesses the default tag
   ------------------------------------------------------------------ */
lexlist GuessDefaultTag()
{
  lexlist result = NULL;
  postag pos;
  double lp;
  lexlist next;

next=NULL;
  pos = FindTagNum(defaulttag);
  lp = minsuf;
  result = lexalloc(pos,lp,next, "");
  PushLexGarbage(result);
```

(appendixA.c)

```
    return(result);
}
/* -----------------------------------------------------------------
    GuessWord
        Guesses the part of speech information of unknown words
        Return a list of lexical information based on the last
        three characters
   ----------------------------------------------------------------- */
lexlist GuessWord(char *s)
{
    lexlist result = NULL;

if (strcmp(s,"xxx")==0) result=WildCharWord();
    if (!result) result = GuessFromLast3Char(s);
    if (!result) result = GuessDefaultTag();
    return(result);
}

/* -----------------------------------------------------------------
    UnusualWord(char *word)
        Return  a list of lexical information of unusual words such
        as numbers, ...
   ----------------------------------------------------------------- */
lexlist UnusualWord(char *word)
{
    lexlist result = NULL;
    postag pos;
    double lp;
    lexlist next;

if (isdigit(word[0])) {
        next=NULL;
        pos = FindTagNum(cardtag);
        lp = 0;                         /* this prob is wrong */
        result = lexalloc(pos,lp,next, "");
        PushLexGarbage(result);
    }
    return(result);
}

/* NEW */
lexlist CopyLex(lexlist lex)
{
    lexlist newlex;

newlex = (lexlist) mymalloc(sizeof(struct lexinfo));
    newlex->pos = lex->pos;
    newlex->lp = lex->lp;
    newlex->next = lex->next;
    newlex->root = lex->root;

return(newlex);
```

(appendixA.c)

```c
}
/* NEW */
lexlist LexAppend(lexlist lex1, lexlist lex2)
{
  lexlist lex, newlex, prev, firstlex;

newlex = NULL;
  prev = NULL;
  firstlex = NULL;

if (lex1 == NULL)
    return(lex2);
  else if (lex2 == NULL)
    return(lex1);
  else { firstlex = CopyLex(lex1);
    prev = firstlex;

for(lex = lex1->next; lex; lex = lex->next) {
      newlex = CopyLex(lex);
      prev->next = newlex;
      prev = newlex;
    }
    for(lex = lex2; lex; lex = lex->next) {
      newlex = CopyLex(lex);
      prev->next = newlex;
      prev = newlex;
    }
    PushLexGarbage(firstlex);
    return(firstlex);
  }
}

/*----------------------------------------------------------------
|    Return 1 if the word appeared as proper noun in the corpus    |
|           0 if the word did not appear as proper noun in the corpus |
|          -1 if the word never appeared in the corpus              |
*----------------------------------------------------------------*/ int proper_noun(char *spelling)
{
  lexlist lex, first;
  int found = 0;

reset_lexmem();
  lex = first = bin_findword(spelling);

if (lex) {
    for (lex; (lex != NULL) && (found == 0); lex = lex->next)
      if (strncmp(get_stag(lex->pos), "np", 2) == 0)    /* begins with np */
        found = 1;
```

(appendixA.c)

```
  }
  else {                                  /* not found */
    found = -1;
    spelling[0] = tolower(spelling[0]);
    for (lex = first; (lex != NULL) && (found == 0); lex = lex->next)
      if (strncmp(get_stag(lex->pos), "np", 2) == 0)     /* begins with np */
        found = 1;
    spelling[0] = toupper(spelling[0]);   /* undo */
  } return(found);
}
/*----------------------------------------------------------------
|      Return 1 if the word appeared as title-noun in the corpus     |
|             0 if the word did not appear as noun title in the corpus |
|            -1 if the word never appeared in the corpus              |
*-----------------------------------------------------------------*/ int is_noun_title(char *spelling)
{
  lexlist lex;
  int found = 0;

reset_lexmem();
  lex = bin_findword(spelling);

if (lex) {
    for (lex; (lex != NULL) && (found == 0); lex = lex->next) {
      if (strcmp(get_stag(lex->pos), "nn-tl") == 0)      /* noun title */
        found = 1;
      if (strcmp(get_stag(lex->pos), "nn$-tl") == 0)     /* possesive */
        found = 1;
      if (strcmp(get_stag(lex->pos), "nns-tl") == 0)     /* plural */
        found = 1;
    }
  }
  else
    found = -1;

return(found);
}

/* ----------------------------------------------------------------
    FindTags
   ---------------------------------------------------------------- */
lexlist FindTags(word *wd, int pos)
/* return a linked list of tags with its probability */
{
  lexlist lex, lex2;
  char *spelling;
  extern char   linebuf[];

spelling = WORD_SPELLING(wd);
```

(appendixA.c)

```
    lex = bin_findword(spelling);

if ((pos == 0) && isupper(spelling[0]) && (strcmp(spelling, "I") != 0)) {
      strcpy(linebuf, spelling);                                                    640
      linebuf[0] = tolower(linebuf[0]);
      lex2 = bin_findword(linebuf);
      lex = LexAppend(lex, lex2);
    } if (!lex) lex = UnusualWord(spelling);
    if (lex == NULL) {
      WORD_OOD(wd)=1;
      lex = GuessWord(spelling);
    }                                                                               650
    return(lex);
}

/* -------------------------------------------------------------------------
     BiProb
   ------------------------------------------------------------------------- */ double BiProb(postag i, postag j)
/* return the probability of the bigram of parts of speech */
{
    double p;                                                                       660 p=bin_findbi(i,j);
    if (p!=0) return(p);
    else return(minbis);
}

/* -------------------------------------------------------------------------
     TriProb
   ------------------------------------------------------------------------- */ double TriProb(postag i, postag j, postag k)                                        670
/* return the probability of the trigram of parts of speech */
{
    double result;

result=bin_findtri(i,j,k);
    if (result>0) return(result);
    else return(mintris);
}

/* -------------------------------------------------------------------------
     STriProb
   ------------------------------------------------------------------------- */ double alpha = 0.9;

double STriProb(postag i, postag j, postag k)
/* return the smoothed probability of the trigram of parts of speech */
{
    double tri;
```

(appendixA.c)

```c
  double bi;
  double ptri;
  double pbi;
  double p;

tri=bin_findtri(i,j,k);
  bi=bin_findbi(j,k);
  if ((tri <= 0) && (bi <= 0)) {
    ptri = exp(tri);
    pbi = exp(bi);
    p = log(alpha * ptri + (1 - alpha) * pbi);
#ifdef DEBUGS
    printf("->tri+bi %s %s %s %E\n", tags[i], tags[j], tags[k], p);
#endif
  }
  else if (tri <= 0) {
    p = tri + log(alpha);
#ifdef DEBUGS
    printf("->tri %s %s %s %E\n", tags[i], tags[j], tags[k], p);
#endif
  }
  else if (bi <= 0) {
    p = bi + log(1-alpha);
#ifdef DEBUGS
    printf("->bi %s %s %s %E\n", tags[i], tags[j], tags[k], p);
#endif
  }
  else {
    p = mintris;
#ifdef DEBUGS
    printf("->mintris %s %s %s %E\n", tags[i], tags[j], tags[k], p);
#endif
  }
#ifdef DEBUGS
  printf("stri %s %s %s =%E\n", tags[i], tags[j], tags[k], p);
#endif
  return(p);
}

/* ----------------------------------------------------------------
   StateAlloc
   ---------------------------------------------------------------- */

Statelist StateAlloc(postag tag1, postag tag2, double p,
                     struct statecons *next,
                     struct statecons *prev)
{
  Statelist new;

new=(Statelist) mymalloc(sizeof(struct statecons));
  new->tag1 = tag1;
  new->tag2 = tag2;
  new->logp = p;
  new->next = next;
```

```
                                                              FreeStateNext(appendixA.c)

new->prev = prev;
    return(new);
}

/* ------------------------------------------------------------------------
    PushState
   ------------------------------------------------------------------------ */
void PushState(Statelist *Stateptr, postag tag1, postag tag2, double logp, Statelist prev)      750
/* Create a new State added into Stateptr (note Stateptr can be NULL) */
{
  Statelist newstate;

newstate = StateAlloc(tag1,tag2,logp,NULL,prev);
  if (*Stateptr==NULL) *Stateptr = newstate;
  else {
    newstate->next=(*Stateptr)->next;
    (*Stateptr)->next=newstate;
  }                                                                                              760
}

/* ------------------------------------------------------------------------
    SetMaxStateP
   ------------------------------------------------------------------------ */
void SetMaxStateP(Statelist *Stateptr, postag tag1, postag tag2, double logp, Statelist prev)
/* Find the state with tag1, tag2 set its prob to p if p is max
   (note when Stateptr is NULL a new state is created) */
{
  Statelist sptr, found=NULL;                                                                    770 if (*Stateptr==NULL)
    PushState(Stateptr, tag1, tag2, logp, prev);
  else {
    for (sptr=*Stateptr; (sptr != NULL) && (found == NULL); sptr = sptr->next)
      if ((sptr->tag1 == tag1) && (sptr->tag2 == tag2))
        found = sptr;
    if (found == NULL) PushState(Stateptr, tag1, tag2, logp, prev);
    else if (found->logp < logp) {
      found->logp = logp;                                                                        780
      found->prev = prev;
    }
  }
}

/* ------------------------------------------------------------------------
    FreeStateNext
   ------------------------------------------------------------------------ */
FreeStateNext(Statelist slist)                                        FreeStateNext
{                                                                                                790
  if (slist != NULL) {
    FreeStateNext(slist->next);
    free(slist);
  }
}
```

FreeStateNext(appendixA.c)

```c
int FindLexAstag(lexlist lex, postag tag)
{
  lexlist lx;
  int found = FALSE;

for(lx = lex; (found == FALSE) && lx; lx = lx ->next)
    if (lx->pos == tag) found = TRUE;
  return(found);
} void SetFirstWord(wordptr wdptr, postag tag)
{
  lexlist lex;
  char *spelling;
  extern char   linebuf[];

spelling = WORD_SPELLING(wdptr);

if ((isupper(spelling[0])) && (strcmp(spelling, "I") != 0)) {
    lex = bin_findword(spelling);
    if (!FindLexAstag(lex, tag)) {
#ifdef DEBUGS
      printf("%s static = %d\n", wdptr->spelling, wdptr->spelling_static);
#endif
      if (WORD_SPELLING_STATIC(wdptr)) {
        strcpy(linebuf, spelling);
        linebuf[0] = tolower(spelling[0]);
        wdptr->spelling = mystrdup(linebuf);
        wdptr->spelling_static = FALSE;
      }
      else {
        spelling[0] = tolower(spelling[0]);
      }
    }
  }
}
```

/* _____
   *MaxFoward*
   *Return the probability of the path with maximum probability and*
   *sets the array of part of speech tags*

*sent*
      *is an array of pointers to words, the last one pointing to null*
   *tagged*
      *is an array of part of speech tag which is filled on return*

*Forw[i]*
      *points to the list of states corresponding to the ith*
      *input token.*
   *Return MINLOGP if the sentence is not recognized*

FreeStateNext(appendixA.c)

```c
double MaxForward(wordptr SENT[], int LEN)
{
  char **w;
  int i,k,n;
  postag tag1, tag2, tag3;
  lexlist tagptr;
  Statelist FORW[MAX_INPUT];
  Statelist s,t;
  double maxlogp;

for(i=0; i< LEN+2; i++) {
     FORW[i]=NULL;            /* reset forward probabilities */
  } reset_lexmem();
  /* Initialization, Padding to the left */
  for(tagptr=FindTags(SENT[0],0);
        tagptr != NULL;
        tagptr = tagptr->next) {
     tag1 = FindTagNum(starttag);
     tag2 = tag1;
     tag3 = tagptr->pos;
     maxlogp = STriProb(tag1, tag2, tag3) + tagptr->lp;
     PushState(&FORW[0], tag2, tag3, maxlogp, NULL);
  }

/* Induction */
  for(i=1; i < LEN; i++)
     for(s=FORW[i-1]; s != NULL; s=s->next) {
        tag1 = s->tag1;
        tag2 = s->tag2;
        reset_lexmem();
        for(tagptr=FindTags(SENT[i],i);
              tagptr != NULL;
              tagptr = tagptr->next) {
           tag3 = tagptr->pos;
           maxlogp = s->logp + STriProb(tag1, tag2, tag3) + tagptr->lp;
           SetMaxStateP(&FORW[i], tag2, tag3, maxlogp, s);
        }
     }
  reset_lexmem();
  /* FIRST PAD TO THE RIGHT */
  /* lastword END */
  /*     i-1   i   */
  for(s=FORW[i-1]; s != NULL; s=s->next) {
     tag1 = s->tag1;
     tag2 = s->tag2;
     tag3 = FindTagNum(endtag);
     maxlogp = s->logp + STriProb(tag1, tag2, tag3);
     SetMaxStateP(&FORW[i], tag2, tag3, maxlogp, s);
  }
```

FreeStateNext(appendixA.c)

```
      i++;
      /* SECOND PAD TO THE RIGHT */
      /* lastword  END   END  */
      /*    i-2   i-1   i */
      for(s=FORW[i-1]; s != NULL; s=s->next) {
        tag1 = s->tag1;
        tag2 = s->tag2;
        tag3 = FindTagNum(endtag);
        maxlogp = s->logp + STriProb(tag1, tag2, tag3);              910
        SetMaxStateP(&FORW[i], tag2, tag3, maxlogp, s);
      } n=i;                    /* lastword/i-2  END/i-1  END/i  */

/* Sentence Probability */
    s=NULL;
    maxlogp = MINLOGP;
    for(t=FORW[n]; t != NULL; t=t->next)
      if (t->logp > maxlogp) {                                       920
        maxlogp = t->logp;
        s = t;
      }

/* Fill the tags */
    if (maxlogp != MINLOGP)
      for(t=s; t != NULL; t=t->prev){
        if ((n < LEN) && (n >= 0)) {
          WORD_POS(SENT[n])=t->tag2;
          if (n==0) SetFirstWord(SENT[n], t->tag2);                  930
        }
        n--;
      }

/* Free the memory used by FORW */
    for(i=0; i< LEN + 2; i++)
      if (FORW[i] != NULL) FreeStateNext(FORW[i]->next);

/* Free the memory used for lexical information */              940
    if (lexgarbage) FreeGcLex(lexgarbage);
    lexgarbage = NULL;

return(maxlogp);
}
```

(appendixB.c)

/*takes a tagged sentence and the DAG representing the incorrect usage
and outputs the sentence with markers around the incorrect parts*/

```c
typedef union {
    unsigned char str[4];
    unsigned long l;
} UBLOC;
#define TAILLE_UBLOC (sizeof(long))

typedef struct str4_cell {
        unsigned long cel_d;
        unsigned long cel_g;
        struct str4_cell *suivant;
        } *CELL44;
#define TAILLE_CELL44 (2*sizeof(long)+sizeof(CELL44))

typedef struct s_cell13{
    UBLOC nombre;
    struct s_cell13 *suivant;
    } *CELL13;
/*#define TAILLE_CELL13 (sizeof(long)+sizeof(CELL13))*/
define TAILLE_CELL13 16 typedef struct {
    CELL13 liste;
    unsigned long sorte;
    } *ET_L13;
#define TAILLE_ETL13 (sizeof(CELL13)+sizeof(long))

typedef struct {
    ET_L13 *etats;
    unsigned long nb_etat;
    unsigned long taille;
    } *AUT_L13;
#define TAILLE_AUTL13 (sizeof(ET_L13 *)+sizeof(long)*2)
define T_AUT_L13 48 typedef struct {
    UBLOC *bloc;
    unsigned long *cardt;
    unsigned long taille;
    unsigned long nb_etat;
    unsigned long nb_mot;
    } *AUT_T_D13;
#define TAILLE_AUTTD13 (sizeof(long)*3+sizeof(long *)+sizeof(UBLOC *))
define T_AUT_T_D13 85 typedef struct {
    AUT_T_D13 aut1;
    unsigned int stat;
    AUT_L13 aut2;
```

(appendixB.c)

```
    unsigned long nb_mot1;
    unsigned long nb_mot;
    unsigned char **mot2s;
    unsigned long taille;
    } *ALP_T_D13;
#define TAILLE_ALPTD13 (sizeof(AUT_T_D13)+sizeof(AUT_L13)+3*sizeof(long)+sizeof(int)+sizeof(char **))
define T_ALP_T_D13 44 typedef struct {
    CELL44 liste;
    unsigned long sorte;
    } *ET_L44;
#define TAILLE_ETL44 (sizeof(long)+sizeof(CELL44))

typedef struct {
    ALP_E_LT13 alp1;
    ALP_T_D13 alp2;
    ET_L44 *etats;
    unsigned long nb_etat;
    unsigned long taille;
    } *AUT_L44;
#define TAILLE_AUTL44 (sizeof(ALP_E_LT13)+sizeof(ALP_T_D13)+sizeof(ET_L44 *)+sizeof(long)*2)
define T_AUT_L44 57 typedef struct {
        unsigned long g;
        unsigned long d;
        } BLOC_D44;
#define TAILLE_BLOCD44 (2*sizeof(long))

typedef struct {
        ALP_T_D13 alp2;
        BLOC_D44 *bloc;
        unsigned long nb_etat;
        unsigned long taille;
        } *AUT_D44;
#define TAILLE_AUTD44 (sizeof(ALP_T_D13) + sizeof(BLOC_D44 *)+2*sizeof(long))
define T_AUT_D44 166 define SORTE_POS_D44 -1
define COD_SORTE_D44 1000001 typedef struct {
    CELLT44 liste;
    unsigned long sorte;
    } *ET_T_L44;
#define TAILLE_ETTL44 (sizeof(long)+sizeof(CELLT44))

typedef struct str4_cellt {
        unsigned long cel_d;
        unsigned long cel_g1;
        unsigned long cel_g2;
```

```
        struct str4_cellt *suivant;
                } *CELLT44;
#define TAILLE_CELLT44 (3*sizeof(long)+sizeof(CELLT44))

typedef struct {
    ALP_E_LT13 alp1;
    ALP_T_D13 alp2;
    ET_T_L44 *etats;
    unsigned long nb_etat;
    unsigned long taille;
    } *TRANS_L44;
#define TAILLE_TRANSL44 (sizeof(ALP_E_LT13)+sizeof(ALP_T_D13)+sizeof(ET_T_L44 *)+sizeof(long)*2)
define T_TRANS_L44 157 unsigned char *tabcod;
define MAX_CHEMIN 100
define MAX_LONG_CHEMIN 100 void string_double_array(char word,char pos,char *buff);

void main(int nb,char **arg){
  FILE *f;
  AUT_D44 w1,w2;
  TRANS_L44 trans;
  problem *probs;
  char buff[10000];
  char word,pos;
  unsigned long i;
  unsigned long *wo,*wc,*po,*pc;

init_morpho_cor();

/*one initializes the double array*/
  word=(char **)malloc(sizeof(char *)*100);
  for(i=0;i<=99;i++)
     word[i]=(char *)malloc(sizeof(char)*100);

pos=(char **)malloc(sizeof(char *)*100);
  for(i=0;i<=99;i++)
     pos[i]=(char *)malloc(sizeof(char)*100);

f=fopen(arg[1],"rb");
  getc(f);
  w1=read_autd44(f);
  fclose(f);

f=fopen(arg[2],"rb");
  getc(f);
  w2=read_autd44(f);
  fclose(f);
```

(appendixB.c)

```c
    f=fopen(arg[3],"rb");
    getc(f);
    trans=read_transl44(f);
    fclose(f);

init_look_wrong_pattern(&wo,
                            &wc,
                            &po,
                            &pc);

while(fgets(buff,1000,stdin)){
      if ((*buff!='\n') && (*buff!='\0')){
        string_double_array(word,pos,buff);

/*creates an empty list of errors messages*/
        probs=new_problem_list();

look_wrong_pattern(word,
                           pos,
                           w1,
                           w2,
                           trans,
                           &probs,
                           AUXILIARY,
                           wo,
                           wc,
                           po,
                           pc);

/*print the list of problems encountered*/
        print_problem_list(stdout,&probs);
        free_problem_list(&probs);
      }
    }

}
void string_double_array(char **word,char **pos,char *buff){
  char *ligne,*lg2;
  int count=0;

ligne=buff;

count=0;
  while(*ligne!='\n' && *ligne!='\0'){
    if ((count % 2)==0)
      lg2=word[count/2];
    else
      lg2=pos[count/2];
```

(appendixB.c)

```c
      while(*ligne!=' ' && *ligne!='\n' && *ligne!='\0')
        *lg2++=*ligne++;
      if (*ligne==' ')
        ligne++;

*lg2='\0';

count++;

}
    *(word[count/2])='\0';
    *(pos[count/2])='\0';
} void init_look_wrong_pattern(unsigned long **pwo,
                             unsigned long **pwc,
                             unsigned long **ppo,
                             unsigned long **ppc){

*pwo=(unsigned long *)malloc(sizeof(long)*100);
  *pwc=(unsigned long *)malloc(sizeof(long)*100);
  *ppo=(unsigned long *)malloc(sizeof(long)*100);
  *ppc=(unsigned long *)malloc(sizeof(long)*100);

} void look_wrong_pattern(word    **sent,
                        unsigned long   len,
                        AUT_D44 w1,
                        AUT_D44 w2,
                        TRANS_L44 trans,
                        problem **pprobs,
                        int tp,
                        unsigned long *word_open,
                        unsigned long *word_close,
                        unsigned long *pos_open,
                        unsigned long *pos_close){
  problem *probs;
  unsigned long nb,i,dep,arr,j;
  char *comm,com1[1000];

probs=*pprobs;

(*nav_w_pos)(INIT_NAVIGATE,(void *)sent, NULL, &len,NULL);

nb=bmatch_abstr(w1,
                  w2,
```

(appendixB.c)

```
                    1,  /*one looks for the longest sequence*/
                    word_open,
                    word_close,
                    pos_open,
                    pos_close,
                    (char * (*)(int,
                                void *,
                                void *,
                                unsigned long *,
                                unsigned long *))nav_w_pos);

if (nb){
    for(i=0;i<=(nb-1);i++){
      dep=(word_open[i] / 2);
      arr=(word_close[i] / 2) + 1;

find_suggs(&probs,
                    trans,
                    (unsigned long)dep,
                    (unsigned long)arr,
                    (unsigned long)(word_open[i]),
                    (char *(*)(int,
                                void *,
                                void *,
                                unsigned long *,
                                unsigned long *))nav_w_pos);

}
  }

*pprobs=probs;
} char *nav_w_pos(int tp,
                void *arg1,
                void *arg2,
                unsigned long *p1,
                unsigned long *p2){
  static unsigned long count1;
  static unsigned long count2;

static word **sent;
  static unsigned long len;
  extern char *word_stag(word *wptr);

char *buff2=NULL;

if (tp==RESET_NAVIGATE){
    count1=count2=0;
  }
```

(appendixB.c)

```
        else if (tp==NEXT_NAVIGATE){
          if ((count1 % 2)==0){
              buff2=(WORD_SPELLING(sent[count1/2]));
              count1++;
          }
          else{
            if (count1/2 < len){
              buff2=(word_stag(sent[count1/2]));
              count1++;
            }
          }
          count2=count1;
        }
        else if (tp==PREV_NAVIGATE){
          if (count2){
            count2--;
            if ((count2 % 2)==0){
              if (count2/2 < len){
                buff2=(WORD_SPELLING(sent[count2/2]));
              }
            }
            else{
              if (count2/2 <len){
                buff2=(word_stag(sent[count2/2]));
              }
            }
          }
        }
        else if (tp==INIT_NAVIGATE){
          sent=(word **)arg1;
          len = (int) (*p1);
        }
        else if (tp==GIVE_COUNT_NAVIGATE){
          *p1=count1-1;
          *p2=count2;
        }
        else if (tp==GIVE_POS_NAVIGATE){
          *p1=0;
          *p2=0;
        }
        else if (tp==GIVE_WORD_POS){
          if ((*p1 % 2)==0){
              buff2=(WORD_SPELLING(sent[(*p1)/2]));
          }
          else{
            if ((*p1)/2 < len){
              buff2=(word_stag(sent[(*p1)/2]));
            }
          }
        }
        else if (tp==IS_END_OF_STRING){
          if ((*p1)/2<len)
              buff2=NULL;
```

(appendixB.c)

```
      else
         buff2=(char *)1;
   } return buff2;
} unsigned long bmatch_abstr(AUT_D44 a1,
                           AUT_D44 a2,
                           int tp,
                           unsigned long *word_open,
                           unsigned long *word_close,
                           unsigned long *pos_open,
                           unsigned long *pos_close,
                           char *(*navigate)(int,
                                             void *,
                                             void *,
                                             unsigned long *,
                                             unsigned long *)){
unsigned long nb,num,last_count1,count2,last_count,last_pos;
unsigned long pos1,pos2,dep,interog1,interog2,dep2;
unsigned char *str,*str2;
ALP_T_D13 alph1,alph2;
int fin;
BLOC_D44 *bloc1,*bloc2;

nb=0;

(*navigate)(RESET_NAVIGATE,NULL,NULL,NULL,NULL);

bloc1=a1->bloc;
bloc2=a2->bloc;
alph1=a1->alp2;
alph2=a2->alp2;
interog1=ord_alptd13((unsigned char *)"???",alph1);
interog2=ord_alptd13((unsigned char *)"???",alph2);

dep=0;
while(str=(unsigned char *)(*navigate)(NEXT_NAVIGATE,NULL,NULL,NULL,NULL)){
   num=ord_alptd13(str,alph1);
   if (num!=LONG_OUT){
      if (bloc1[dep+num].g==num)
         dep=bloc1[dep+num].d;
      else if (bloc1[dep+interog1].g==interog1)
         dep=bloc1[dep+interog1].d;
      else{
         fprintf(stderr,"error bmtach_abstr 0: a1 should have a ??? transition at state %ld\n",dep);
         exit(0);
      }
   }
   else{
      if (bloc1[dep+interog1].g==interog1)
         dep=bloc1[dep+interog1].d;
```

(appendixB.c)

```
    else{
      fprintf(stderr,"error bmtach_abstr 0: a1 should have a ??? transition at state %ld\n",dep);
      exit(0);
    }
  }
                                                                                                    430
  if(bloc1[dep+SORTE_POS_D44].g==COD_SORTE_D44){
    /*one looks backward*/
    dep2=0;
    if (tp==1)/*we look for the longest match*/{
      fin=NON;
      last=LONG_OUT;
      while(fin!=OUI){
        if (bloc2[dep2+SORTE_POS_D44].g==COD_SORTE_D44){
          (*navigate)(GIVE_COUNT_NAVIGATE,NULL,NULL,&count1,&count2);
          (*navigate)(GIVE_POS_NAVIGATE,NULL,NULL,&pos1,&pos2);                                     440
          last_count=count2;
          last_pos=pos2;
        } str2=(unsigned char *)(*navigate)(PREV_NAVIGATE,NULL,NULL,NULL,NULL);
        if (!str2)
          fin=OUI;
        else{
          num=ord_alptd13(str2,alph2);
          if (num!=LONG_OUT){                                                                       450
            if (bloc2[dep2+num].g==num)
              dep2=bloc2[dep2+num].d;
            else if (bloc2[dep2+interog2].g==interog2)
              dep2=bloc2[dep2+interog2].d;
            else
              fin=OUI;
          }
          else if (bloc2[dep2+interog2].g==interog2)
            dep2=bloc2[dep2+interog2].d;
          else                                                                                      460
            fin=OUI;
        }
      }
      if (last_count==LONG_OUT){
        fprintf(stderr,"error bmatch 1 inconsistency between the two dags, the backward search failed\n
        exit(0);
      }
      (*navigate)(GIVE_COUNT_NAVIGATE,NULL,NULL,&count1,&count2);
      (*navigate)(GIVE_POS_NAVIGATE,NULL,NULL,&pos1,&pos2);
      word_open[nb]=last_count;                                                                     470
      word_close[nb]=count1;
      pos_open[nb]=last_pos;
      pos_close[nb]=pos1;
      nb++;

}
```

(appendixB.c)

```
        } .
    }
        return nb;
}
AUT_D44 read_autd44(FILE *f)
{
    unsigned long i,nb_etat,taille;
    unsigned char c;
    AUT_D44 aut;
    BLOC_D44 *bloc;
    ALP_T_D13 alph;
    UBLOC ubl;

c=getc(f);
    if (c!=T_AUT_D44)
      {
        fprintf(stderr,"error 0 read_autd44 incorrect file format\n");
        fprintf(stderr,"Le fichier n'est pas au bon format dans read_autd44\n");
        exit(0);
      } c=getc(f);
    if (c==T_ALP_T_D13)
      {
        alph=read_alptd13(f);
      }
    else
        alph=NULL;

#ifndef INV
    ubl.str[0]=getc(f);
    ubl.str[1]=getc(f);
    ubl.str[2]=getc(f);
    ubl.str[3]=getc(f);
#else
    ubl.str[3]=getc(f);
    ubl.str[2]=getc(f);
    ubl.str[1]=getc(f);
    ubl.str[0]=getc(f);
endif nb_etat=ubl.l;

ifndef INV
    ubl.str[0]=getc(f);
    ubl.str[1]=getc(f);
    ubl.str[2]=getc(f);
    ubl.str[3]=getc(f);
#else
    ubl.str[3]=getc(f);
    ubl.str[2]=getc(f);
```

(appendixB.c)

```
      ubl.str[1]=getc(f);
      ubl.str[0]=getc(f);
endif taille=ubl.l;

aut=init_autd44(taille);
   aut->nb_etat=nb_etat;
   aut->taille=taille;
   aut->alp2=alph;

bloc=aut->bloc;

for(i=0;i<=(aut->taille-1);i++)
     {
#ifndef INV
      ubl.str[0]=getc(f);
      ubl.str[1]=getc(f);
      ubl.str[2]=getc(f);
      ubl.str[3]=getc(f);
#else
      ubl.str[3]=getc(f);
      ubl.str[2]=getc(f);
      ubl.str[1]=getc(f);
      ubl.str[0]=getc(f);
endif bloc[i].g=ubl.l;

ifndef INV
      ubl.str[0]=getc(f);
      ubl.str[1]=getc(f);
      ubl.str[2]=getc(f);
      ubl.str[3]=getc(f);
#else
      ubl.str[3]=getc(f);
      ubl.str[2]=getc(f);
      ubl.str[1]=getc(f);
      ubl.str[0]=getc(f);
endif bloc[i].d=ubl.l;

} return(aut);

}

TRANS_L44 init_transl44(unsigned long nbetat)
{
   TRANS_L44 aut;
   ET_T_L44 tr;
```

(appendixB.c)

```c
    unsigned long i;

aut=(TRANS_L44)malloc(TAILLE_TRANSL44);
    aut->alp1=NULL;
    aut->alp2=NULL;
    aut->nb_etat=0;
    aut->taille=nbetat;

aut->etats=(ET_T_L44 *)malloc(nbetat*sizeof(ET_T_L44));
    aut->etats[0]=(ET_T_L44)malloc(nbetat*TAILLE_ETTL44);
    tr=aut->etats[0];

for(i=0;i<=(nbetat-1);i++)
    {
       aut->etats[i]=tr++;
       aut->etats[i]->sorte=0;
       aut->etats[i]->liste=NULL;
    } return(aut);
}

TRANS_L44 read_transl44(FILE *f)
{
    TRANS_L44 aut;
    UBLOC ubl;
    unsigned char c;
    ET_T_L44 tr;
    unsigned long i,nbetat,taille;
    CELLT44 l,l2;
    ALP_T_D13 alp2;

c=getc(f);
    if (c!=T_TRANS_L44)
    {
       fprintf(stderr,"le fichier n'est pas au bon format dans read_transl44\n");
       exit(0);
    } alp2=NULL;

c=getc(f);
    if (c==T_ALP_T_D13)
    {
       alp2=read_alptd13(f);
    }
ifndef INV
    ubl.str[0]=getc(f);
    ubl.str[1]=getc(f);
    ubl.str[2]=getc(f);
    ubl.str[3]=getc(f);
```

```
else
  ubl.str[3]=getc(f);
  ubl.str[2]=getc(f);
  ubl.str[1]=getc(f);
  ubl.str[0]=getc(f);
endif nbetat=ubl.l;

ifndef INV
  ubl.str[0]=getc(f);
  ubl.str[1]=getc(f);
  ubl.str[2]=getc(f);
  ubl.str[3]=getc(f);
#else
  ubl.str[3]=getc(f);
  ubl.str[2]=getc(f);
  ubl.str[1]=getc(f);
  ubl.str[0]=getc(f);
endif taille=ubl.l;

aut=init_transl44(nbetat);
  aut->nb_etat=nbetat;
  aut->taille=taille;
  aut->alp1=NULL;
  aut->alp2=alp2;

if (aut->nb_etat>0)
  for(i=0;i<=(aut->nb_etat-1);i++)
  {
#ifndef INV
    ubl.str[0]=getc(f);
    ubl.str[1]=getc(f);
    ubl.str[2]=getc(f);
    ubl.str[3]=getc(f);
#else
    ubl.str[3]=getc(f);
    ubl.str[2]=getc(f);
    ubl.str[1]=getc(f);
    ubl.str[0]=getc(f);
endif aut->etats[i]->sorte=ubl.l;

ifndef INV
    ubl.str[0]=getc(f);
    ubl.str[1]=getc(f);
    ubl.str[2]=getc(f);
    ubl.str[3]=getc(f);
#else
```

(appendixB.c)

```
        ubl.str[3]=getc(f);
        ubl.str[2]=getc(f);
        ubl.str[1]=getc(f);
        ubl.str[0]=getc(f);
endif l=NULL;
    while(ubl.l!=FIN_LONG)
    {
        l2=(CELLT44)malloc(TAILLE_CELLT44);
        l2->cel_g1=ubl.l;
        l2->suivant=l;
        l=l2;

#ifndef INV
        ubl.str[0]=getc(f);
        ubl.str[1]=getc(f);
        ubl.str[2]=getc(f);
        ubl.str[3]=getc(f);
#else
        ubl.str[3]=getc(f);
        ubl.str[2]=getc(f);
        ubl.str[1]=getc(f);
        ubl.str[0]=getc(f);
endif
        l2->cel_g2=ubl.l;

#ifndef INV
        ubl.str[0]=getc(f);
        ubl.str[1]=getc(f);
        ubl.str[2]=getc(f);
        ubl.str[3]=getc(f);
#else
        ubl.str[3]=getc(f);
        ubl.str[2]=getc(f);
        ubl.str[1]=getc(f);
        ubl.str[0]=getc(f);
endif
        l2->cel_d=ubl.l;

#ifndef INV
        ubl.str[0]=getc(f);
        ubl.str[1]=getc(f);
        ubl.str[2]=getc(f);
        ubl.str[3]=getc(f);
#else
        ubl.str[3]=getc(f);
        ubl.str[2]=getc(f);
        ubl.str[1]=getc(f);
        ubl.str[0]=getc(f);
endif
```

(appendixB.c)

```
      }
    renv_cellt44(&l);
    aut->etats[i]->liste=l;
  } return(aut);
}

ALP_T_D13 read_alptd13(FILE *f)
{
  IBLOC ibl;
  UBLOC ubl;
  ALP_T_D13 alph;
  unsigned long i;
  unsigned char *ligne,c;

c=getc(f);
  if (c!=T_ALP_T_D13)
  {
    fprintf(stderr,"Le fichier n'est pas au bon format dans read_alptd13\n");
    exit(0);
  } alph=(ALP_T_D13)malloc(TAILLE_ALPTD13);

ifndef INV
  ibl.str[0]=getc(f);
  ibl.str[1]=getc(f);
#else
  ibl.str[1]=getc(f);
  ibl.str[0]=getc(f);
endif alph->stat=ibl.i;

c=getc(f);
  if ((ibl.i==0) && (c==T_AUT_T_D13))
  {
    alph->aut1=read_auttd13(f);
    getc(f);
  }
  else
    alph->aut1=NULL;

alph->aut2=read_autl13(f);
```

(appendixB.c)

```
#ifndef INV
  ubl.str[0]=getc(f);
  ubl.str[1]=getc(f);
  ubl.str[2]=getc(f);
  ubl.str[3]=getc(f);
#else
  ubl.str[3]=getc(f);
  ubl.str[2]=getc(f);
  ubl.str[1]=getc(f);
  ubl.str[0]=getc(f);
endif alph->nb_mot1=ubl.l;

ifndef INV
  ubl.str[0]=getc(f);
  ubl.str[1]=getc(f);
  ubl.str[2]=getc(f);
  ubl.str[3]=getc(f);
#else
  ubl.str[3]=getc(f);
  ubl.str[2]=getc(f);
  ubl.str[1]=getc(f);
  ubl.str[0]=getc(f);
endif alph->nb_mot=ubl.l;

ifndef INV
  ubl.str[0]=getc(f);
  ubl.str[1]=getc(f);
  ubl.str[2]=getc(f);
  ubl.str[3]=getc(f);
#else
  ubl.str[3]=getc(f);
  ubl.str[2]=getc(f);
  ubl.str[1]=getc(f);
  ubl.str[0]=getc(f);
endif alph->taille=ubl.l;

ifndef OS2
  alph->mot2s=(unsigned char **)malloc(alph->taille+100000*sizeof(char *));
  alph->mot2s[0]=(unsigned char *)malloc(alph->taille+100000*sizeof(char));
#else
  alph->mot2s=(unsigned char **)malloc(alph->taille+10000*sizeof(char *));
  alph->mot2s[0]=(unsigned char *)malloc(alph->taille+10000*sizeof(char));
endif ligne=alph->mot2s[0];
  if (alph->nb_mot>alph->nb_mot1)
```

(appendixB.c)

```
  {
    for(i=0;i<=(alph->nb_mot-alph->nb_mot1-1);i++)
    {
      alph->mot2s[i]=ligne;
      c=getc(f);
      while(c!='\0')
      {
        *ligne++=c;
        c=getc(f);
      }
      *ligne++='\0';
    }
  } return(alph);

}

AUT_D44 init_autd44(unsigned long nb)
/*DOC Initialisation of a AUT_D44 automaton. nb is the size og the tab where the transitions are going to be st(
{
  AUT_D44 aut;
  unsigned long i;
  BLOC_D44 *bloc;

aut=(AUT_D44)malloc(TAILLE_AUTD44);
  bloc=aut->bloc=(BLOC_D44 *)malloc(TAILLE_BLOCD44*nb);
  aut->nb_etat=1;
  aut->taille=nb;

for(i=0;i<=(nb-1);i++)
    bloc[i].g=LONG_OUT;

return(aut);
}

AUT_L13 read_autl13(FILE *f)
{
  AUT_L13 aut;
  UBLOC ubl;
  unsigned char c;
  ET_L13 tr;
  unsigned long i;
  CELL13 l,l2;

c=getc(f);
  if (c!=T_AUT_L13)
  {
    fprintf(stderr,"le fichier n'est pas au bon format dans read_autl13\n");
    exit(0);
  }
```

(appendixB.c)

```
    aut=(AUT_L13)malloc(TAILLE_AUTL13);

#ifndef INV
   ubl.str[0]=getc(f);
   ubl.str[1]=getc(f);
   ubl.str[2]=getc(f);
   ubl.str[3]=getc(f);
#else
   ubl.str[3]=getc(f);                                                          910
   ubl.str[2]=getc(f);
   ubl.str[1]=getc(f);
   ubl.str[0]=getc(f);
endif aut->nb_etat=ubl.l;

aut->etats=(ET_L13 *)malloc((aut->nb_etat+1+RES_ET_L13)*sizeof(ET_L13));
    aut->etats[0]=(ET_L13)malloc((aut->nb_etat+RES_ET_L13)*TAILLE_ETL13);
    tr=aut->etats[0];                                                           920
 if (aut->nb_etat>0)
    for(i=0;i<=(aut->nb_etat-1);i++)
    {
       aut->etats[i]=tr++;

#ifndef INV
      ubl.str[0]=getc(f);
      ubl.str[1]=getc(f);
      ubl.str[2]=getc(f);
      ubl.str[3]=getc(f);                                                       930
#else
      ubl.str[3]=getc(f);
      ubl.str[2]=getc(f);
      ubl.str[1]=getc(f);
      ubl.str[0]=getc(f);
endif aut->etats[i]->sorte=ubl.l;

ifndef INV                                                                     940
      ubl.str[0]=getc(f);
      ubl.str[1]=getc(f);
      ubl.str[2]=getc(f);
      ubl.str[3]=getc(f);
#else
      ubl.str[3]=getc(f);
      ubl.str[2]=getc(f);
      ubl.str[1]=getc(f);
      ubl.str[0]=getc(f);
endif                                                                          950 l=NULL;
   while(ubl.l!=FIN_LONG)
```

(appendixB.c)

```
    {
        l2=(CELL13)malloc(TAILLE_CELL13);
        l2->nombre.l=ubl.l;
        l2->suivant=l;
        l=l2;
#ifndef INV
        ubl.str[0]=getc(f);
        ubl.str[1]=getc(f);
        ubl.str[2]=getc(f);
        ubl.str[3]=getc(f);
#else
        ubl.str[3]=getc(f);
        ubl.str[2]=getc(f);
        ubl.str[1]=getc(f);
        ubl.str[0]=getc(f);
endif

} aut->etats[i]->liste=l;

} for(i=(aut->nb_etat);i<=(aut->nb_etat+RES_ET_L13-1);i++)
  {
    aut->etats[i]=tr++;
    aut->etats[i]->sorte=NON_TERMINAL;
    aut->etats[i]->liste=NULL;
  } return(aut);
} unsigned long ord_alptd13(unsigned char *mot,ALP_T_D13 alph)
{
  unsigned long num;

if (alph->aut1!=NULL)
  {
    num=ord_auttd13(mot,alph->aut1);
    if (num==LONG_OUT)
    {
      num=ds_autl13(mot,alph->aut2);
      if (num!=LONG_OUT)
        num-=1;
    }

}
  else
  {
```

(appendixB.c)

```c
      num=ds_autl13(mot.alph->aut2);
      if (num!=LONG_OUT)
         num-=1;
   } return(num);
} unsigned long ds_autl13(unsigned char *mot,AUT_L13 aut)
{
   unsigned char *ligne;
   signed int fin;
   unsigned long dep,num;
   UBLOC nb;
   CELL13 l;

num=LONG_OUT;

ligne=mot;
   fin=NON;
   dep=0;
   while(fin!=OUI)
   {
      if ((*ligne=='\0') || (*ligne=='\n'))
      {
         fin=OUI;
         if (aut->etats[dep]->sorte!=NON_TERMINAL)
         {
            num=aut->etats[dep]->sorte;
         }
      }
      else
      {
         l=aut->etats[dep]->liste;
         while((l!=NULL) && (cel_g_13(l)!=*ligne))
            l=l->suivant;
         if (l==NULL)
            fin=OUI;
         else
         {
            nb.l=l->nombre.l;
#ifndef INV
            nb.str[3]=0;
#else
            nb.str[0]=0;
#endif
            dep=nb.l;
         }

*ligne++;
      }
   }
```

(appendixB.c)

```c
  return(num);
} unsigned char cel_g_l3(CELL13 l)
{
#ifndef INV
  return(l->nombre.str[3]);
#else
  return(l->nombre.str[0]);
#endif
} void renv_cell13(CELL13 *pl)
{
  CELL13 l1,l2,l;

l=*pl;
  l2=NULL;
  while(l!=NULL)
  {
    l1=l->suivant;
    l->suivant=l2;
    l2=l;
    l=l1;
  }

*pl=l2;
} void find_suggs(problem **pprobs,
                TRANS_L44 trans,
                unsigned long dep,
                unsigned long arr,
                unsigned long dep_pos,
                char *(*navigate)(int,
                                  void *,
                                  void *,
                                  unsigned long *,
                                  unsigned long *)){
  unsigned long nb,i;
  char *rep;

point_out_problem(dep, arr, "Incorrect verb sequence",
                    "This sequence is either not correctly ordered or a verb is incorrectly inflected
                    pprobs);

} int build_repl(char *rep,char **chem){
  char *ligne,res[100],tag2[100];
```

(appendixB.c)

```c
    int pre=1;
    int pos;
    int rr;

rr=1;
    *rep='\0';
    for(pos=0;*(chem[pos])!='\0';pos+=2){
       if (*(chem[pos+1])=='/'){
          for(ligne=&(chem[pos+1][1]);*ligne!='/';)
             ligne++;
          *ligne++='\0';
          ConvertBrowntagMorphtag(tag2,ligne);
          ChangeWord(res,chem[pos],&(chem[pos+1][1]),tag2);

if (!pre)
             strcat(rep," ");

if (*res=='\0'){
             rr=0;
             strcpy(res,chem[pos]);
             strcat(res,tag2);
          }
          strcat(rep,res);
       }
       else{
          if (!pre)
             strcat(rep," ");
          strcat(rep,chem[pos]);
       }
       pre=0;
    } return rr;
} void ConvertBrowntagMorphtag(char *tag2,char *tag1){
    if (strcmp("vb",tag1)==0){
       strcpy(tag2,"+V+Inf");
    }
    else if (strcmp(tag1,"vbd")==0){
       strcpy(tag2,"+V+Pret");
    }
    else if (strcmp(tag1,"vbn")==0){
       strcpy(tag2,"+V+PP");
    }
    else if (strcmp(tag1,"vbg")==0){
       strcpy(tag2,"+V+Ing");
    }
    else if (strcmp(tag1,"vbz")==0){
       strcpy(tag2,"+V+IPr3s");
    }
}
```

(appendixB.c)

```
unsigned long trans2_l44_str_buff(TRANS_L44 trans,
                                  unsigned long pos_dep,
                                  char *(*navigate)(int,
                                                    void *,
                                                    void *,
                                                    unsigned long *,
                                                    unsigned long *)){
    unsigned char buff2[100],*buff3;
    unsigned long trace_et,trace_let1,**trace_let2,max_chem_trans,let,epsi,interog2,interog_arr;
    unsigned long *chem_act1,*chem_act2,*chem_act3,*actif;
    unsigned char b1[1000];
    unsigned long nb_chem,num_chem,nb_chem2,dep,i,j,k,fin,fin2,fin3,zero,prof,profin,prof_trace;
    unsigned char * l_trans;
    UBLOC ubl;
    char *word;
    ALP_T_D13 alph;
    CELLT44 l;
    unsigned char **ligne,**lg2;
    int trv_let;

alph=trans->alp2;
    epsi=ord_alptd13((unsigned char *)"<E>",alph);
    interog2=ord_alptd13((unsigned char *)"???",alph);

nb_chem=1;
    max_chem_trans=1;
    chem_act1=buff1_chem_actif;
    chem_act2=buff2_chem_actif;
    actif=chem_act2;
    chem_act1[0]=0;
    deps[0]=0;
    fin=NON;
    est_actif[0]=1;
    prof_in[0]=pos_dep;
    prof_out[0]=0;
    prof_trace=0;
    while(fin!=OUI){
      actif=chem_act2;
      nb_chem2=0;

for(i=0;i<=(nb_chem-1);i++){
        num_chem=chem_act1[i];

if (max_chem_trans<num_chem)
           max_chem_trans=num_chem;

dep=deps[num_chem];
        prof=prof_out[num_chem];
        profin=prof_in[num_chem];

word=(*navigate)(GIVE_WORD_POS,NULL,NULL,&profin,NULL);
```

(appendixB.c)

```
        let=ord_alptd13((unsigned char *)word,alph);
        prof_in[num_chem]=profin;

if (trans->etats[dep]->sorte==TERMINAL){
          strcpy((char *)(chem_str[num_chem][prof]),"\0");
          est_fini[num_chem]=1;
          est_actif[num_chem]=0;
          l=NULL;
        } if ((*navigate)(IS_END_OF_STRING,NULL,NULL,&profin,NULL))
        {
          fin=OUI;
          if (trans->etats[dep]->sorte==TERMINAL){
            strcpy((char *)(chem_str[num_chem][prof]),"\0");
            est_fini[num_chem]=1;
          }
          else
            est_fini[num_chem]=0;
          est_actif[num_chem]=0;

l=NULL;/*trans->etats[dep]->liste;*/
        }
        else{
          l=trans->etats[dep]->liste;
          interog_arr=LONG_OUT;
          trv_let=NON;

while((l) &&
                (l->cel_g1!=let) &&
                (l->cel_g1!=epsi)){
            l=l->suivant;
          } if (l){
            fin=NON;

if (l->cel_g2!=epsi){
              nb_alptd13_ch(b1,l->cel_g2,alph);
              strcpy((char *)(chem_str[num_chem][prof]),(char *)b1);

prof_out[num_chem]++;
            } deps[num_chem]=l->cel_d;
            if (l->cel_g1!=epsi){
              trv_let=OUI;
              if (prof_in[num_chem]<=(MAX_LONG_CHEMIN-2)){
                prof_in[num_chem]++;
                *actif++=num_chem;
                fin=NON;
                nb_chem2++;
```

(appendixB.c)

```
            }
          else
             est_actif[num_chem]=0;
        }
        else{
          *actif++=num_chem;
          fin=NON;
          nb_chem2++;
        }
        l=l->suivant;
      }
      else{
        l=trans->etats[dep]->liste;

while((l) && (l->cel_g1!=interog2)){
          l=l->suivant;
        }
        if (l){
          interog_arr=l->cel_d;

fin=NON;

strcpy((char *)(chem_str[num_chem][prof]),word);

prof_out[num_chem]++;

deps[num_chem]=l->cel_d;

if (prof_in[num_chem]<=(MAX_LONG_CHEMIN-2)){
            prof_in[num_chem]++;
            *actif++=num_chem;
            fin=NON;
            nb_chem2++;

}
          else
             est_actif[num_chem]=0;

l=l->suivant;
        }
        else
           est_actif[num_chem]=0;
      }
    } fin2=NON;
    while(fin2!=OUI){
      if (interog_arr==LONG_OUT){
        while(l && (l->cel_g1!=let) && (l->cel_g1!=epsi))
          l=l->suivant;
      }
      else{
```

(appendixB.c)

```c
          while(l && (l->cel_g1!=interog2))
               l=l->suivant;
     } if (!l){
          if (trv_let==NON && interog_arr==LONG_OUT){
               interog_arr=1;
               l=trans->etats[dep]->liste;
          }
          else
               fin2=OUI;
     }
     else
     {
          fin3=NON;
          for(j=0;(j<=(max_chem-1)) && (fin3!=OUI);j++){
               if ((est_actif[j]==0) && (est_fini[j]==0))
                    fin3=OUI;
          } if (fin3==OUI)
               if (max_chem_trans<j)
                    max_chem_trans=j;

for(k=0;k<=(prof-1) && prof>0;k++)
               strcpy((char *)chem_str[j-1][k],(char *)chem_str[num_chem][k]);
          prof_out[j-1]=prof;
          prof_in[j-1]=profin;
          if (l->cel_g2!=epsi && l->cel_g1!=interog2){
               nb_alptd13_ch(chem_str[j-1][prof_out[j-1]],l->cel_g2,alph);
               prof_out[j-1]++;
          }
          else if (l->cel_g1==interog2){
               strcpy((char *)chem_str[j-1][prof_out[j-1]],word);
               prof_out[j-1]++;
          } deps[j-1]=l->cel_d;
          if (l->cel_g1!=epsi){
               if (prof_in[j-1]<=(MAX_LONG_CHEMIN-2)){
                    prof_in[j-1]++;
                    est_actif[j-1]=1;
                    *actif++=j-1;
                    nb_chem2++;
               }
          }
          else{
               est_actif[j-1]=1;
               *actif++=j-1;
               nb_chem2++;

}
``` if(appendixB.c)

```
        }
      else
        fin2=OUI;                                              1380 l=l->suivant;
    }
  }
} prof_trace++;

if (nb_chem2==0)                                             1390
    fin=OUI;
  else
    fin=NON;

chem_act3=chem_act1;
  chem_act1=chem_act2;
  chem_act2=chem_act3;
  actif=chem_act2;
  nb_chem=nb_chem2;
                                                               1400
}
prof_trace--;

nb_chem=0;
for(i=0;i<=(max_chem_trans);i++){                              for
  if (est_fini[i]==1){
    if (i!=nb_chem){
      lg2=chem_str[nb_chem];
      ligne=chem_str[i];
      while(**ligne!='\0')                                     1410
        strcpy((char *)*lg2++,(char *)*ligne++);
      **lg2='\0';
    }
    nb_chem+=1;
    est_fini[i]=0;
  }
  est_actif[i]=0;
}

1420
  return(nb_chem);

} void nb_alptd13_ch(unsigned char *buff,unsigned long num,ALP_T_D13 alph)
{
  if ((alph->nb_mot1>0) && (num<=(alph->nb_mot1-1)))           if
    nb_auttd13_ch(buff,num,alph->aut1);                        1431
``` if-while(appendixB.c)

```
   else if (num<alph->nb_mot)
      strcpy((char *)buff,(char *)alph->mot2s[num-alph->nb_mot1]);
   else
      {
         fprintf(stderr,"error 5 nb_alptd13_ch 0 out of interval\n");
         fprintf(stderr,"the number of the word asked, i.e %ld for is larger\n",num);
         fprintf(stderr,"than the number of words in the alphabet, i.e %ld\n",alph->nb_mot);
         exit(0);
      }                                                                              1440
} void nb_auttd13_ch(unsigned char *buff,unsigned long num1,AUT_T_D13 aut)
{
   unsigned long nb,num,dep,*cardt;
   unsigned char *ligne;
   unsigned int fin,fin_l,j,fin_l2,fin_etat;
   UBLOC *bloc;
   signed int tr1,tr2;                                                               1450 num=num1;

ligne=buff;
   bloc=aut->bloc;
   cardt=aut->cardt;
   dep=0;
   nb=0;
   fin=NON;
   while(fin!=OUI)                                                          while
   {                                                                          1461
      fin_etat=NON;
      tr1=(-1);
      while(fin_etat!=OUI)
      {
         fin_l=NON;
         if (tr1==-1)
         {
            for(j=0;(j<=253) && (fin_l!=OUI);j++)
            {                                                                        1470
               if (g_13(bloc[dep+j])==(unsigned char)j)
                  fin_l=OUI;
            }
         }
         else
         {
            for(j=(tr1+1);(j<=253) && (fin_l!=OUI);j++)
            {
               if (g_13(bloc[dep+j])==(unsigned char)j)
                  fin_l=OUI;                                                         1480
            }
         } if (fin_l==NON)
```

```c
        fin_etat=OUI;
      else
      {
        tr2=tr1;
        tr1=j-1;

if (nb+cardt[tr1+dep]>=num)
            fin_etat=OUI;
      }
    } if (fin_l==OUI)
    {
      if ((nb+cardt[tr1+dep])==num)
      {
        fin=OUI;
        dep=d_13(bloc[dep+tr1]);
        *ligne++=(unsigned char)tr1;
      }
      else
      {
        nb+=cardt[tr2+dep];
        dep=d_13(bloc[dep+tr2]);
        *ligne++=(unsigned char)tr2;
      }
    }
    else
    {
                if (tr1!=-1)
                {
        nb+=cardt[tr1+dep];
        dep=d_13(bloc[dep+tr1]);
        *ligne++=(unsigned char)tr1;
                }
                else
                {
                        fin=OUI;
                }

}

} fin=NON;
while(fin!=OUI)
{
  if ((dep>0) && (g_13(bloc[dep+SORTE_POS_D13])==COD_SORTE_D13))
      fin=OUI;
  else
  {
```

```
        fin_l=NON;
        for(j=0;(j<=253) && (fin_l!=OUI);j++)
        {
          if (g_13(bloc[dep+j])==(unsigned char)j)
             fin_l=OUI;
        }
        dep=d_13(bloc[dep+j-1]);
        *ligne++=(unsigned char)(j-1);

}
    }
    *ligne='\0';
} void renv_cellt44(CELLT44 *pl){
    CELLT44 l1,l2,l;

l=*pl;
    l2=NULL;
    while(l!=NULL)
    {
      l1=l->suivant;
      l->suivant=l2;
      l2=l;
      l=l1;
    }

*pl=l2;
}
``` while(appendixB.c)

1540

1550 while

1560

(appendixC.c)

/*takes a tagged sentence and the DAG representing the incorrect usage
and outputs the sentence with markers around the incorrect parts*/

/*the structures and function common between appendixes B and C are listed
in appendixe B*/

/*the difference between appendixe B and C is the difference of the function
find_suggs*/

```c
void main(int nb,char **arg){
   FILE *f;
   AUT_D44 w1,w2;
   TRANS_L44 trans;
   problem *probs;
   char buff[10000];
   char word,pos;
   unsigned long i;
   unsigned long *wo,*wc,*po,*pc;

init_morpho_cor();

/*one initializes the double array*/
   word=(char **)malloc(sizeof(char *)*100);
   for(i=0;i<=99;i++)
      word[i]=(char *)malloc(sizeof(char)*100);

pos=(char **)malloc(sizeof(char *)*100);
   for(i=0;i<=99;i++)
      pos[i]=(char *)malloc(sizeof(char)*100);

f=fopen(arg[1],"rb");
   getc(f);
   w1=read_autd44(f);
   fclose(f);

f=fopen(arg[2],"rb");
   getc(f);
   w2=read_autd44(f);
   fclose(f);

f=fopen(arg[3],"rb");
   getc(f);
   trans=read_transl44(f);
   fclose(f);

init_look_wrong_pattern(&wo,
                           &wc,
                           &po,
                           &pc);
```

(appendixC.c)

```
    while(fgets(buff,1000,stdin)){
      if ((*buff!='\n') && (*buff!='\0')){
        string_double_array(word,pos,buff);

/*creates an empty list of errors messages*/
        probs=new_problem_list();

look_wrong_pattern(word,
                           pos,
                           w1,
                           w2,
                           trans,
                           &probs,
                           AUXILIARY,
                           wo,
                           wc,
                           po,
                           pc);

/*print the list of problems encountered*/
        print_problem_list(stdout,&probs);
        free_problem_list(&probs);
      }
    }

} void look_wrong_pattern(word    **sent,
                        unsigned long   len,
                        AUT_D44  w1,
                        AUT_D44  w2,
                        TRANS_L44 trans,
                        problem **pprobs,
                        int tp,
                        unsigned long *word_open,
                        unsigned long *word_close,
                        unsigned long *pos_open,
                        unsigned long *pos_close){
  problem *probs;
  unsigned long nb,i,dep,arr,j;
  char *comm,com1[1000];

probs=*pprobs;

(*nav_w_pos)(INIT_NAVIGATE,(void *)sent, NULL, &len,NULL);

nb=bmatch_abstr(w1,
```

(appendixC.c)

```
                    w2,
                    1. /*one looks for the longest sequence*/
                    word_open,
                    word_close,                                              110
                    pos_open,
                    pos_close,
                    (char * (*)(int,
                                void *,
                                void *,
                                unsigned long *,
                                unsigned long *))nav_w_pos);

if (nb){
    for(i=0;i<=(nb-1);i++){                                                  120
      dep=(word_open[i] / 2);
      arr=(word_close[i] / 2) + 1;

find_suggs(&probs,
                 trans,
                 (unsigned long)dep,
                 (unsigned long)arr,
                 (unsigned long)(word_open[i]),
                 (char *(*)(int,
                            void *,                                          130
                            void *,
                            unsigned long *,
                            unsigned long *))nav_w_pos);

}
  }

*pprobs=probs;                                                             140
} char *nav_w_pos(int tp,
                void *arg1,
                void *arg2,
                unsigned long *p1,
                unsigned long *p2){
  static unsigned long count1;
  static unsigned long count2;                                               150 static word **sent;
  static unsigned long len;
  extern char *word_stag(word *wptr);

char *buff2=NULL;

if (tp==RESET_NAVIGATE){
    count1=count2=0;
```

(appendixC.c)

```c
}
else if (tp==NEXT_NAVIGATE){
   if ((count1 % 2)==0){
       buff2=(WORD_SPELLING(sent[count1/2]));
       count1++;
   }
   else{
     if (count1/2 < len){
        buff2=(word_stag(sent[count1/2]));
        count1++;
     }
   }
   count2=count1;
}
else if (tp==PREV_NAVIGATE){
   if (count2){
      count2--;
      if ((count2 % 2)==0){
         if (count2/2 < len){
            buff2=(WORD_SPELLING(sent[count2/2]));
         }
      }
      else{
        if (count2/2 <len){
           buff2=(word_stag(sent[count2/2]));
        }
      }
   }
}
else if (tp==INIT_NAVIGATE){
   sent=(word **)arg1;
   len = (int) (*p1);
}
else if (tp==GIVE_COUNT_NAVIGATE){
   *p1=count1-1;
   *p2=count2;
}
else if (tp==GIVE_POS_NAVIGATE){
   *p1=0;
   *p2=0;
}
else if (tp==GIVE_WORD_POS){
   if ((*p1 % 2)==0){
      buff2=(WORD_SPELLING(sent[(*p1)/2]));
   }
   else{
     if ((*p1)/2 < len){
        buff2=(word_stag(sent[(*p1)/2]));
     }
   }
}
else if (tp==IS_END_OF_STRING){
   if ((*p1)/2<len)
```

(appendixC.c)

```
        buff2=NULL;
    else
        buff2=(char *)1;
    } return buff2;
} unsigned long bmatch_abstr(AUT_D44 a1,
                           AUT_D44 a2,
                           int tp,
                           unsigned long *word_open,
                           unsigned long *word_close,
                           unsigned long *pos_open,
                           unsigned long *pos_close,
                           char *(*navigate)(int,
                                             void *,
                                             void *,
                                             unsigned long *,
                                             unsigned long *)){
  unsigned long nb,num,last,count1,count2,last_count,last_pos;
  unsigned long pos1,pos2,dep,interog1,interog2,dep2;
  unsigned char *str,*str2;
  ALP_T_D13 alph1,alph2;
  int fin;
  BLOC_D44 *bloc1,*bloc2;

nb=0;

(*navigate)(RESET_NAVIGATE,NULL,NULL,NULL,NULL);

bloc1=a1->bloc;
  bloc2=a2->bloc;
  alph1=a1->alp2;
  alph2=a2->alp2;
  interog1=ord_alptd13((unsigned char *)"???",alph1);
  interog2=ord_alptd13((unsigned char *)"???",alph2);

dep=0;
  while(str=(unsigned char *)(*navigate)(NEXT_NAVIGATE,NULL,NULL,NULL,NULL)){
    num=ord_alptd13(str,alph1);
    if (num!=LONG_OUT){
      if (bloc1[dep+num].g==num)
        dep=bloc1[dep+num].d;
      else if (bloc1[dep+interog1].g==interog1)
        dep=bloc1[dep+interog1].d;
      else{
        fprintf(stderr,"error bmtach_abstr 0: a1 should have a ??? transition at state %ld\n",dep);
        exit(0);
      }
    }
    else{
      if (bloc1[dep+interog1].g==interog1)
```

(appendixC.c)

```
      dep=bloc1[dep+interog1].d;
   else{
      fprintf(stderr,"error bmtach_abstr 0: a1 should have a ??? transition at state %ld\n",dep);
      exit(0);                                                                                    270
   }
} if(bloc1[dep+SORTE_POS_D44].g==COD_SORTE_D44){
   /*one looks backward*/
   dep2=0;
   if (tp==1)/*we look for the longest match*/{
      fin=NON;
      last=LONG_OUT;
      while(fin!=OUI){
         if (bloc2[dep2+SORTE_POS_D44].g==COD_SORTE_D44){                                          280
            (*navigate)(GIVE_COUNT_NAVIGATE,NULL,NULL,&count1,&count2);
            (*navigate)(GIVE_POS_NAVIGATE,NULL,NULL,&pos1,&pos2);
            last_count=count2;
            last_pos=pos2;
         } str2=(unsigned char *)(*navigate)(PREV_NAVIGATE,NULL,NULL,NULL,NULL);
         if (!str2)
            fin=OUI;                                                                               290
         else{
            num=ord_alptd13(str2.alph2);
            if (num!=LONG_OUT){
               if (bloc2[dep2+num].g==num)
                  dep2=bloc2[dep2+num].d;
               else if (bloc2[dep2+interog2].g==interog2)
                  dep2=bloc2[dep2+interog2].d;
               else
                  fin=OUI;
            }
            else if (bloc2[dep2+interog2].g==interog2)                                             300
               dep2=bloc2[dep2+interog2].d;
            else
               fin=OUI;
         }
      }
      if (last_count==LONG_OUT){
         fprintf(stderr,"error bmatch 1 inconsistency between the two dags, the backward search failed\
         exit(0);
      }
      (*navigate)(GIVE_COUNT_NAVIGATE,NULL,NULL,&count1,&count2);                                  310
      (*navigate)(GIVE_POS_NAVIGATE,NULL,NULL,&pos1,&pos2);
      word_open[nb]=last_count;
      word_close[nb]=count1;
      pos_open[nb]=last_pos;
      pos_close[nb]=pos1;
      nb++;

}
```

(appendixC.c)

```
      }
   }
   return nb;
} void find_suggs(problem **pprobs,
                TRANS_L44 trans,
                unsigned long dep,
                unsigned long arr,
                unsigned long dep_pos,
                char *(*navigate)(int,
                                  void *,
                                  void *,
                                  unsigned long *,
                                  unsigned long *)){
   unsigned long nb,i;
   char *rep;

point_out_problem(dep, arr, "Incorrect verb sequence",
                     "This sequence is either not correctly ordered or a verb is incorrectly inflected
                     pprobs);

nb=trans2_l44_str_buff(trans,
                          dep_pos,
                          (char *(*)(int,
                                     void *,
                                     void *,
                                     unsigned long *,
                                     unsigned long *))navigate);

if (nb){
      for(i=0;i<=(nb-1);i++){
         rep=(char *)malloc(1000);

if (build_repl(rep,(char **)chem_str[i])){ suggest_replacement(dep, arr, rep, pprobs);
         }
      }
   }

} int build_repl(char *rep,char **chem){
   char *ligne,res[100],tag2[100];
   int pre=1;
   int pos;
   int rr;
```

(appendixC.c)

```
  rr=1;
  *rep='\0';
  for(pos=0;*(chem[pos])!='\0';pos+=2){
     if (*(chem[pos+1])=='/'){
        for(ligne=&(chem[pos+1][1]);*ligne!='/';)
           ligne++;
        *ligne++='\0';
        ConvertBrowntagMorphtag(tag2,ligne);
        ChangeWord(res,chem[pos],&(chem[pos+1][1]),tag2);

if (!pre)
           strcat(rep," ");

if (*res=='\0'){
           rr=0;
           strcpy(res,chem[pos]);
           strcat(res,tag2);
        }
        strcat(rep,res);
     }
     else{
        if (!pre)
           strcat(rep," ");
        strcat(rep,chem[pos]);
     }
     pre=0;
  } return rr;
}
void ConvertBrowntagMorphtag(char *tag2,char *tag1){
  if (strcmp("vb",tag1)==0){
     strcpy(tag2,"+V+Inf");
  }
  else if (strcmp(tag1,"vbd")==0){
     strcpy(tag2,"+V+Pret");
  }
  else if (strcmp(tag1,"vbn")==0){
     strcpy(tag2,"+V+PP");
  }
  else if (strcmp(tag1,"vbg")==0){
     strcpy(tag2,"+V+Ing");
  }
  else if (strcmp(tag1,"vbz")==0){
     strcpy(tag2,"+V+IPr3s");
  }
} unsigned long trans2_l44_str_buff(TRANS_L44 trans,
```

(appendixC.c)

```
                    unsigned long pos_dep,
                    char *(*navigate)(int,
                                      void *,
                                      void *,
                                      unsigned long *,
                                      unsigned long *)){          430
unsigned char buff2[100],*buff3;
unsigned long trace_et,trace_let1,**trace_let2,max_chem_trans,let,epsi,interog2,interog_arr;
unsigned long *chem_act1,*chem_act2,*chem_act3,*actif;
unsigned char b1[1000];
unsigned long nb_chem,num_chem,nb_chem2,dep,i,j,k,fin,fin2,fin3,zero,prof,profin,prof_trace;
unsigned char * l_trans;
UBLOC ubl;
char *word;
ALP_T_D13 alph;
CELLT44 l;                                                        440
unsigned char **ligne,**lg2;
int trv_let;

alph=trans->alp2;
epsi=ord_alptd13((unsigned char *)"<E>",alph);
interog2=ord_alptd13((unsigned char *)"???",alph);

nb_chem=1;
max_chem_trans=1;                                                 450
chem_act1=buff1_chem_actif;
chem_act2=buff2_chem_actif;
actif=chem_act2;
chem_act1[0]=0;
deps[0]=0;
fin=NON;
est_actif[0]=1;
prof_in[0]=pos_dep;
prof_out[0]=0;
prof_trace=0;
while(fin!=OUI){                                                  460
   actif=chem_act2;
   nb_chem2=0;

for(i=0;i<=(nb_chem-1);i++){
      num_chem=chem_act1[i];

if (max_chem_trans<num_chem)
         max_chem_trans=num_chem;

dep=deps[num_chem];                                         470
      prof=prof_out[num_chem];
      profin=prof_in[num_chem];

word=(*navigate)(GIVE_WORD_POS,NULL,NULL,&profin,NULL);
      let=ord_alptd13((unsigned char *)word,alph);
      prof_in[num_chem]=profin;
```

(appendixC.c)

```
if (trans->etats[dep]->sorte==TERMINAL){
  strcpy((char *)(chem_str[num_chem][prof]),"\0");
  est_fini[num_chem]=1;
  est_actif[num_chem]=0;
  l=NULL;
} if ((*navigate)(IS_END_OF_STRING,NULL,NULL,&profin,NULL))
  {
  fin=OUI;
  if (trans->etats[dep]->sorte==TERMINAL){
    strcpy((char *)(chem_str[num_chem][prof]),"\0");
    est_fini[num_chem]=1;
  }
  else
    est_fini[num_chem]=0;
  est_actif[num_chem]=0;

l=NULL;/*trans->etats[dep]->liste;*/
}
else{
  l=trans->etats[dep]->liste;
  interog_arr=LONG_OUT;
  trv_let=NON;

while((l) &&
        (l->cel_g1!=let) &&
        (l->cel_g1!=epsi)){
    l=l->suivant;
  } if (l){
    fin=NON;

if (l->cel_g2!=epsi){
      nb_alptd13_ch(b1,l->cel_g2,alph);
      strcpy((char *)(chem_str[num_chem][prof]),(char *)b1);

prof_out[num_chem]++;
    } deps[num_chem]=l->cel_d;
    if (l->cel_g1!=epsi){
      trv_let=OUI;
      if (prof_in[num_chem]<=(MAX_LONG_CHEMIN-2)){
        prof_in[num_chem]++;
        *actif++=num_chem;
        fin=NON;
        nb_chem2++;
      }
      else
        est_actif[num_chem]=0;
```

(appendixC.c)

```
      }
      else{
        *actif++=num_chem;
        fin=NON;
        nb_chem2++;
      }
      l=l->suivant;
    }
    else{
      l=trans->etats[dep]->liste;                                540 while((l) && (l->cel_g1!=interog2)){
        l=l->suivant;
      }
      if (l){
        interog_arr=l->cel_d;

fin=NON;

strcpy((char *)(chem_str[num_chem][prof]).word);         550 prof_out[num_chem]++;

deps[num_chem]=l->cel_d;

if (prof_in[num_chem]<=(MAX_LONG_CHEMIN-2)){
          prof_in[num_chem]++;
          *actif++=num_chem;
          fin=NON;
          nb_chem2++;                                            560

}
        else
          est_actif[num_chem]=0;

l=l->suivant;
      }
      else
        est_actif[num_chem]=0;                                   570
    }
  } fin2=NON;
  while(fin2!=OUI){
    if (interog_arr==LONG_OUT){
      while(l && (l->cel_g1!=let) && (l->cel_g1!=epsi))
        l=l->suivant;
    }
    else{                                                        580
      while(l && (l->cel_g1!=interog2))
        l=l->suivant;
    }
```

(appendixC.c)

```c
    if (!l){
      if (trv_let==NON && interog_arr==LONG_OUT){
        interog_arr=1;
        l=trans->etats[dep]->liste;
      }
      else
        fin2=OUI;
    }
    else
    {
    fin3=NON;
    for(j=0;(j<=(max_chem-1)) && (fin3!=OUI);j++){
      if ((est_actif[j]==0) && (est_fini[j]==0))
        fin3=OUI;
    } if (fin3==OUI)
      if (max_chem_trans<j)
        max_chem_trans=j;

for(k=0;k<=(prof-1) && prof>0;k++)
        strcpy((char *)chem_str[j-1][k],(char *)chem_str[num_chem][k]);
      prof_out[j-1]=prof;
      prof_in[j-1]=profin;
      if (l->cel_g2!=epsi && l->cel_g1!=interog2){
        nb_alptd13_ch(chem_str[j-1][prof_out[j-1]],l->cel_g2.alph);
        prof_out[j-1]++;
      }
      else if (l->cel_g1==interog2){
        strcpy((char *)chem_str[j-1][prof_out[j-1]].word);
        prof_out[j-1]++;
      } deps[j-1]=l->cel_d;
      if (l->cel_g1!=epsi){
        if (prof_in[j-1]<=(MAX_LONG_CHEMIN-2)){
          prof_in[j-1]++;
          est_actif[j-1]=1;
          *actif++=j-1;
          nb_chem2++;
        }
      }
      else{
        est_actif[j-1]=1;
        *actif++=j-1;
        nb_chem2++;

}

}
    else
      fin2=OUI;
```

A

```
        l=l->suivant;
      }
    }
  } prof_trace++;

if (nb_chem2==0)
    fin=OUI;
  else
    fin=NON;

chem_act3=chem_act1;
  chem_act1=chem_act2;
  chem_act2=chem_act3;
  actif=chem_act2;
  nb_chem=nb_chem2;

}
prof_trace--;

nb_chem=0;
for(i=0;i<=(max_chem_trans);i++){
  if (est_fini[i]==1){
    if (i!=nb_chem){
      lg2=chem_str[nb_chem];
      ligne=chem_str[i];
      while(**ligne!='\0')
        strcpy((char *)*lg2++,(char *)*ligne++);
      **lg2='\0';
    }
    nb_chem+=1;
    est_fini[i]=0;
  }
  est_actif[i]=0;
} return(nb_chem);

}
```

(appendixD.c)

```
/******************************************

This programs test the function that takes a possibly wrong words
    and outputs the correct form by using two transducers This program can work only with trans1 and edlaf.translt5 in the same directory morpho_cor  -cor
    corrects morpho_cor  -ana
    analyse morpho_cor  -gene
    generate

*********************************************/

/*functions and structures common between appendixe B and appendixe D
are listed in appendixe D*/

TRANS_LT5 trans1;
TRANS_LT5 edlaf;

unsigned long *buff1_chem_actif;
unsigned long *buff2_chem_actif;
unsigned char *est_actif,*est_fini;
unsigned long *deps;
unsigned long *tabchar,max_chem;
unsigned char *prof_in,*prof_out;
unsigned char **chem;
unsigned char **chem1;
unsigned char ***chem_str;

unsigned char *tabcod;

unsigned char flitc(FILE *);
void init_tabcod(void);
TRANS_LT5 read_translt5(FILE *);
void alloc_transduc2_lt13(unsigned long **,
        unsigned long **,
        unsigned char **,
        unsigned char **,
        unsigned long **,
        unsigned long **,
        unsigned char **,
        unsigned char **,
        unsigned long);
```

(appendixD.c)

```c
#define MAX_CHEMIN 100
define MAX_LONG_CHEMIN 100 void init_morpho_cor(void);

unsigned long transduc2_lt5_buff(
                        unsigned char **,
                        unsigned char *,
                        TRANS_LT5,
                        unsigned long,
                        unsigned long *,
                        unsigned long *,
                        unsigned char *,
                        unsigned char *,
                        unsigned long *,
                        unsigned char *,
                        unsigned char *,
                        char,
                        unsigned char);

int morpho_cor(char **,char **,char *);
int ana_morpho(char **,char *);
int gene_morpho(char *,char *);

void main(int nb,char **arg){
  char buff[1000],**buff2,**ana;
  unsigned long n,i;

buff2=(char **)malloc(sizeof(char *)*10);
  for(i=0;i<=9;i++)
    buff2[i]=(char *)malloc(sizeof(char)*1000);

ana=(char **)malloc(sizeof(char *)*10);
  for(i=0;i<=9;i++)
    ana[i]=(char *)malloc(sizeof(char)*1000);

init_morpho_cor();

if (strcmp(arg[1],"-cor")==0){
    while(fgets(buff,999,stdin)){
      if ((*buff!='\n') && (*buff!='\0')){
        n=morpho_cor(buff2,ana,buff);
        if (n==0){
          fprintf(stdout,"No proposed correction\n");
        }
        else{
          for(i=0;i<=(n-1);i++){
```

(appendixD.c)

```c
            fprintf(stdout,"Proposed correction: %s (for %s)\n",buff2[i],ana[i]);
          }
        }
      }
    }
  }
  else if (strcmp(arg[1],"-ana")==0){
    while(fgets(buff,999,stdin)){
      if ((*buff!='\n') && (*buff!='\0')){
        n=ana_morpho(ana,buff);
        if (n==0){
          fprintf(stdout,"Not in the dictionary\n");
        }
        else{
          for(i=0;i<=(n-1);i++){
            fprintf(stdout,"analyse: %s\n",ana[i]);
          }
        }
      }
    }
  }
  else if (strcmp(arg[1],"-gene")==0){
    while(fgets(buff,999,stdin)){
      if ((*buff!='\n') && (*buff!='\0')){
        n=gene_morpho(ana[0],buff);
        if (n==0){
          fprintf(stdout,"Not in the dictionary\n");
        }
        else{
          fprintf(stdout,"generate: %s\n",ana[0]);
        }
      }
    }
  }
} void init_tabcod(void)
{
  int i;

tabcod=(unsigned char *)malloc(sizeof(char)*256);

for(i=0;i<=255;i++)
  {
    tabcod[i]=0;
  }
  tabcod[C1]=1;
  tabcod[C2]=2;
  tabcod[C3]=3;
```

(appendixD.c)

```c
} unsigned char getc(FILE *f)
{
  unsigned char c;

c=getc(f);
  switch (tabcod[c])
  {
    case 0: {return(c);break;}
    case 2: {
              c=fgetc(f);
              if (c==C2)
                return(C2);
              else return(C1);
              break;
            }
    case 3: { c=fgetc(f);
          return(C3);break;}
  }
}

TRANS_LT5 read_translt5(FILE *f)
{
  TRANS_LT5 trans;
  UBLOC ubl;
  unsigned char c;

trans=(TRANS_LT5)malloc(TAILLE_TRANSLT5);

c=getc(f);
  if (c!=T_TRANS_LT5)
    {
       fprintf(stderr,"error read_translt5 0 : the file is not of format TRANS_LT5\n");
       exit(0);
    } ifndef INV
  ubl.str[0]=getc(f);
  ubl.str[1]=getc(f);
  ubl.str[2]=getc(f);
  ubl.str[3]=getc(f);
#else
  ubl.str[3]=getc(f);
  ubl.str[2]=getc(f);
  ubl.str[1]=getc(f);
  ubl.str[0]=getc(f);
endif
  trans->nb_etat=ubl.l;

#ifndef INV
  ubl.str[0]=getc(f);
```

(appendixD.c)

```c
    ubl.str[1]=getc(f);
    ubl.str[2]=getc(f);
    ubl.str[3]=getc(f);
#else
    ubl.str[3]=getc(f);
    ubl.str[2]=getc(f);
    ubl.str[1]=getc(f);
    ubl.str[0]=getc(f);
endif
    trans->taille=ubl.l;

trans->transitions=(unsigned char *)malloc(sizeof(char)*trans->taille);
    fread(trans->transitions,sizeof(char),trans->taille,f);

return(trans);
} void alloc_transduc2_lt13(unsigned long **pbuff1_chem_actif,
        unsigned long **pbuff2_chem_actif,
        unsigned char **pest_actif,
        unsigned char **pest_fini,
        unsigned long **pdeps,
        unsigned long **ptabchar,
        unsigned char **pprof_in,
        unsigned char **pprof_out,
        unsigned long max_chem)
{
    unsigned long i;

*pbuff1_chem_actif=(unsigned long *)malloc(sizeof(long)*max_chem);
    *pbuff2_chem_actif=(unsigned long *)malloc(sizeof(long)*max_chem);
    *pest_actif=(unsigned char *)calloc(max_chem,sizeof(char));
    *pest_fini=(unsigned char *)calloc(max_chem,sizeof(char));
    *pdeps=(unsigned long *)malloc(sizeof(long)*max_chem);
    *ptabchar=(unsigned long *)malloc(sizeof(long)*256);
    *pprof_in=(unsigned char *)malloc(sizeof(char)*max_chem);
    *pprof_out=(unsigned char *)malloc(sizeof(char)*max_chem);

} void init_morpho_cor(void){
    unsigned char c;
    unsigned long i,j;
    FILE *f;

init_tabcod();

f=fopen("trans1","rb");
    if (!f){
```

(appendixD.c)

```
    fprintf(stderr,"I coudn't find the file trans1 in the current directory\n");
    exit(0);
} c=getc(f);
trans1=read_translt5(f);
fclose(f);

f=fopen("edlaf.translt5","rb");
if (!f){
    fprintf(stderr,"I coudn't find the file edlaf.translt5 in the current directory\n");
    exit(0);
} c=getc(f);
edlaf=read_translt5(f);
fclose(f);

alloc_transduc2_lt13(
                    &buff1_chem_actif,
                    &buff2_chem_actif,
                    &est_actif,
                    &est_fini,
                    &deps,
                    &tabchar,
                    &prof_in,
                    &prof_out,
                    MAX_CHEMIN);

chem=(unsigned char **)malloc(sizeof(char *)*MAX_CHEMIN);
for(i=0;i<=(MAX_CHEMIN-1);i++)
   chem[i]=(unsigned char *)malloc(sizeof(char)*MAX_LONG_CHEMIN);

chem_str=(unsigned char ***)malloc(sizeof(char **)*MAX_CHEMIN);
for(i=0;i<=(MAX_CHEMIN-1);i++){
   chem_str[i]=(unsigned char **)malloc(sizeof(char *)*MAX_LONG_CHEMIN);
   for(j=0;j<=(MAX_LONG_CHEMIN -1);j++)
      chem_str[i][j]=(unsigned char *)malloc(sizeof(char)*100);
} chem1=(unsigned char **)malloc(sizeof(char *)*MAX_CHEMIN);
for(i=0;i<=(MAX_CHEMIN-1);i++)
   chem1[i]=(unsigned char *)malloc(sizeof(char)*MAX_LONG_CHEMIN);

} unsigned long transduc2_lt5_buff(
                                unsigned char **chem,
                                unsigned char *buff,
                                TRANS_LT5 trans,
                                unsigned long max_chem,
```

(appendixD.c)

```
                            unsigned long *buff1_chem_actif,
                            unsigned long *buff2_chem_actif,
                            unsigned char *est_actif,
                            unsigned char *est_fini,
                            unsigned long *deps,
                            unsigned char *prof_in,
                            unsigned char *prof_out,
                            char tp,
                            unsigned char trace1)
{
  unsigned char *ligne,buff2[100],*buff3;
  unsigned long **trace_et,**trace_let1,**trace_let2,max_chem_trans;
  unsigned long *chem_act1,*chem_act2,*chem_act3,*actif;
  unsigned char *lg2;
  unsigned long nb_chem,num_chem,nb_chem2,dep,i,j,k,fin,fin2,fin3,zero,prof,profin,prof_trace;
  unsigned char * l_trans;
  UBLOC ubl;

/*    for(i=0;i<=(max_chem-1);i++)
        {
        est_actif[i]=0;
        est_fini[i]=0;
        }*/ nb_chem=1;
  max_chem_trans=1;
  chem_act1=buff1_chem_actif;
  chem_act2=buff2_chem_actif;
  actif=chem_act2;
  chem_act1[0]=0;
  deps[0]=0;
  fin=NON;
  ligne=buff;
  fin=NON;
  est_actif[0]=1;
  prof_in[0]=0;
  prof_out[0]=0;
  prof_trace=0;
  while(fin!=OUI)
    {
      actif=chem_act2;
      nb_chem2=0;

for(i=0;i<=(nb_chem-1);i++)
        {
          num_chem=chem_act1[i];

if (max_chem_trans<num_chem)
            max_chem_trans=num_chem;

dep=deps[num_chem];
          prof=prof_out[num_chem];
```

(appendixD.c)

```c
        profin=prof_in[num_chem];

ligne=&(buff[profin]);
    while(*ligne==EPSI_TRANSL13)
        {
            ligne++;
            profin++;
        }
    prof_in[num_chem]=profin;

if ((*ligne=='\0') || (*ligne=='\n'))
        {
            fin=OUI;
            if (trans->transitions[dep]==IS_TERMINAL_LT5)
                {
                    chem[num_chem][prof]='\0';
                    est_fini[num_chem]=1;
                    if (trace1==1)
                        trace_et[num_chem][prof_trace]=LONG_OUT;
                }
            else
                est_fini[num_chem]=0;
            est_actif[num_chem]=0;
            if (trans->transitions[dep]==IS_TERMINAL_LT5)
                l_trans=&(trans->transitions[dep+1]);
            else
                l_trans=&(trans->transitions[dep]);
        }
    else
        {
            if (trans->transitions[dep]==IS_TERMINAL_LT5)
                l_trans=&(trans->transitions[dep+1]);
            else
                l_trans=&(trans->transitions[dep]);
            if (tp==1)
                {
                    while((*l_trans!=FIN_TRANSI_LT5) &&
                          (*l_trans!=*ligne) &&
                          (*l_trans!=EPSI_TRANSL13))
                        {
                            l_trans+=5;
                        }
                }
            else
                {
                    while((*l_trans!=FIN_TRANSI_LT5) &&
                          (l_trans[1]!=*ligne) &&
                          (l_trans[1]!=EPSI_TRANSL13))
                        {
                            l_trans+=5;
                        }
                }
            if (*l_trans!=FIN_TRANSI_LT5)
```

(appendixD.c)

```
        {
          fin=NON;
          if (((tp==1) && (l_trans[1]!=EPSI_TRANSL13)) || ((tp==2) && (*l_trans!=EPSI_TRANSL13)))
            {
                                                                                              430
              if (tp==1)
                chem[num_chem][prof]=l_trans[1];
              else
                chem[num_chem][prof]=*l_trans;

prof_out[num_chem]++;
            }
ifndef INV
          ubl.str[0]=l_trans[2];
          ubl.str[1]=l_trans[3];
          ubl.str[2]=l_trans[4];                                                              440
          ubl.str[3]=0;
#else
          ubl.str[3]=l_trans[2];
          ubl.str[2]=l_trans[3];
          ubl.str[1]=l_trans[4];
          ubl.str[0]=0;
endif
          deps[num_chem]=ubl.l;
          if (((tp==1) && (*l_trans!=EPSI_TRANSL13)) || ((tp==2) && (l_trans[1]!=EPSI_TRANSL13)))
            {                                                                                 450
              if (prof_in[num_chem]<=(MAX_LONG_CHEMIN-2))
                {
                  prof_in[num_chem]++;
                  *actif++=num_chem;
                  fin=NON;
                  nb_chem2++;

}
              else
                est_actif[num_chem]=0;                                                        460

}
          else
            {
              *actif++=num_chem;
              fin=NON;
              nb_chem2++;

}
          l_trans+=5;                                                                         470
        }
      else
        est_actif[num_chem]=0;
    } fin2=NON;
```

A (appendixD.c)

```
while(fin2!=OUI)
  {
     if (tp==1)
       {
          while((*l_trans!=FIN_TRANSI_LT5) && (*l_trans!=*ligne) && (*l_trans!=EPSI_TRANSL13))
            {
               l_trans+=5;
            }
       }
     else
       {
          while((*l_trans!=FIN_TRANSI_LT5) && (l_trans[1]!=*ligne) && (l_trans[1]!=EPSI_TRANSL13))
            {
               l_trans+=5;
            }
       } if (*l_trans==FIN_TRANSI_LT5)
        fin2=OUI;
     else
       {
          fin3=NON;
          for(j=0;(j<=(max_chem-1)) && (fin3!=OUI);j++)
            {
               if ((est_actif[j]==0) && (est_fini[j]==0))
                  fin3=OUI;
            } if (fin3==OUI)
            {
               if (max_chem_trans<j)
                  max_chem_trans=j;

for(k=0;k<=(prof-1) && prof>0;k++)
                  chem[j-1][k]=chem[num_chem][k];
               prof_out[j-1]=prof;
               prof_in[j-1]=profin;
               if (trace1==1)
                 {
                    for(k=0;k<=(prof_trace-1) && (prof_trace>0);k++)
                      {
                         /*         trace_et[j-1][k]=trace_et[num_chem][k];
                                    trace_let1[j-1][k]=trace_let1[num_chem][k];
                                    trace_let2[j-1][k]=trace_let2[num_chem][k];*/
                      }
                 }
               if (((tp==1) && (l_trans[1]!=EPSI_TRANSL13)) || ((tp==2) && (*l_trans!=EPSI_TRANS
                 {
                    if (tp==1)
                       chem[j-1][prof_out[j-1]]=l_trans[1];
                    else
                       chem[j-1][prof_out[j-1]]=*l_trans;
```

(appendixD.c)

```
                    prof_out[j-1]++;

}
ifndef INV
            ubl.str[0]=l_trans[2];
            ubl.str[1]=l_trans[3];
            ubl.str[2]=l_trans[4];
            ubl.str[3]=0;
else                                                                        540 ubl.str[3]=l_trans[2];
            ubl.str[2]=l_trans[3];
            ubl.str[1]=l_trans[4];
            ubl.str[0]=0;
endif deps[j-1]=ubl.l;
            if (((tp==1) && (*l_trans!=EPSI_TRANSL13)) || ((tp==2) && (l_trans[1]!=EPSI_TRANS
                {
                    if (prof_in[j-1]<=(MAX_LONG_CHEMIN-2))                    550
                        {
                            prof_in[j-1]++;
                            est_actif[j-1]=1;
                            *actif++=j-1;
                            nb_chem2++;
                        }
                }
                else
                    {                                                        560
                        est_actif[j-1]=1;
                        *actif++=j-1;
                        nb_chem2++;

}

}
            else
                fin2=OUI;                                                    570 l_trans+=5;
        }
    }
} prof_trace++;

if (nb_chem2==0)
    fin=OUI;
else                                                                         580
    fin=NON;
*ligne++;
chem_act3=chem_act1;
```

(appendixD.c)

```c
            chem_act1=chem_act2;
            chem_act2=chem_act3;
            actif=chem_act2;
            nb_chem=nb_chem2;

}
    prof_trace--;

nb_chem=0;
    for(i=0;i<=(max_chem_trans);i++)
        {
            if (est_fini[i]==1)
                {
                    lg2=chem[nb_chem];
                    ligne=chem[i];
                    while(*ligne!='\0')
                        *lg2++=*ligne++;
                    *lg2='\0';
                    nb_chem+=1;

est_fini[i]=0;
                }
            est_actif[i]=0;
        } return(nb_chem);

} int morpho_cor(char out,char ana,char *in){
    unsigned long nb_chem,i,nb,nb_chem0;
    int fin,result;
    char buff3[1000],*ligne,prev[1000];

strcpy(prev,"default");

nb_chem=transduc2_lt5_buff(chem,
                               (unsigned char *)in,
                               trans1,
                               MAX_CHEMIN,
                               buff1_chem_actif,
                               buff2_chem_actif,
                               est_actif,
                               est_fini,
                               deps,
                               prof_in,
                               prof_out,
                               2, /*tp==2*/
                               0);
```

(appendixD.c)

```
if (nb_chem>=1){
  nb=0;
  nb_chem0=nb_chem;
  for(i=0;i<=(nb_chem0-1);i++){
    strcpy(buff3,chem[i]);
    ligne=buff3;
    fin=0;
    while(fin!=1){
      while(*ligne!='+')
        ligne++;
      if (strcmp(ligne,"+Corr")==0){
        fin=1;
        *ligne='\0';
      }
      else{
        fin=0;
        ligne++;
      }
    } if (strcmp(buff3,prev)!=0){
      strcpy(ana[nb],buff3);
      strcpy(prev,buff3);
      nb_chem=transduc2_lt5_buff(chem1,
                    (unsigned char *)buff3,
                    edlaf,
                    MAX_CHEMIN,
                    buff1_chem_actif,
                    buff2_chem_actif,
                    est_actif,
                    est_fini,
                    deps,
                    prof_in,
                    prof_out,
                    1, /*tp==1*/
                    0);
      strcpy(out[nb++],chem1[0]);
    }
  }
  result=nb;
}
else
  result=nb_chem;

return result;
} int ana_morpho(char **out,char *in){
  unsigned long nb_chem,i;
  int fin,result;
  char buff3[1000],*ligne;

nb_chem=transduc2_lt5_buff(chem,
```

640

650

660

670

680

```
                    (unsigned char *)in,
                    edlaf,
                    MAX_CHEMIN,
                    buff1_chem_actif,
                    buff2_chem_actif,
                    est_actif,
                    est_fini,
                    deps,
                    prof_in,
                    prof_out,
                    2, /*tp==2*/
                    0);

if (nb_chem>=1){
    result=nb_chem;
    for(i=0;i<=(result-1);i++){
      strcpy(out[i].chem[i]);
    }
  }
  else
    result=nb_chem;

return result;
} int gene_morpho(char *out,char *in){
  unsigned long nb_chem,i;
  int fin,result;
  char buff3[1000],*ligne;

nb_chem=transduc2_lt5_buff(chem,
                    (unsigned char *)in,
                    edlaf,
                    MAX_CHEMIN,
                    buff1_chem_actif,
                    buff2_chem_actif,
                    est_actif,
                    est_fini,
                    deps,
                    prof_in,
                    prof_out,
                    1, /*tp==1*/
                    0);

if (nb_chem>=1){
    result=1;
    strcpy(out,chem[0]);
  }
  else
    result=nb_chem;

return result;
}
```

(appendixD.c)

750

(appendixE.c)

```c
/* States of parsing a noun phrase */
#define AWAIT_HEAD_NOUN 1
#define AWAIT_MODIFIERS 2

/* Static vars */
static char **det_expls = NULL;     /* stores output of check_dets() */
static char linebuff[BUFSIZ];
static char idiombuff[BUFSIZ];
static FILE *mnd;        /* mass-noun dictionary */
static FILE *mtnd;       /* mass-title-noun dictionary */
static idiom **idioms;   /* idioms from the idiom dictionary */

/* Forward declarations */
int determiner_p(char *pos);
int modifier_p(char *pos);
int conjunct_last_p(char *pos);
int conjunct_rest_p(char *pos);
int head_noun_p(char *pos);
int title_p(char *pos);
int proper_noun_p(char *pos);
int singular_noun_p(char *pos);
int plural_noun_p(char *pos);

/*-----------------------------------------------------------------
 |                                                                |
 |     Top-level routine: check_dets()                            |
 |                                                                |
 *-----------------------------------------------------------------

/* Make suggestions about where to insert determiners in a sentence.
   Add these suggestions to an existing list (which 'suggs_ptr' points to).
   Also, as a side effect, set 'det_expls' to an array
   of explanations about what we did for each word in the sentence.
   This variable 'det_expls' will go away next time this function is called.
   'sent' gives the sentence as a NULL-terminated array of wordptr's. */
void check_dets(wordptr sent[], problem **probs_ptr)
{
    int i, len, state, noun_conjuncts, mod_conjuncts, add_left_bracket_p;
    int head_i, head_type;
    char *expl, *spelling, *pos, *head_spelling;
    idiom *id;

len = SentLength(sent);
    if (det_expls != NULL) free_string_array(det_expls);
    det_expls = new_string_array(len);

state = AWAIT_HEAD_NOUN;
    noun_conjuncts = 0;     /* no. of terms in current noun conjunction */
    mod_conjuncts = 0;      /* no. of terms in current (mod* noun) conjunction */

/* Traverse sentence backwards, so we will hit head nouns first. */
    for (i = len-1; i >= 0; i--) {
```

(appendixE.c)

```
spelling = WORD_SPELLING(sent[i]);
pos = word_stag(sent[i]);
add_left_bracket_p = FALSE;

switch(state) { case AWAIT_HEAD_NOUN:
  if (head_noun_p(pos)) {
    if (noun_conjuncts == 0) {
      /* This is the head noun of the whole NP */
      head_type = head_noun_type(sent[i]);
      head_spelling = WORD_SPELLING(sent[i]);
      head_i = i;
      mark_np_end(sent[i]);
    } else {
      det_expls[i] = conjunct_head_noun_expl(spelling, head_spelling);
    } state = AWAIT_MODIFIERS;
  } else {
    det_expls[i] = non_head_noun_expl(spelling);
  } break;

case AWAIT_MODIFIERS:
  if (determiner_p(pos)) {
    if (head_type == PROPER_NOUN) {
      /* If the head noun was proper, there shouldn't be a determiner */
      point_out_extraneous_determiner(i, head_i, sent, probs_ptr);
    } else {
      expl = already_has_det_expl(head_spelling, spelling);
      det_expls[head_i] = expl;
    } det_expls[i] = determiner_expl(spelling);
    add_left_bracket_p = TRUE;
    state = AWAIT_HEAD_NOUN;
    noun_conjuncts = 0;
    mod_conjuncts = 0;
  } else if (modifier_p(pos)) {
    det_expls[i] = modifier_expl(spelling);
  } else {
    det_expls[i] = non_head_noun_expl(spelling);

/* Look "ahead" one word to see if there's a conjunction w/i the NP */
    if (i > 0 && head_noun_p(word_stag(sent[i-1])) &&
        ((noun_conjuncts == 0) ?
          conjunct_last_p(pos) : conjunct_rest_p(pos))) {
      /* Continue with next simple NP in big NP ("the trucks and cars") */
      state = AWAIT_HEAD_NOUN;
      noun_conjuncts++;
      mod_conjuncts = 0;
```

(appendixE.c)

```
    } else if (i > 0 && modifier_p(word_stag(sent[i-1])) &&
            ((mod_conjuncts == 0) ?
              conjunct_last_p(pos) : conjunct_rest_p(pos))) {
        /* Continue with next mod in simple NP ("the red and blue truck") */      110
        mod_conjuncts++;
    } else {
        /* Hit first word to the left of the NP -- and it's not a det */
        if (head_type == SINGULAR_NOUN) {
            maybe_point_out_missing_determiner(i+1, head_i, sent, probs_ptr);
        } else {
            expl = non_singular_noun_expl(head_spelling, head_type);
            det_expls[head_i] = expl;
        }
                                                                                  120
        mark_np_start(sent[i+1]);
        state = AWAIT_HEAD_NOUN;
        noun_conjuncts = 0;
        mod_conjuncts = 0;
    }
} break;

default:                                                                          130
    myerror("check_dets: invalid internal state (%d)", state);
    break;

} /* end 'switch(state)' */ if (add_left_bracket_p) mark_np_start(sent[i]);

} /* end 'for' loop */ if (state == AWAIT_MODIFIERS) {                                                   140
    /* Unfinished NP */
    if (head_type == SINGULAR_NOUN) {
        maybe_point_out_missing_determiner(0, head_i, sent, probs_ptr);
    } else {
        expl = non_singular_noun_expl(head_spelling, head_type);
        det_expls[head_i] = expl;
    } mark_np_start(sent[0]);
}
                                                                                  150
}
```

```
/*----------------------------------------------------------------------
|                                                                  |
|     Identify relevant parts of speech                            |
|                                                                  |
*----------------------------------------------------------------------
```

(appendixE.c)

```c
/* Return TRUE iff 'pos' represents a determiner.
   'pos' is a Brown tag. */
int determiner_p(char *pos)
{
  char *stripped = strip_pos(pos);

return(prefix_p("at", stripped) ||
         prefix_p("dt", stripped) ||
         prefix_p("cd", stripped) ||
         prefix_p("pn$", stripped) ||
         strcmp("pp$", stripped) == 0 ||
         prefix_p("wp$", stripped) ||
         prefix_p("np$", stripped) ||
         prefix_p("nps$", stripped));
}

/* Return TRUE iff 'pos' represents a modifier of a noun.
   'pos' is a Brown tag. */
int modifier_p(char *pos)
{
  char *stripped = strip_pos(pos);

return(prefix_p("j", stripped) ||
         prefix_p("vbg", stripped) ||
         prefix_p("vbn", stripped) ||
         prefix_p("n", stripped) ||
         prefix_p("od", stripped) ||
         (prefix_p("ql", stripped) && stripped[2] != 'p') ||
         prefix_p("ap", stripped) ||
         prefix_p("rb", stripped));
}

/* Return TRUE iff 'pos' represents a conjunct word (like "and")
   between the last two words of a conjunction.
   'pos' is a Brown tag. */
int conjunct_last_p(char *pos)
{
  char *stripped = strip_pos(pos);

return(prefix_p("cc", stripped));
}

/* Return TRUE iff 'pos' represents a conjunct word (like "and")
   between the two words (except the last two) of a conjunction.
   'pos' is a Brown tag. */
int conjunct_rest_p(char *pos)
{
  char *stripped = strip_pos(pos);

return(prefix_p("cc", stripped) ||
```

(appendixE.c)

```
        prefix_p(",", stripped));
}

/* Return TRUE iff 'pos' represents a head noun.
   'pos' is a Brown tag. */
int head_noun_p(char *pos)
{
  char *stripped = strip_pos(pos);                                              220 return(strcmp("nn", stripped) == 0 ||
         strcmp("nns", stripped) == 0 ||
         strcmp("np", stripped) == 0 ||
         strcmp("nps", stripped) == 0);
}

/* Return TRUE iff 'pos' is part of a title.
   'pos' is a Brown tag. */                                                     230
int title_p(char *pos)
{
  return(suffix_p("-tl", pos));
}

/* Return TRUE iff 'pos' represents a proper noun.
   'pos' is a Brown tag. */
int proper_noun_p(char *pos)
{                                                                               240
  char *stripped = strip_pos(pos);

return(strcmp("np", stripped) == 0);
}

/* Return TRUE iff 'pos' represents a singular noun.
   'pos' is a Brown tag. */
int singular_noun_p(char *pos)
{                                                                               250
  char *stripped = strip_pos(pos);

return(strcmp("nn", stripped) == 0);
}

/* Return TRUE iff 'pos' represents a plural noun.
   'pos' is a Brown tag. */
int plural_noun_p(char *pos)
{                                                                               260
  char *stripped = strip_pos(pos);

return(strcmp("nns", stripped) == 0);
}
```

(appendixG.c)

```
/*------------------------------------------------------------
 |                                                            |
 |    Look up a word in Collins English Dictionary            |
 |                                                            |
 *------------------------------------------------------------*/ include <stdio.h>
include <string.h>
#include <ctype.h>
#include <varargs.h>    /* used by report_error() */

/*------------------------------------------------------------
 |                                                            |
 |    Header file for misc.c                                  |
 |    Defines miscellaneous utilities.                        |
 |                                                            |
 |                                                            |
 *------------------------------------------------------------*/ ifndef _MISC_
define _MISC_ include <stdio.h> ifndef TRUE
define TRUE 1
endif ifndef FALSE
define FALSE 0
#endif

/* Macros to construct filenames in the gcheck directory tree.
    Example of usage:  GCHECK_SRC_FILE("dets.c")
    These macros can only be used by other #DEFINEs to define
    constant filenames. */
#define GCHECK_SRC_DIR       "/projects/gcheck/gc04"
#define GCHECK_DATA_DIR      "/projects/gcheck/gc04/data"
#define GCHECK_SRC_FILE(X)   GCHECK_SRC_DIR "/" X
define GCHECK_DATA_FILE(X)  GCHECK_DATA_DIR "/" X /* Macros to shorten Tcl declarations */
define DEF_TCL(x) int x (ClientData data, Tcl_Interp *interp, \
                          int argc, char *argv[])
#define TCL_CREATE(x,y) Tcl_CreateCommand(interp, x, y, (ClientData) NULL, \
                          (Tcl_CmdDeleteProc *) NULL)

extern int prefix_p(char *prefix, char *string);
extern int suffix_p(char *suffix, char *string);
extern char *mystrdup(char *string);
extern char *mysubstr(char *string, int first, int next);
extern int next_token(char *line, int *first, int *next, char *separators);
extern int next_nonspace_token(char *line, int *first, int *next);
```

(appendixG.c)

```c
extern char **new_string_array(int n);
extern void free_string_array(char **strings);
extern int string_array_len(char **strings);
extern void *mymalloc(size_t n);
extern void *mycalloc(size_t nelem, size_t elsize);
extern void myfree(void *ptr);
extern char *strip_pos(char *pos);
extern void myerror();
extern int fsprintf();
extern int mystrcmp(char **s1, char **s2);
extern FILE *myfopen(const char *filename, const char *mode);
endif
```

```
/*------------------------------------------------------------------
 |                                                  |
 |    Header file for lookup.h                      |
 |    Look up a word in Collins English Dictionary. |
 |                                                  |
 |                                                  |
 *------------------------------------------------------------------*/ ifndef _LOOKUP_
define _LOOKUP_

/* Part-of-speech tags used in CED */
#define CED_ANY   0    /* part-of-speech is not specified */
#define CED_ADJ   1    /* adjective */
#define CED_ADV   2    /* adverb */
#define CED_CONJ  3    /* conjunction */
#define CED_DET   4    /* determiner */
#define CED_INT   5    /* interjection */
#define CED_N     6    /* noun */
#define CED_PRE   7    /* prefix */
#define CED_PREP  8    /* preposition */
#define CED_PRO   9    /* pronoun */
#define CED_SUF   10   /* suffix */
#define CED_V     11   /* verb */
define CED_NONE  12   /* part-of-speech is invalid */ extern int init_lookup_def(char *errstring);
extern int lookup_def(char *word, int pos_id, char *str,
                      int len, int linewidth);

endif define MAXDICTFILES 150
define FIND_ENTRY 1
#define FIND_POS 2
#define FIND_DEF 3
#define FILENAMELEN 256
#define DEFNUMLEN 6
```

(appendixG.c)

```c
#define EMMANUEL_SEP '+'
#define MATCHING_TITLELEN 100
#define NONMATCHING_TITLELEN 200

/* 'result' -- records a definition of a word */
struct result {
  char *start;    /* beginning of result string */
  char *end;      /* pointer to terminating null byte of result string */
  char *backup;   /* pointer that we cannot back up over when erasing */
  int width;      /* max characters allowed per line of result */
  int len;        /* max total chars allowed in result */
  int full;       /* non-nil IFF the result string is full */
};

/* 'pos' -- a part-of-speech used in CED */
struct pos {
  int id;             /* integer code from lookup.h */
  char *ced_name;     /* name of this part of speech as used in CED entries */
  char *print_name;   /* name of this part of speech used in printouts */
};

typedef struct pos pos;
typedef struct result result;

static char dictdir[] = "/projects/schabes/dicts/ced";
static char dirfile[] = "/projects/schabes/dicts/ced/CONTENTS";
static char *dictfiles[MAXDICTFILES];
static int numdictfiles = 0;
static char pathname[FILENAMELEN];
static char linebuff[BUFSIZ];
static FILE *dict_fp;
static long int dict_offset;
static char *dict_word = NULL;
static int total = 0;
static int ananum = 1;
static int defnum = 1;

static pos ced_pos[] = {
  {CED_ADJ, "adj.", "adjective"},
  {CED_ADV, "adv.", "adverb"},
  {CED_CONJ, "conj.", "conjunction"},
  {CED_DET, "determiner.", "determiner"},
  {CED_INT, "interj.", "interjection"},
  {CED_N, "n.", "noun"},
  {CED_PRE, "prefix.", "prefix"},
  {CED_PREP, "prep.", "preposition"},
  {CED_PRO, "pron.", "pronoun"},
  {CED_SUF, "suffix.", "suffix"},
  {CED_V, "vb.", "verb"},
  {CED_ANY, NULL, NULL}
};

/* Forward declarations */
```

(appendixG.c)

```
void bubble_sort(char *words[], int len);
int my_strcmp(char *s1, char *s2);
int find_definition(char *word, FILE **fp, long int *offset);
int show_definition(result *res, char *word, int pos_id,
                    FILE *fp, long int offset);
int isdefnum(char *line);
char *emmanuel_inflection_name(char *analysis);
char *emmanuel_root(char *analysis);
int compare_cedtags(int pos1, int pos2, int matching);
void init_result(result *res, char *str, int width, int len);
void write_result();
void terminate_result(result *res);
void write_title(result *res, char *word, int pos_id, int matching);
void describe_analysis(result *res, char *word, char *root, char *analysis);
int ced_name_to_id(char *str, int i);
int print_name_to_id(char *print_name);
char *id_to_print_name(int pos_id);
int write_def(result *res, char *text);
int space_in_result_p(result *res, int n);

/*-------------------------------------------------------------------
 |                                                          |
 |      Initialization for reading from dictionary          |
 |                                                          |
 *-------------------------------------------------------------------

/* Initialize for calling lookup_def().
   We set the globals 'dictfiles' and 'numdictfiles'.
   If successful, return TRUE, else return FALSE and put an error
   message in 'errstring'. */
int init_lookup_def(char *errstring)
{
  FILE *fp;
  int i;

fp = fopen(dirfile, "r");
  if (fp == NULL) {
    sprintf(errstring, "init_lookup_def: couldn't open %s", dirfile);
    return FALSE;
  }
  numdictfiles = 0;

while (fgets(linebuff, BUFSIZ, fp) != NULL) {
    if (numdictfiles >= MAXDICTFILES) {
      sprintf(errstring, "init_lookup_def: hit max # of dict files (%d)",
              MAXDICTFILES);
      return FALSE;
    }

/* Copy filename, clipping trailing newline */
    dictfiles[numdictfiles++] = mysubstr(linebuff, 0, strlen(linebuff)-1);
  }
```

```
/* Sort filenames alphabetically. */
bubble_sort(dictfiles, numdictfiles);

fclose(fp);
return TRUE;
}

/* Bubblesort from Knuth, vol II, p.107.
   Adapted for indices to be 0..n-1 instead of 1..n */
void bubble_sort(char *words[], int len)
{
  int bound, t, j;
  char *tmp;

bound = len;

while (TRUE) {
    t = 0;

for (j = 1; j < bound; j++) {
      if (my_strcmp(words[j-1], words[j]) > 0) {
        /* Swap elements */
        tmp = words[j-1];
        words[j-1] = words[j];
        words[j] = tmp;

t = j;
      }
    } if (t == 0) {
      break;
    } else {
      bound = t;
    }
  }
}

/* Compare two strings, ignoring non-alphanumeric characters,
   and irrespective of case.
   Return +1 if s1 is alphabetically after s2,
   0 if they're equal, and -1 if s1 is alphabetically before s2. */
int my_strcmp(char *s1, char *s2)
{
  char *p1, *p2;
  char c1, c2;

p1 = s1;
  p2 = s2;
```

(appendixG.c)

```c
    while (*p1 != '\0' && *p2 != '\0') {
        if (!isalnum(*p1)) {
            p1++;
        } else if (!isalnum(*p2)) {
            p2++;
        } else {
            c1 = tolower(*p1);
            c2 = tolower(*p2);

if (c1 != c2) {
                return(c1 > c2 ? 1 : -1);
            } else {
                p1++;
                p2++;
            }
        }
    } if (*p1 == '\0') {
        return( (*p2 == '\0') ? 0 : -1);
    } else {
        return(1);    /* *p2 must be \0, else 'while' wouldn't have terminated */
    }
}

/*-----------------------------------------------------------------------
 |                                                                      |
 |      Look up a word in the dictionary.                               |
 |                                                                      |
 *----------------------------------------------------------------------*/

/* Look up 'word' in the dictionary.
    'pos' is CED_ANY or the id of the part-of-speech of interest.
    If successful, return TRUE and put the definition in 'str',
    else return FALSE and put an error message in 'str'.
    Simply not finding the word does NOT count as an error.
    'str' is a pre-allocated string of 'len' chars ('len' should be
    at least 100-200 to hold error messages).
    'linewidth' is the max allowed length of an output line. */
int lookup_def(char *word, int pos_id, char *str, int len, int linewidth)
{
    int i, j, n, emm_pos, matching, got_any, thislen;
    char *root;
    FILE *fp;
    long int offset;
    extern char **ana;
    result res;
    extern int ana_morpho(char **, char *);

if (numdictfiles <= 0) {
        sprintf(str, "lookup_def: call init_lookup_def() first");
        return FALSE;
```

(appendixG.c)

```
}

/* Initialize globals */
total = 0;      /* Number of chars written into result so far */
ananum = 1;     /* Number of next morphological analysis to print */

/* Get all morphological analyses of the word. */
n = ana_morpho(ana, word);

/* Look up the root form for each analysis of the word in CED. */
for (matching = 1; matching >= 0; matching--) {
  got_any = FALSE;

for (i = 0; i < n; i++) {
    emm_pos = emmanuel_to_cedtag(ana[i]);

if (emm_pos == CED_NONE) {
      if (matching)
        fprintf(stderr, "lookup_def: WARNING: "
                "unrecognized tag in analysis: %s = %s\n", word, ana[i]);
      continue;
    } if (compare_cedtags(pos_id, emm_pos, matching)) {
      root = emmanuel_root(ana[i]);

/* Make sure this root-form/pos pair hasn't already occurred */
      for (j = 0; j < i; j++) {
        if (strncmp(ana[i], ana[j], strlen(root)+1) == 0 &&
            emm_pos == emmanuel_to_cedtag(ana[j])) break;
      } if (j == i) {
        thislen = (len - (MATCHING_TITLELEN + NONMATCHING_TITLELEN))/n;
        if (!got_any) thislen += matching ?
          MATCHING_TITLELEN : NONMATCHING_TITLELEN;

init_result(&res, str+total, linewidth, thislen);
        if (!got_any) write_title(&res, word, pos_id, matching);
        describe_analysis(&res, word, root, ana[i]);

if (find_definition(root, &fp, &offset) &&
            show_definition(&res, root, emm_pos, fp, offset)) {
          total += (res.end - res.start);
          ananum++;
          got_any = TRUE;
        }
      } free(root);
    }
  }
}
```

(appendixG.c)

```c
    str[total] = '\0';  /* To erase title when last definition found was empty */
    if (total == 0) sprintf(str, "\"%s\" not in dictionary\n", word);
    return TRUE;
}

/* Look up a root form in the dictionary.
    If not found, return FALSE; else return TRUE and set
    'fp' and 'index' as a side effect.
    'fp' is the dictionary file in which the word was found.
    'offset' is the offset within the file at which the word was found.
    We cache the info from the last lookup to speed up
    multiple consecutive lookups of the same word. */
int find_definition(char *word, FILE **fp, long int *offset)
{
    int filenum, i, len;

/* First check for a cache hit */
    if (dict_word != NULL && strcmp(dict_word, word) == 0) {
        *fp = dict_fp;
        *offset = dict_offset;
        return TRUE;
    } else {
        /* Clear cached info */
        fclose(dict_fp);
        dict_offset = 0;
        free(dict_word);
        dict_word = NULL;
    }

/* Find which dict file this word should be in */
    filenum = -1;
    for (i = numdictfiles - 1; i >= 0; i--) {
        if (my_strcmp(word, dictfiles[i]) >= 0) {
            filenum = i;
            break;
        }
    } if (filenum < 0) {
        /* Word is before 1st word in dictionary */
        return NULL;
    } else {
        sprintf(pathname, "%s/%s", dictdir, dictfiles[filenum]);
        dict_fp = fopen(pathname, "r");
        if (dict_fp == NULL)
            myerror("find_definition: couldn't read '%s'", pathname);
        len = strlen(word);
        dict_offset = 0;

while (fgets(linebuff, BUFSIZ, dict_fp) != NULL) {
            if (*linebuff != '\t' && strncmp(linebuff, word, len) == 0 &&
```

(appendixG.c)

```
            *(linebuff+len) == '\t' && isdefnum(linebuff+len)) {
          /* Found start of entry for the word */
          *fp = dict_fp;
          *offset = dict_offset;
          dict_word = mystrdup(word);
          return TRUE;
        } dict_offset = ftell(dict_fp);
        if (dict_offset < 0) return FALSE;
      } return FALSE;
    }
  }

/* Write to 'res' the definitions of 'word' that match the POS given 'pos_id'.
   The beginning of the dictionary definition is given by 'fp' and 'offset'.
   'fp' is the open dictionary file.
   'offset' is the index of where the definition starts in that file.
   Return TRUE iff we found and printed at least one definition. */
int show_definition(result *res, char *word, int pos_id,
                    FILE *fp, long int offset)
{
  int len, mode, i, start, got_any, pos;

len = strlen(word);
  mode = FIND_ENTRY;
  got_any = FALSE;
  defnum = 1;
  pos = CED_NONE;

if (fseek(fp, offset, SEEK_SET) != 0)
    myerror("show_definition: fseek failed (%ld)", offset);

while (fgets(linebuff, BUFSIZ, fp) != NULL) {
    if (*linebuff != '\t' && strncmp(linebuff, word, len) == 0 &&
        *(linebuff+len) == '\t' && isdefnum(linebuff+len)) {
      mode = FIND_POS;
    } else if (mode == FIND_POS && strncmp(linebuff, "\tpos\t", 5) == 0) {
      /* Got a part-of-speech line */
      /* Ignore stuff before a ';' if present (probably a bug in the dict) */
      for (i = 5; linebuff[i] != '\0' && linebuff[i] != ';'; i++);
      start = (linebuff[i] == ';') ? i+1 : 5;
      pos = ced_name_to_id(linebuff, start);
      mode = FIND_DEF;
    } else if (mode == FIND_DEF && strncmp(linebuff, "\tdef\t", 5) == 0) {
      /* Got a definition line */
      if (pos_id == pos && !res->full) {
        write_def(res, linebuff+5);
        got_any = TRUE;
      }
```

(appendixG.c)

```c
      mode = FIND_ENTRY;
    }
  } if (got_any) terminate_result(res);
  return got_any;
}

/* Return TRUE iff the given string contains a valid definition number.
   A definition number has: optional leading whitespace.
   an optional "H" plus integer plus dot.
   an integer plus dot, and an optional letter plus dot.
   The definition number must be followed by whitespace or \0'. */
int isdefnum(char *line)
{
  char *start, *p, *q;

/* Skip leading whitespace */
  for (start = line; isspace(*start); start++);

/* Scan for optional H plus integer plus dot */
  if (*start == 'H') {
    for (p = start+1; isdigit(*p); p++);
    if (p == start+1 || *p != '.') return FALSE;
    p++;
  } else {
    p = start;
  }

/* Scan integer plus dot */
  for (q = p; isdigit(*q); q++);
  if (q == p || *q != '.') return FALSE;
  q++;

/* Scan optional letter plus dot. */
  if (isalpha(*q) && *(q+1) == '.') q += 2;

return(isspace(*q) || *q == '\0');
}

/* Return the CED tag ID for the tag in an analysis generated by
   Emmanuel's program.
   'analysis' is a morphological analysis returned by Emmanuel's code. */
int emmanuel_to_cedtag(char *analysis)
{
  char *tag;

/* Make 'tag' point to the tag specification in Emmanuel's analysis.
     This is the first occurrence of EMMANUEL_SEP. */
  for (tag = analysis; *tag != '\0' && *tag != EMMANUEL_SEP; tag++);
```

(appendixG.c)

```
        if (prefix_p("+Adj", tag) || prefix_p("+AJ", tag) ||
            prefix_p("+Aco", tag) || prefix_p("+Asu", tag)) {
          return CED_ADJ;
        } else if (prefix_p("+Adv", tag) || prefix_p("+DV", tag)) {
          return CED_ADV;
        } else if (prefix_p("+CNJ", tag)) {
          return CED_CONJ;
        } else if (prefix_p("+Det", tag)) {
          return CED_DET;
        } else if (prefix_p("+INTJ", tag)) {
          return CED_INT;
        } else if (prefix_p("+Ns", tag) || prefix_p("+Np", tag)) {
          return CED_N;
        } else if (prefix_p("+Pre", tag)) {
          return CED_PREP;
        } else if (prefix_p("+Pro", tag)) {
          return CED_PRO;
        } else if (prefix_p("+V", tag)) {
          return CED_V;
        } else {
          return CED_NONE;
        }
      }

/* Return NULL or the name of the inflection applied in an analysis
         generated by Emmanuel's program. */
      char *emmanuel_inflection_name(char *analysis)
      {
        char *tag;

/* Make 'tag' point to the tag specification in Emmanuel's analysis.
           This is the first occurrence of EMMANUEL_SEP. */
        for (tag = analysis; *tag != '\0' && *tag != EMMANUEL_SEP; tag++);

if (prefix_p("+V+IPr3s", tag)) {
          return "3rd person singular";
        } else if (prefix_p("+V+Pret", tag)) {
          return "Past tense";
        } else if (prefix_p("+V+PP", tag)) {
          return "Past participle";
        } else if (prefix_p("+V+Ing", tag)) {
          return "Progressive form";
        } else if (prefix_p("+Np", tag)) {
          return "Plural";
        } else if (prefix_p("+Aco", tag)) {
          return "Comparative";
        } else if (prefix_p("+Asu", tag)) {
          return "Superlative";
        } else {
          return NULL;
        }
```

(appendixG.c)

}

```
/* Return the root form of an analysis generated by Emmanuel's program.
   The root form is the part of the analysis up to the first EMMANUEL_SEP. */
char *emmanuel_root(char *analysis)
{
  int len;

for (len = 0; analysis[len] != '\0' && analysis[len] != EMMANUEL_SEP; len++);
  return mysubstr(analysis, 0, len);
}

/* Compare two CED tags.
   Return TRUE if 'matching' is TRUE and the tags unify,
   or if 'matching' is FALSE and the tags do not unify.
   The tags unify iff one of them is CED_ANY, or the tags are equal. */
int compare_cedtags(int pos1, int pos2, int matching)
{
  int unify;

unify = (pos1 == CED_ANY || pos2 == CED_ANY || pos1 == pos2);
  return((matching && unify) || ((!matching) && (!unify)));
}

/*------------------------------------------------------------------
 |                                                                  |
 |     Write results to a string.                                   |
 |                                                                  |
 *------------------------------------------------------------------*/

/* Initialize a result string. */
void init_result(result *res, char *str, int width, int len)
{
  res->start = str;
  res->backup = str;
  res->end = str;
  str[0] = '\0';

res->width = width;
  res->len = len;
  res->full = FALSE;
}

/* Write a string to a 'result' struct -- same args as sprintf(),
   except first arg is a 'result' struct.
   We assume there will be enough space to fit the message
   (if not, we try to complain after the fact). */
void write_result(va_alist)
va_dcl
```

(appendixG.c)

```c
{
  va_list args;
  result *res;
  char *fmt;
  int len;

va_start(args);

/* Pull off 'res' and 'fmt' from arglist */
  res = va_arg(args, result *);
  fmt = va_arg(args, char *);

/* Print to string in 'res' */
  len = vsprintf(res->end, fmt, args);

if (!space_in_result_p(res, len))
     myerror("report_error: insufficient space for '%s'", fmt);

(res->end) += len;
  va_end(args);
}

/* Terminate a result string. */
void terminate_result(result *res)
{
  if (*(res->end) != '\0') *(res->end) = '\0';
}

/* Write to 'res' a title for all matching or all non-matching definitions.
   Set the backup point to be at the end of the title -- thus we will
   never erase the title when backing up to insert an ellipsis. */
void write_title(result *res, char *word, int pos_id, int matching)
{
  if (matching) {
    if (pos_id == CED_ANY) {
      write_result(res, "Definitions of \"%s\"\n", word);
    } else {
      write_result(res, "Definition of \"%s\" in the current context\n", word);
    }
  } else {
    if (total > 0) {
      write_result(res, "\nOther definitions");
    } else {
      write_result(res, "Definitions");
    } write_result(res, " of \"%s\"\n", word);
  } res->backup = res->end;
}
```

(appendixG.c)

```c
/* Describe to 'res' an analysis generated by Emmanuel's program. */
void describe_analysis(result *res, char *word, char *root, char *analysis)
{
  int emm_pos;
  char *infl;

emm_pos = emmanuel_to_cedtag(analysis);
  if (emm_pos == CED_NONE)
    myerror("describe_analysis: can't describe %s = %s\n", word, analysis);
  infl = emmanuel_inflection_name(analysis);
  write_result(res, "\n");

if (infl == NULL || strcmp(word, root) == 0) {
    /* Don't mention inflection if there is none, or if the root form
       is the same as the surface form */
    write_result(res, "The %s \"%s\"", id_to_print_name(emm_pos), word);
  } else {
    write_result(res, "%s of the %s \"%s\"",
                 infl, id_to_print_name(emm_pos), root);
  } write_result(res, ":\n");
}

/* Return the id of a part of speech, given its CED name.
   The CED name begins at position 'i' of string 'str'
   and ends with '\0' or whitespace. */
int ced_name_to_id(char *str, int i)
{
  int j, len;
  char *name;

while (isspace(str[i])) i++;

for (j = 0; ced_pos[j].ced_name != NULL; j++) {
    name = ced_pos[j].ced_name;
    len = strlen(name);

if (strncmp(name, str+i, len) == 0 &&
        (str[i+len] == '\0' || isspace(str[i+len]))) return ced_pos[j].id;
  } return CED_NONE;
}

/* Return the id of a part of speech, given its print name. */
int print_name_to_id(char *print_name)
{
  int i;
```

(appendixG.c)

```c
    for (i = 0; ced_pos[i].print_name != NULL; i++) {
        if (strcmp(ced_pos[i].print_name, print_name) == 0) return ced_pos[i].id;
    } myerror("print_name_to_id: unknown part of speech name (%s)", print_name);
}

/* Return the print name of a part of speech, given its id. */
char *id_to_print_name(int pos_id)
{
    int i;

for (i = 0; ced_pos[i].print_name != NULL; i++) {
        if (ced_pos[i].id == pos_id) return ced_pos[i].print_name;
    } myerror("id_to_print_name: unknown part of speech id (%d)", pos_id);
}

/* Append a definition to a result.
   We wrap lines at whitespace to avoid going over the maximum width per line.
   If we can't fit the whole definition into the result string,
   mark the result as "full" as a side effect.
   'res' is the 'result' struct to write to.
   'text' is a string giving the text of the definition. */
int write_def(result *res, char *text)
{
    int indent = DEFNUMLEN + 1;
    int first, len;
    char *startp, *endp;
    char num[DEFNUMLEN + 1];

startp = text;
    first = TRUE;

while (TRUE) {
        /* Grab next line of text to print */
        while (isspace(*startp)) startp++;
        if (!first && *startp == '\0') return;
        len = strlen(startp);

if (len <= res->width - indent) {
            /* Can fit rest of text on this line */
            endp = startp + len;
        } else {
            /* Find whitespace boundary at which to wrap text */
            for (endp = startp + res->width - indent;
                 endp > startp && !isspace(*endp);
                 endp--);
            if (endp == startp) endp = startp + res->width - indent;
```

(appendixG.c)

```c
  }

/* Print defnum plus text from 'startp' to 'endp' if it will fit. */
  if (space_in_result_p(res, indent + endp - startp + 1)) {
    num[0] = '\0';
    if (first) sprintf(num, "%d.%d", ananum, defnum++);
    res->end += sprintf(res->end, "%s", num);
    res->end += sprintf(res->end, "%*s", indent - strlen(num), "");

strncpy(res->end, startp, endp - startp);
    res->end += endp - startp;
    if (endp == startp || *(endp-1) != '\n') *(res->end)++ = '\n';
  } else {
    break;
  } startp = endp;
  first = FALSE;
}

/* Couldn't fit output in 'result' string; try to print an ellipsis. */
/* If no room for an ellipsis, try to MAKE room */
if (! (space_in_result_p(res, 4))) {
  /* First try to erase previous whole definition. */
  for (endp = res->end-1;
       endp > res->backup && !(*(endp-1) == '\n' && *endp != ' ');
       endp--);

if (endp == res->backup) {
    /* We just erased the whole result -- try just erasing previous line */
    for (endp = res->end-1;
         endp > res->backup && !(*(endp-1) == '\n');
         endp--);
  } res->end = endp;
}

/* Try to print an ellipsis */
if (space_in_result_p(res, 4)) res->end += sprintf(res->end, "...\n");

res->full = TRUE;
}

/* Return TRUE iff there is room to print 'n' chars in the result string. */
int space_in_result_p(result *res, int n)
{
  int chars_used;

/* Leave room for a terminating '\0' */
  chars_used = res->end - res->start;
  return(chars_used + n < res->len);
```

}

(appendixG.c)

(appendixF.c)

<from tagger.c>

```
/* ---------------------------------------------------------------------
    MaxFoward
    Return the probability of the path with maximum probability and
    sets the array of part of speech tags sent
         is an array of pointers to words, the last one pointing to null
    tagged
         is an array of part of speech tag which is filled on return Forw[i]
         points to the list of states corresponding to the ith
         input token.
    Return MINLOGP if the sentence is not recognized
 --------------------------------------------------------------------- */
double MaxForward(wordptr SENT[], int LEN)
{
  char **w;
  int i,k,n;
  postag tag1, tag2, tag3;
  lexlist tagptr;
  Statelist FORW[MAX_INPUT];
  Statelist s,t;
  double maxlogp;

for(i=0; i< LEN+2; i++) {
    FORW[i]=NULL;            /* reset forward probabilities */
  } reset_lexmem();
  /* Initialization, Padding to the left */
  for(tagptr=FindTags(SENT[0],0);
      tagptr != NULL;
      tagptr = tagptr->next) {
    tag1 = FindTagNum(starttag);
    tag2 = tag1;
    tag3 = tagptr->pos;
    maxlogp = STriProb(tag1, tag2, tag3) + tagptr->lp;
    PushState(&FORW[0], tag2, tag3, maxlogp, NULL);
  }

/* Induction */
  for(i=1; i < LEN; i++)
    for(s=FORW[i-1]; s != NULL; s=s->next) {
      tag1 = s->tag1;
      tag2 = s->tag2;
      reset_lexmem();
      for(tagptr=FindTags(SENT[i],i);
```

(appendixF.c)

```
            tagptr != NULL;
            tagptr = tagptr->next) {
        tag3 = tagptr->pos;
        maxlogp = s->logp + STriProb(tag1, tag2, tag3) + tagptr->lp;
        SetMaxStateP(&FORW[i], tag2, tag3, maxlogp, s);
    }
}
reset_lexmem();
/* FIRST PAD TO THE RIGHT */
/* lastword END    */
/*      i-1    i   */
for(s=FORW[i-1]; s != NULL; s=s->next) {
    tag1 = s->tag1;
    tag2 = s->tag2;
    tag3 = FindTagNum(endtag);
    maxlogp = s->logp + STriProb(tag1, tag2, tag3);
    SetMaxStateP(&FORW[i], tag2, tag3, maxlogp, s);
}
i++;
/* SECOND PAD TO THE RIGHT */
/* lastword  END   END  */
/*      i-2   i-1   i */
for(s=FORW[i-1]; s != NULL; s=s->next) {
    tag1 = s->tag1;
    tag2 = s->tag2;
    tag3 = FindTagNum(endtag);
    maxlogp = s->logp + STriProb(tag1, tag2, tag3);
    SetMaxStateP(&FORW[i], tag2, tag3, maxlogp, s);
} n=i;                    /* lastword/i-2  END/i-1  END/i  */

/* Sentence Probability */
s=NULL;
maxlogp = MINLOGP;
for(t=FORW[n]; t != NULL; t=t->next)
    if (t->logp > maxlogp) {
        maxlogp = t->logp;
        s = t;
    }

/* Fill the tags */
if (maxlogp != MINLOGP)
    for(t=s; t != NULL; t=t->prev){
        if ((n < LEN) && (n >= 0)) {
            WORD_POS(SENT[n])=t->tag2;
            if (n==0) SetFirstWord(SENT[n], t->tag2);
        }
        n--;
    }

/* Free the memory used by FORW */
```

(appendixF.c)

```c
    for(i=0; i< LEN + 2; i++)
        if (FORW[i] != NULL) FreeStateNext(FORW[i]->next);

/* Free the memory used for lexical information */
    if (lexgarbage) FreeGcLex(lexgarbage);
    lexgarbage = NULL;

return(maxlogp);
}

/* NEW */
void SetFirstWord(wordptr wdptr, postag tag)
{
    lexlist lex;
    char *spelling;
    extern char   linebuf[];

spelling = WORD_SPELLING(wdptr);

if ((isupper(spelling[0])) && (strcmp(spelling, "I") != 0)) {
        lex = bin_findword(spelling);
        if (!FindLexAstag(lex, tag)) {
#ifdef DEBUGS
            printf("%s static = %d\n", wdptr->spelling, wdptr->spelling_static);
#endif
            if (WORD_SPELLING_STATIC(wdptr)) {
                strcpy(linebuf, spelling);
                linebuf[0] = tolower(spelling[0]);
                wdptr->spelling = mystrdup(linebuf);
                wdptr->spelling_static = FALSE;
            }
            else {
                spelling[0] = tolower(spelling[0]);
            }
        }
    }
}
```

We claim:

1. In a grammar checking system, a determiner checking system for detecting improper referents of a noun phrase in an input sentence regardless of whether the sentence as a whole can be parsed, comprising:

means for determining the parts of speech of the words in said sentence to provide parts of speech tags including a trigram part of speech tagger having means for ascertaining the probability of the part of speech of a candidate word;

means, responsive to said means for determining the parts of speech of said sentence for identifying noun phrases, said noun phrases having constituents making up said noun phrase, said noun phrase identifying means including means for traversing said input sentence backwards, identifying via part of speech tags the immediately preceding noun, said immediately preceding noun being a head noun and as such being the right most word of the immediately preceding noun phrase, and continuing to work backwards to identify the rest of the words in said immediately preceding noun phrase, thus to identify the left boundary of said immediately preceding noun phrase so as to identify the start of a noun phrase and the end thereof, thereby to permit determination of number, whether the noun is a mass noun, is a singular non-proper noun, is part of an idiom or is a proper noun; and, means responsive to the identification of a noun phrase for detecting missing determiners, extraneous determiners, or lack of agreement in number for the constituents of said noun phrase.

2. The system of claim 1, and further including means for determining if said head noun is a singular non-proper noun.

3. The system of claim 1, and further including means for determining if said head noun is a mass noun.

4. The system of claim 1, and further including means for determining if said noun phrase is part of an idiom.

5. The system of claim 1, and further including means for determining if said head noun is a proper noun.

6. The system of claim 5, and further including means, if said head noun is a proper noun, for determining if said noun phrase contains a determiner.

7. The system of claim 6, and further including, if said noun phrase contains a determiner, if said determiner agrees in number with said head noun.

* * * * *